(12) United States Patent
He et al.

(10) Patent No.: US 12,010,257 B2
(45) Date of Patent: Jun. 11, 2024

(54) IMAGE CLASSIFICATION METHOD AND ELECTRONIC DEVICE

(71) Applicant: Huawei Technologies Co., Ltd., Shenzhen (CN)

(72) Inventors: Liping He, Shanghai (CN); Yifan Ji, Shanghai (CN); Xinjian Wang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 385 days.

(21) Appl. No.: 17/422,688

(22) PCT Filed: Dec. 16, 2019

(86) PCT No.: PCT/CN2019/125515
§ 371 (c)(1),
(2) Date: Jul. 13, 2021

(87) PCT Pub. No.: WO2020/151396
PCT Pub. Date: Jul. 30, 2020

(65) Prior Publication Data
US 2022/0116497 A1    Apr. 14, 2022

(30) Foreign Application Priority Data
Jan. 21, 2019    (CN) .......................... 201910055398.1

(51) Int. Cl.
*H04M 1/72*    (2021.01)
*G06F 16/55*    (2019.01)
(Continued)

(52) U.S. Cl.
CPC ........ *H04M 1/72439* (2021.01); *G06F 16/55* (2019.01); *G06F 16/583* (2019.01);
(Continued)

(58) Field of Classification Search
CPC .......... G06F 16/54; G06F 16/55; G06F 16/58; G06F 16/583; G06F 16/5866;
(Continued)

(56) References Cited

U.S. PATENT DOCUMENTS

2006/0036568 A1    2/2006    Moore et al.
2007/0174035 A1    7/2007    Chuang
(Continued)

FOREIGN PATENT DOCUMENTS

CN    1713705 A    12/2005
CN    104750848 A    7/2015
(Continued)

OTHER PUBLICATIONS

Anonymous, "Media Transfer Protocol," Wikipedia, Mar. 18, 2017, XP055474173, 8 pages.

*Primary Examiner* — Nader Bolourchi
(74) *Attorney, Agent, or Firm* — Slater Matsil, LLP

(57) ABSTRACT

This application provides an image classification method and an electronic device. The image classification method includes: detecting, by a first electronic device, a connection to a second electronic device; allowing, by the first electronic device, a data access request of the second electronic device; sending, by the second electronic device, request information to the first electronic device, where the request information is used to request information about an image in one or more image sets, and each of the one or more image sets is obtained by the first electronic device by classifying images shot by a camera of the first electronic device; sending, by the first electronic device, response information to the second electronic device; and displaying, by the second electronic device, information about each image set by using a display.

17 Claims, 37 Drawing Sheets

(51) Int. Cl.
  *G06F 16/58*     (2019.01)
  *G06F 16/583*    (2019.01)
  *H04M 1/72439*   (2021.01)
  *H04M 1/72409*   (2021.01)

(52) U.S. Cl.
  CPC ..... *G06F 16/5866* (2019.01); *H04M 1/72409* (2021.01); *H04M 2250/64* (2013.01)

(58) Field of Classification Search
  CPC ......... H04M 1/72403; H04M 1/72409; H04M 1/72439; H04M 1/72472; H04M 2250/64
  See application file for complete search history.

(56) References Cited

U.S. PATENT DOCUMENTS

| | | | |
|---|---|---|---|
| 2010/0145980 | A1 | 6/2010 | Komatsu |
| 2012/0047138 | A1 | 2/2012 | Akagi |
| 2015/0356949 | A1* | 12/2015 | Kim ................ H04W 4/18 345/173 |
| 2016/0261674 | A1 | 9/2016 | Plotnikov |

FOREIGN PATENT DOCUMENTS

| | | | |
|---|---|---|---|
| CN | 104850848 | A | 8/2015 |
| CN | 105359121 | A | 2/2016 |
| CN | 106034189 | A | 10/2016 |
| CN | 106202210 | A | 12/2016 |
| CN | 107168905 | A | 9/2017 |
| CN | 107391618 | A | 11/2017 |
| CN | 107967322 | A | 4/2018 |
| CN | 107977431 | A | 5/2018 |
| CN | 108121816 | A | 6/2018 |
| CN | 109164969 | A | 1/2019 |
| CN | 109656880 | A | 4/2019 |
| CN | 109981881 | A | 7/2019 |
| EP | 1513080 | A2 | 3/2005 |
| JP | 2010087796 | A | 4/2010 |
| JP | 2012064297 | A | 3/2012 |
| JP | 2016127415 | A | 7/2016 |
| KR | 20110083099 | A | 7/2011 |
| KR | 101490688 | B1 | 2/2015 |
| KR | 20160013062 | A | 2/2016 |
| WO | 2018000643 | A1 | 1/2018 |

* cited by examiner

Responder  Initiator

CONT. FROM
FIG. 7(a)
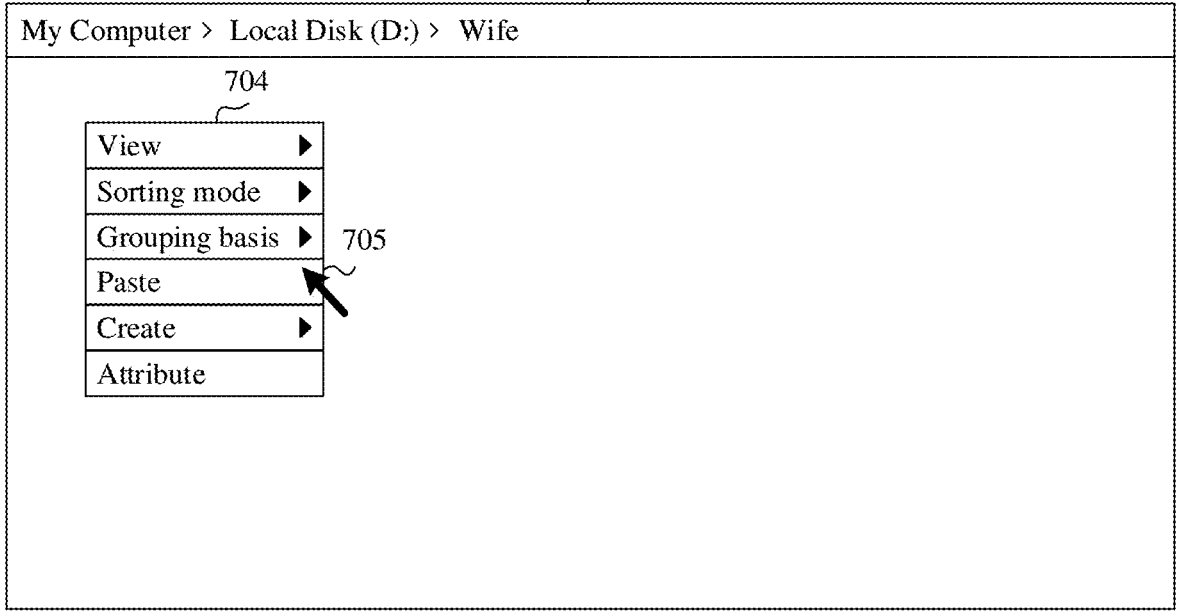
FIG. 7(b)
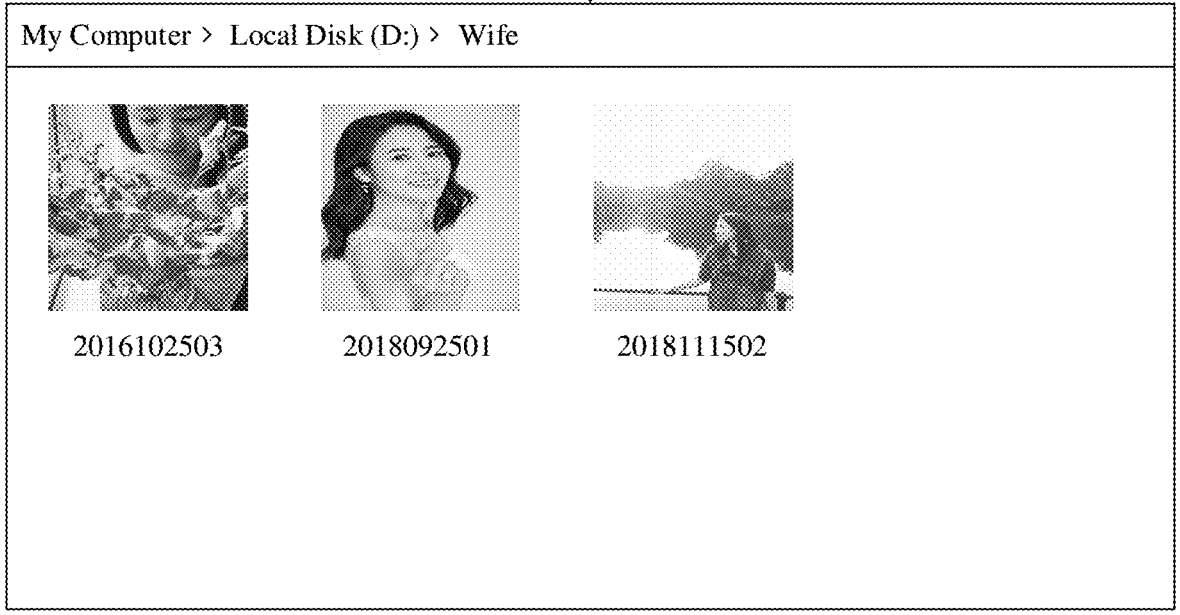
FIG. 7(c)

CONT. FROM
FIG. 8(a)
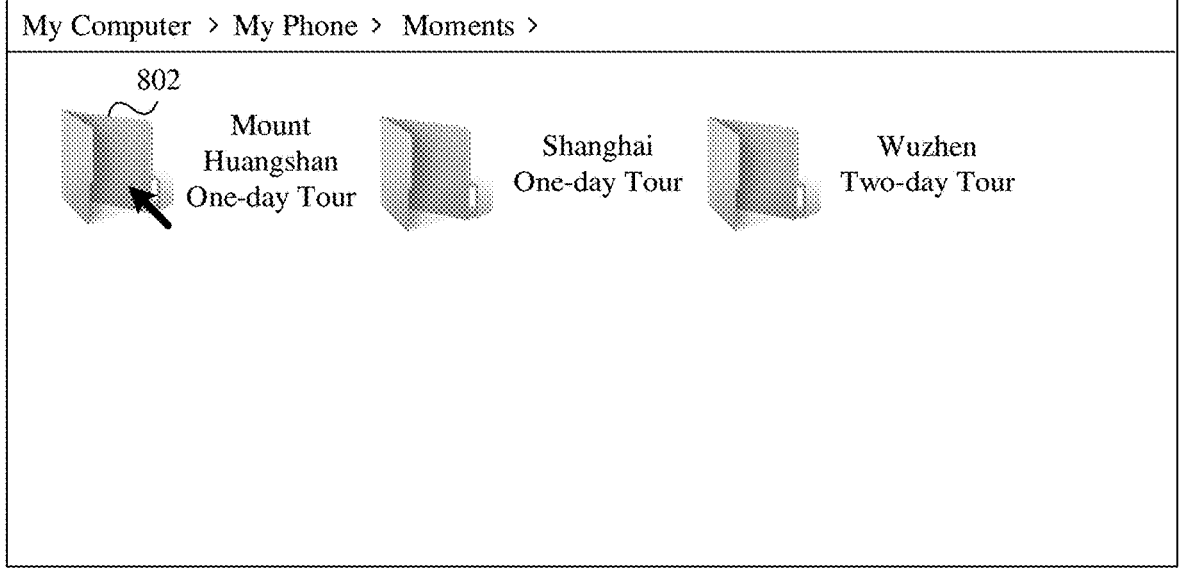
FIG. 8(b)
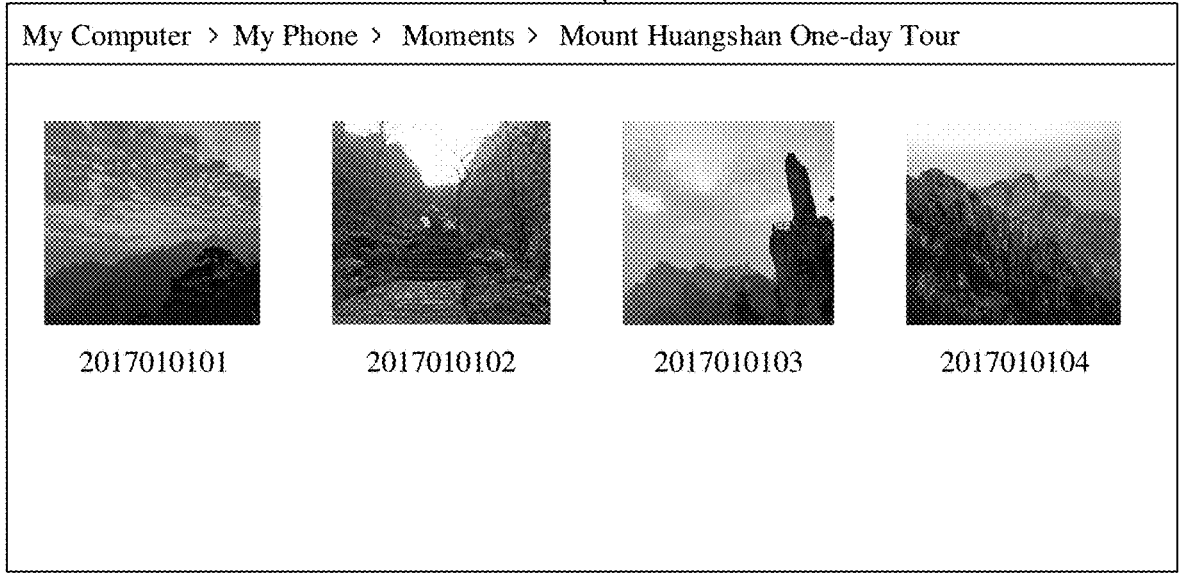
FIG. 8(c)

TO FIG. 9(b)

CONT. FROM
FIG. 9(a)
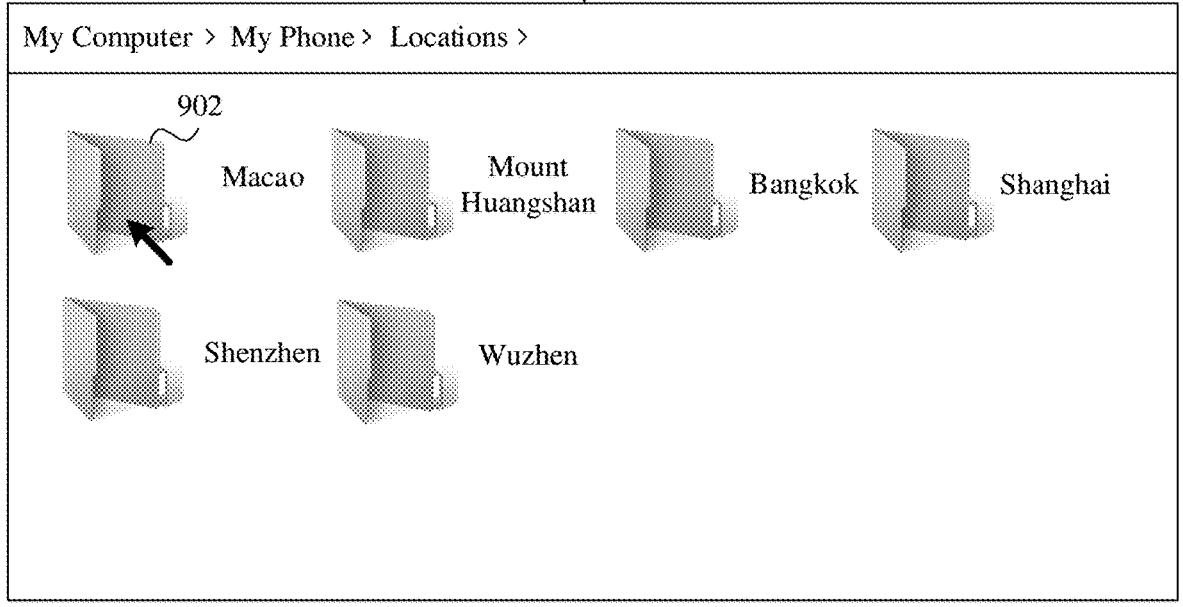
FIG. 9(b)
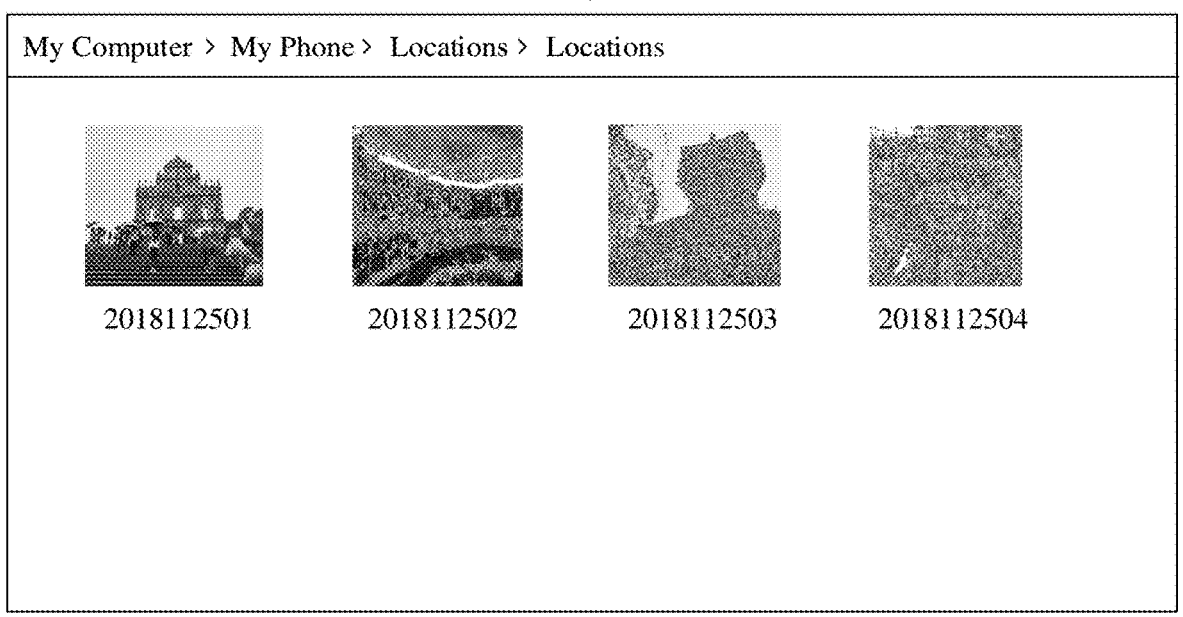
FIG. 9(c)

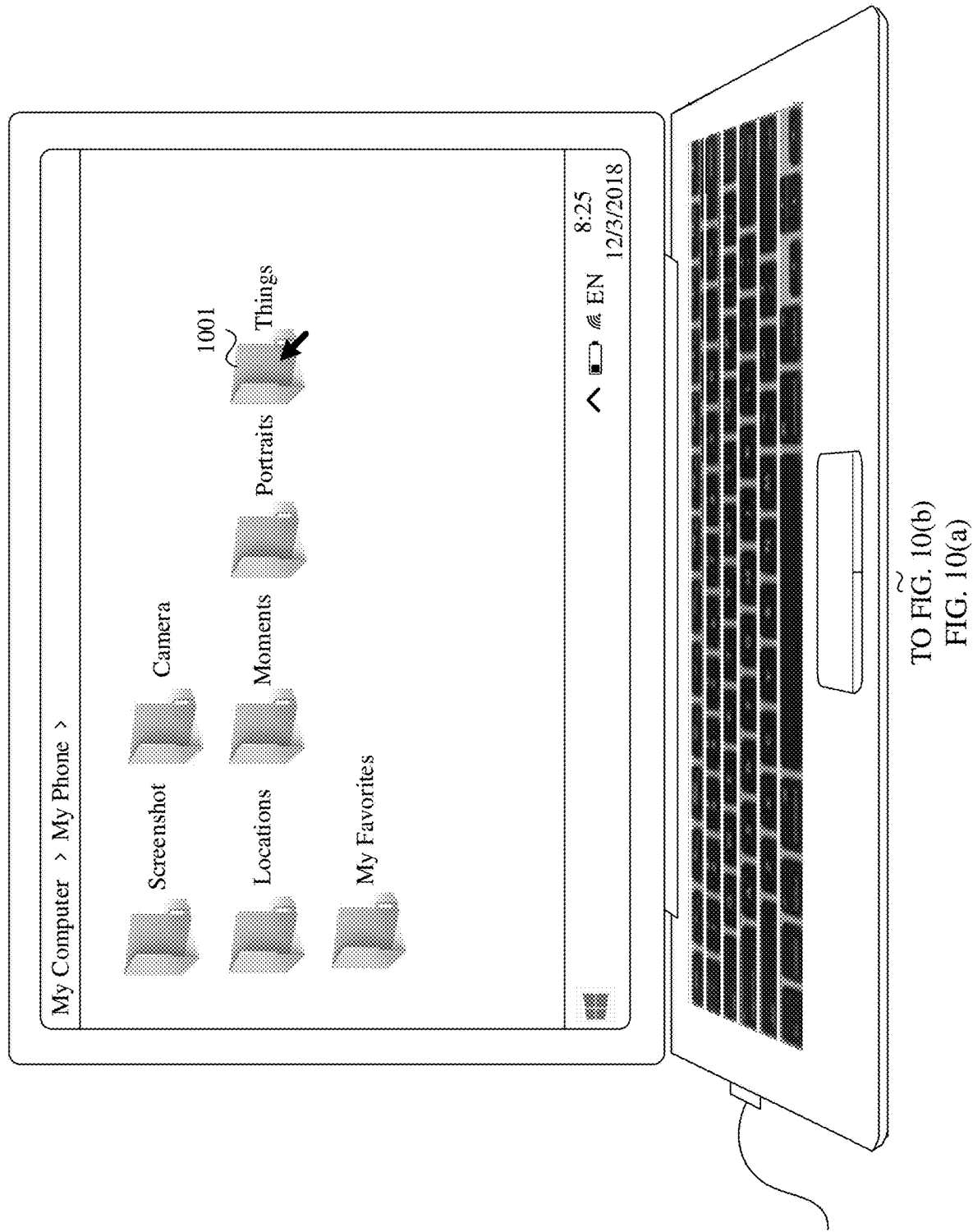

CONT. FROM
FIG. 10(a)
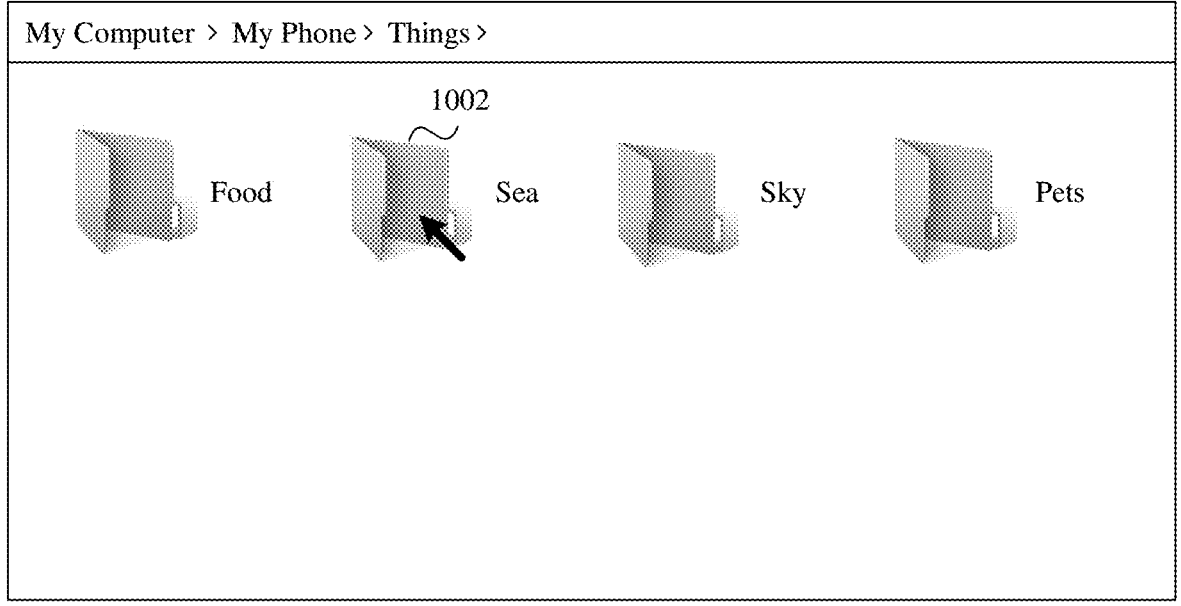
FIG. 10(b)
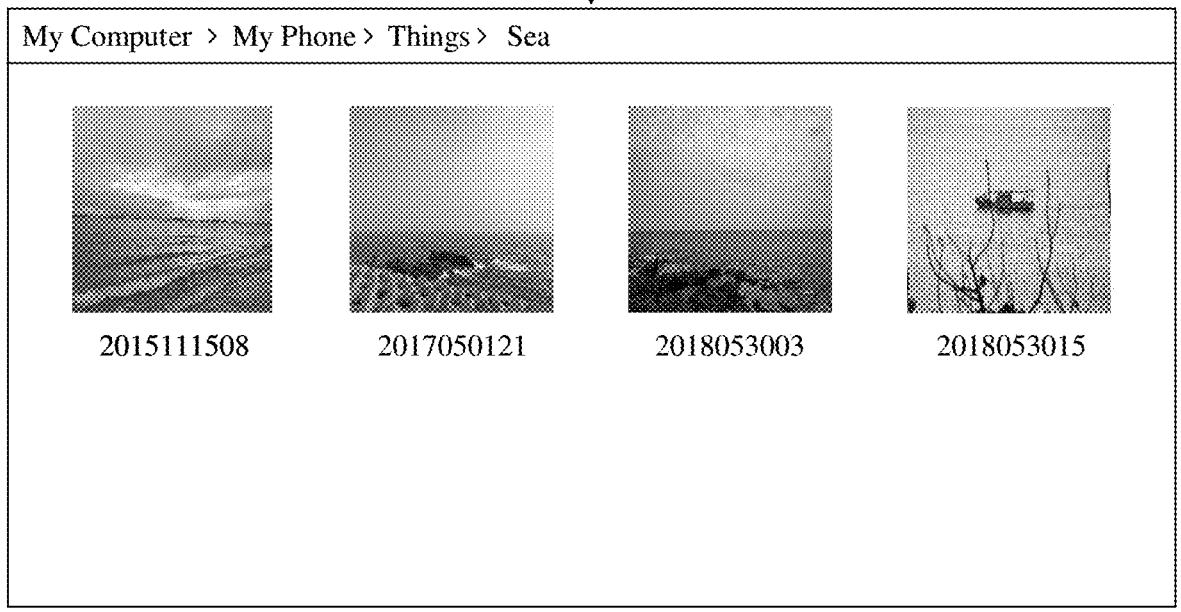
FIG. 10(c)

```
54    public class MtpService extends Service {
55        private static final String TAG = "MtpService";
56        private static final boolean LOGD = false;
57
58        // We restrict FTP to these subdirectories
59        private static final String [] FTP_DIRECTORIES = new String [] {
60            Environment.DIRECTORY_DCIM,
61            Environment.DIRECTORY_PICTURES,
62        };
```

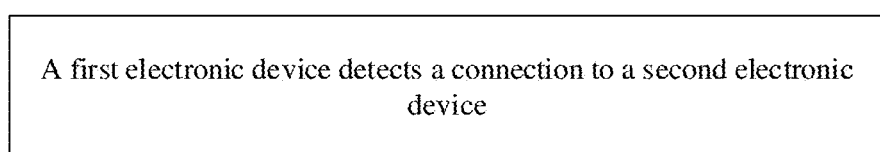
A first electronic device detects a connection to a second electronic device — 2001

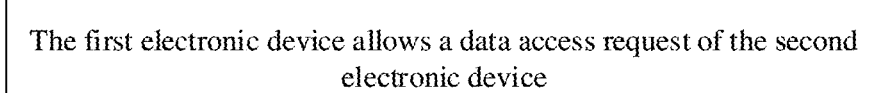
The first electronic device allows a data access request of the second electronic device — 2002

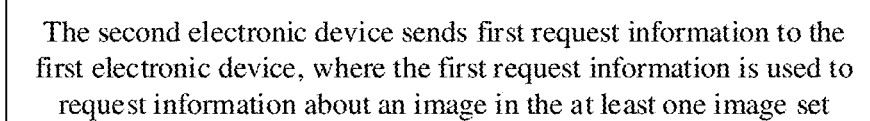
The second electronic device sends first request information to the first electronic device, where the first request information is used to request information about an image in the at least one image set — 2003

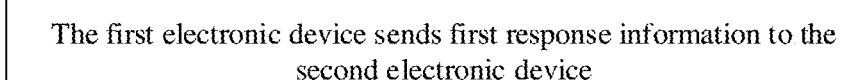
The first electronic device sends first response information to the second electronic device — 2004

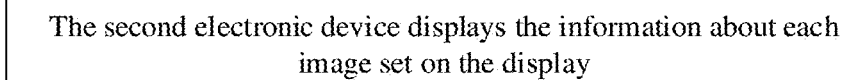
The second electronic device displays the information about each image set on the display — 2005

FIG. 20

IMAGE CLASSIFICATION METHOD AND ELECTRONIC DEVICE

CROSS-REFERENCE TO RELATED APPLICATIONS

This application is a National Stage of International Patent Application No. PCT/CN2019/125515 filed on Dec. 16, 2019, which claims priority to Chinese Patent Application No. 201910055398.1, filed on Jan. 21, 2019. Both of the aforementioned applications are hereby incorporated by reference in their entireties.

TECHNICAL FIELD

This application relates to the field of electronic devices, and more specifically, to an image classification method and an electronic device.

BACKGROUND

In an environment of massive media, image processing technologies are increasingly intelligent. How to quickly and conveniently use these technologies to improve efficiency and experience of searching for media by a user is very important.

A mobile phone is used as an example. Intelligent classification is implemented in a gallery of the mobile phone based on different image categories, so that a user finds a desired image on the mobile phone based on these intelligent classifications. However, image classification information can be viewed only on the mobile phone, and the user cannot view the image classification information on another device in life and cannot save the image classification information as a physical album. As a result, when the user cannot timely view, on another device, an intelligently classified image on the mobile phone, user experience is relatively poor.

SUMMARY

This application provides an image classification method and an electronic device, to help improve user experience.

According to a first aspect, an image classification method is provided, which is applied to a first electronic device. The first electronic device includes a camera. The image classification method includes: displaying a first user interface, where the first user interface includes one or more image sets, and each of the one or more image sets is obtained by classifying images shot by the camera; detecting a connection to a second electronic device; allowing a data access request of the second electronic device; receiving first request information sent by the second electronic device, where the first request information is used to request information about each image set; and sending first response information to the second electronic device, so that the second electronic device displays each image set in a folder form.

A gallery of the first electronic device includes one or more images. When obtaining an image, for example, after obtaining an image by shooting with the camera, the first electronic device may intelligently classify the image, to form one or more image sets in the first electronic device. When a user views images, the user can open the gallery to view all images, or open an image set to view images in this intelligent classification.

According to the image classification method in this embodiment of this application, response information sent by the first electronic device to the second electronic device carries the information about each image set, so that the information about each image set in the first electronic device can be displayed on the second electronic device. This helps the user timely search for information about a required image, thereby improving user experience.

In some possible implementations, the image set may include a photo and/or a video.

In some possible implementations, the first response information carries the information about each image set.

In some possible implementations, the information about each image set is label information or classification information of each image set.

In some possible implementations, each of the one or more image sets is obtained by classifying the images shot by the camera and images downloaded by the first electronic device.

With reference to the first aspect, in some possible implementations of the first aspect, before the sending first response information to the second electronic device, the method further includes: searching a database of the first electronic device, where the database includes a correspondence between each image set and a parent of each image set.

The database of the first electronic device originally includes a media database, and the media database summarizes and includes a correspondence between a data center infrastructure management (data center infrastructure management, DCIM) and a parent of the DCIM. In this embodiment of this application, a gallery database is newly added to the first electronic device, and the gallery database includes a correspondence between each intelligent classification image set and a parent thereof. In this way, when the second electronic device sends the first request information to the first electronic device, the first electronic device may search the gallery database, to carry the information about each image set in the first response information.

According to the image classification method in this embodiment of this application, the correspondence between each image set and the parent of each image set is added to the database of the first electronic device. When the second electronic device requests data of the first electronic device, the first electronic device may send the information about each image set to the second electronic device by searching the database, and the second electronic device displays information about each image to the user by using a display. This helps the user timely search for the information about the required image, thereby improving user experience.

With reference to the first aspect, in some possible implementations of the first aspect, after the sending first response information to the second electronic device, the method further includes: receiving second request information sent by the second electronic device, where the second request information is used to request information about an image in a first image set, and the one or more image sets include the first image set; in response to the second request information, searching for the image in the first image set by using a mapping relationship; and sending the second response information to the second electronic device, so that the second electronic device displays each image in the first image set in a thumbnail form.

When the second electronic device displays the one or more image sets to the user in a folder form by using the display, the user may further indicate to open the first image set in the one or more image sets, and the second electronic device may send the second request information to the first electronic device in response to the second request information, where the second request information may carry information about the first image set. The first electronic device may search for the image in the first image set by using the mapping relationship, and send the second response information to the second electronic device. The second electronic device may display the information about the image in the first image set to the user by using the display.

According to the image classification method in this embodiment of this application, information about the one or more image sets is displayed on the second electronic device. This helps the user timely search for the information about the required image, thereby improving user experience.

With reference to the first aspect, in some possible implementations of the first aspect, the mapping relationship is a classification label of the first image set.

The first electronic device may classify each image by using the classification label, and images with a same classification label may form an image set. The gallery database in this embodiment of this application may not occupy a memory (or space) of the first electronic device. When the first electronic device receives the second request information, the first electronic device learns that the second electronic device expects to request the information about the image in the first image set, and the first electronic device may extract the information about the image in the first image set from the gallery by using information about the classification label of the first image set, and send the information about the image in the first image set to the second electronic device by using the second response information.

With reference to the first aspect, in some possible implementations of the first aspect, the first electronic device is connected to the second electronic device by using a picture transfer protocol PTP protocol; or the first electronic device is connected to the second electronic device by using a media transfer protocol MTP protocol.

With reference to the first aspect, in some possible implementations of the first aspect, the method further includes: receiving third request information sent by the second electronic device, where the third request information is used to request information about a first image in the first image set; and sending third response information to the second electronic device, so that the second electronic device displays the first image by using the display.

According to the image classification method in this embodiment of this application, the user can timely preview, on the second electronic device, an image that the user needs to view. This improves user experience.

With reference to the first aspect, in some possible implementations of the first aspect, the method further includes: receiving fourth request information sent by the second electronic device, where the fourth request information is used to request one or more images in the second image set; and sending fourth response information to the second electronic device, so that the second electronic device copies the one or more images to a storage disk of the second electronic device.

According to the image classification method in this embodiment of this application, the user can timely copy, to the second electronic device, an image responding on the first electronic device, to facilitate a next operation of the user. This improves user experience.

With reference to the first aspect, in some possible implementations of the first aspect, the first electronic device is a smartphone or a tablet computer.

With reference to the first aspect, in some possible implementations of the first aspect, an operating system of the first electronic device is an Android Android operating system.

According to a second aspect, an image classification method is provided, which is applied to a second electronic device. The second electronic device includes a display. The image classification method includes: detecting that a first electronic device is connected to the second electronic device; sending a data access request to the first electronic device; receiving a response, sent by the first electronic device, to the data access request; detecting a first operation of a user; and displaying a first user interface on the display in response to the first operation, where the first user interface includes information about each of one or more image sets, and each of the one or more image sets is obtained by classifying images shot by a camera of the first electronic device.

According to the image classification method in this embodiment of this application, the information about each image set in the first electronic device is displayed on the second electronic device. This helps the user timely search for information about a required image, thereby improving user experience.

In some possible implementations, each of the one or more image sets is obtained by classifying the images shot by the camera and images downloaded by the first electronic device.

In some possible implementations, before the displaying a first user interface on the display, the method further includes: The second electronic device sends first request information to the first electronic device, where the first request information is used to request information about each image set; and the first electronic device sends first response information to the second electronic device, where the first response information includes the information about each image set.

With reference to the second aspect, in some possible implementations of the second aspect, the method further includes: detecting a second operation of the user; and displaying a second user interface on the display in response to the second operation, where the second user interface includes information about an image in a first image set, and the one or more image sets include the first image set.

According to the image classification method in this embodiment of this application, the information about each image set in the first electronic device is displayed on the second electronic device, so that the user can timely search for information about an image in a required image set. This improves user experience.

In some possible implementations, before the displaying a second user interface on the display, the method further includes: The second electronic device sends second request information to the first electronic device, where the first request information is used to request the information about the image in the first image set; and the first electronic device sends the first response information to the second electronic device, where the first response information includes the information about the image in the first image set.

With reference to the second aspect, in some possible implementations of the second aspect, the information about the image in the first image set is a thumbnail of the image in the first image set.

In some possible implementations, the thumbnail of the image in the first image set may be an ultra-large icon, a large icon, a medium icon, a small icon, or the like.

In some possible implementations, the image in the first image set may be further displayed on the display based on detailed information, in a tile mode, based on content, in a list, or the like.

With reference to the second aspect, in some possible implementations of the second aspect, the method further includes: before the displaying a first user interface on the display, detecting a third operation of the user; and displaying a third user interface on the display of the second electronic device in response to the third operation, where the third user interface includes a storage disk of the first electronic device and a storage disk of the second electronic device, and the first operation is an operation performed by the user to indicate to open the storage disk of the first electronic device.

With reference to the second aspect, in some possible implementations of the second aspect, the method further includes: detecting a fourth operation of the user; and copying one or more images in the second image set to the storage disk of the second electronic device in response to the fourth operation.

With reference to the second aspect, in some possible implementations of the second aspect, the first electronic device is connected to the second electronic device by using a picture transfer protocol PTP protocol; or the first electronic device is connected to the second electronic device by using a media transfer protocol MTP protocol.

With reference to the second aspect, in some possible implementations of the second aspect, the second electronic device is a personal computer.

With reference to the second aspect, in some possible implementations of the second aspect, an operating system of the second electronic device is a Windows operating system.

According to a third aspect, an image classification method is provided, which is applied to a system. The system includes a first electronic device and a second electronic device. The first electronic device includes a camera, and the second electronic device includes a display. The method includes: The first electronic device detects a connection to the second electronic device; the first electronic device allows a data access request of the second electronic device; the second electronic device sends first request information to the first electronic device, where the first request information is used to request information about an image in the one or more image sets, and each of the one or more image sets is obtained by classifying images shot by the camera; the first electronic device sends first response information to the second electronic device; and the second electronic device displays information about each image set on the display.

With reference to the third aspect, in some possible implementations of the third aspect, the method further includes: The second electronic device sends second request information to the first electronic device, where the second request information is used to request information about an image in a first image set, and the one or more image sets include the first image set; the first electronic device sends second response information to the second electronic device; and the second electronic device displays the information about the image in the first image set on the display.

With reference to the third aspect, in some possible implementations of the third aspect, the information about the image in the first image set is a thumbnail of the image in the first image set.

With reference to the third aspect, in some possible implementations of the third aspect, the method further includes: The second electronic device sends third request information to the first electronic device, where the second request information is used to request information about a first image in the first image set, and the first image set includes the first image; the first electronic device sends the second response information to the second electronic device, where the second response information includes the information about the first image; and the second electronic device displays the first image on the display.

With reference to the third aspect, in some possible implementations of the third aspect, an operating system of the first electronic device is an Android operating system, and an operating system of the second electronic device is a Windows operating system.

According to a fourth aspect, an image classification apparatus is provided. The apparatus is included in an electronic device, and has a function of implementing behavior of the first electronic device in the first aspect and the possible implementations of the first aspect. The function may be implemented by hardware, or may be implemented by hardware executing corresponding software. The hardware or the software includes one or more modules or units corresponding to the foregoing function.

According to a fifth aspect, an image classification apparatus is provided. The apparatus is included in an electronic device, and has a function of implementing behavior of the second electronic device in the second aspect and the possible implementations of the second aspect. The function may be implemented by hardware, or may be implemented by hardware executing corresponding software. The hardware or the software includes one or more modules or units corresponding to the foregoing function.

According to a sixth aspect, an electronic device is provided, including a camera, one or more processors, a memory, and one or more computer programs. The one or more computer programs are stored in the memory. When the one or more computer programs are executed by the processor, the electronic device is enabled to perform the image classification method in the first aspect and the possible implementations of the first aspect.

According to a seventh aspect, an electronic device is provided, including a display, one or more processors, a memory, and one or more computer programs. The one or more computer programs are stored in the memory. When the one or more computer programs are executed by the processor, the electronic device is enabled to perform the image classification method in the second aspect and the possible implementations of the second aspect.

According to an eighth aspect, an electronic device is provided, including one or more processors and one or more memories. The one or more memories are coupled to the one or more processors. The one or more memories are configured to store computer program code, and the computer program code includes computer instructions. When the one or more processors execute the computer instructions, the electronic device is enabled to perform the image classification method in the first aspect or the possible implementations of the first aspect.

According to a ninth aspect, an electronic device is provided, including one or more processors and one or more memories. The one or more memories are coupled to the one or more processors. The one or more memories are configured to store computer program code, and the computer program code includes computer instructions. When the one or more processors execute the computer instructions, the electronic device is enabled to perform the image classification method in the second aspect or the possible implementations of the second aspect.

According to a tenth aspect, a computer storage medium is provided, including computer instructions. When the computer instructions are run on an electronic device, the electronic device is enabled to perform the image classification method in any possible implementation of any one of the foregoing aspects.

According to an eleventh aspect, this technical solution provides a computer program product. When the computer program product runs on an electronic device, the electronic device is enabled to perform the image classification method in any possible design of any one of the foregoing aspects.

BRIEF DESCRIPTION OF THE DRAWINGS

FIG. 5(a)-1 to FIG. 5(f) are a schematic diagram of a group of graphical user interfaces according to an embodiment of this application;

FIG. 7(a) to FIG. 7(c) are a schematic diagram of another group of graphical user interfaces according to an embodiment of this application;

FIG. 8(a) to FIG. 8(c) are a schematic diagram of another group of graphical user interfaces according to an embodiment of this application;

FIG. 9(a) to FIG. 9(c) are a schematic diagram of another group of graphical user interfaces according to an embodiment of this application;

FIG. 10(a) to FIG. 10(c) are a schematic diagram of another group of graphical user interfaces according to an embodiment of this application;

FIG. 11(a)-1 to FIG. 11(f) are a schematic diagram of another group of graphical user interfaces according to an embodiment of this application;

FIG. 17 shows Android source code related to a PTP protocol;

FIG. 20 is another schematic flowchart of an image classification method according to an embodiment of this application;

DETAILED DESCRIPTION OF ILLUSTRATIVE EMBODIMENTS

Figure 1:
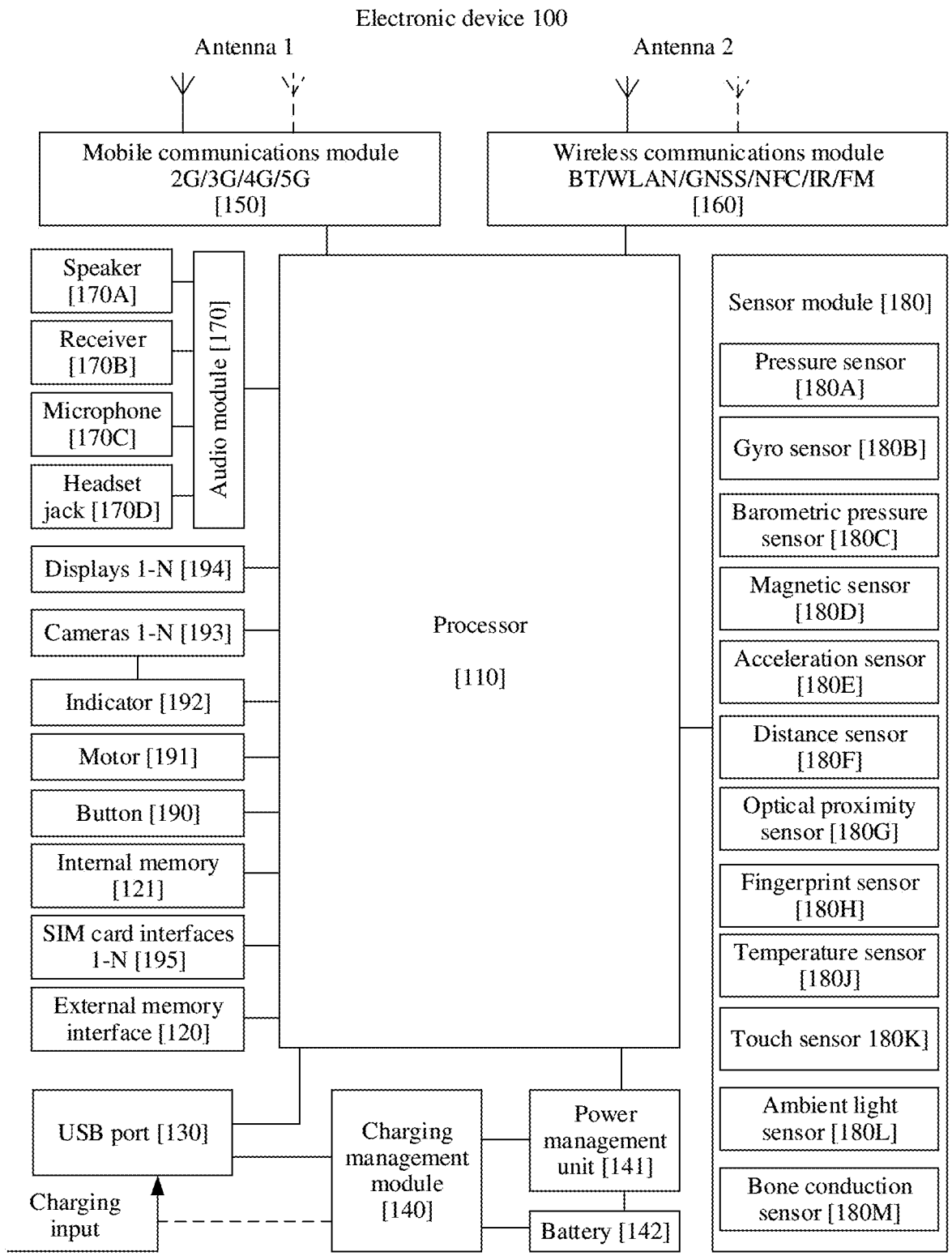
FIG. 1 is a schematic diagram of a structure of an electronic device according to an embodiment of this application.

The following describes the technical solutions in the embodiments of this application with reference to the accompanying drawings in the embodiments of this application. In descriptions in the embodiments of this application, "/" means "or" unless otherwise specified. For example, A/B may represent A or B. In this specification, "and/or" describes only an association for describing associated objects and represents that three relationships may exist. For example, A and/or B may represent the following three cases: Only A exists, both A and B exist, and only B exists. In addition, in the descriptions in the embodiments of this application, "a plurality of" means two or more than two.

The terms "first" and "second" mentioned below are merely intended for description, and shall not be understood as an indication or implication of relative importance or implicit indication of a quantity of indicated technical features. Therefore, a feature limited by "first" or "second" may explicitly or implicitly include one or more features. In the descriptions of the embodiments, unless otherwise specified, "a plurality of" means two or more than two.

An intelligent classification method provided in the embodiments of this application may be applied to a scenario in which an electronic device, for example, a mobile phone, a tablet computer, a wearable device, a vehicle-mounted device, an augmented reality (augmented reality, AR) device, or a virtual reality (virtual reality, VR) device, is connected to an electronic device, for example, a notebook computer, an ultra-mobile personal computer (ultra-mobile personal computer, UMPC), a netbook, or a personal digital assistant (personal digital assistant, PDA). Specific types of the two connected electronic devices are not limited in the embodiments of this application.

A connection between a mobile phone and a personal computer (personal computer, PC) is used as an example. As an important smart capability of the mobile phone, a gallery has a high-end analysis capability for pictures and videos. The gallery displays face clustering, group photos, highlights, protagonists' stories, location albums, things albums, and My Favorites in terms of services, facilitating users to sort out and manage their media assets.

However, in a scenario, when a picture is copied (copy) by a PC to the PC locally, the picture cannot be simply and conveniently copied to a target album based on an existing clustering album. For example, all pictures in a portrait clustering album (about a child, a spouse, a parent, a mentor and a partner, or the like) cannot be conveniently copied to the PC. Currently, protocols between a mobile phone and a PC end include a media transfer protocol (media transfer protocol, MTP) and a picture transfer protocol (picture transfer protocol, PTP). However, both the MTP and the PTP are simple physical directory structure mapping, and have a severe disadvantage in understanding pictures and videos. Therefore, a manner of quickly and conveniently migrating media files cannot be provided for the users.

Embodiments of this application provide an intelligent classification method. By adding smart clustering on a mobile phone, a user can view smart clustering of photos or videos on a PC, so that the user can quickly view a photo or a video that needs to be viewed, and user experience is relatively good.

For example, FIG. 1 is a schematic diagram of a structure of an electronic device 100. The electronic device 100 may include a processor no, an external memory interface 120, an internal memory 121, a universal serial bus (universal serial bus, USB) port 130, a charging management module 140, a power management unit 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that an example structure in this embodiment of this application does not constitute a specific limitation on the electronic device 100. In some other embodiments of this application, the electronic device 100 may include more or fewer components than those shown in the figure, or some components may be combined, or some components may be split, or there may be a different component layout. The components shown in the figure may be implemented by hardware, software, or a combination of software and hardware.

The processor no may include one or more processing units. For example, the processor no may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

The memory may further be disposed in the processor 110, and is configured to store an instruction and data. In some embodiments, the memory in the processor no is a cache. The memory may store an instruction or data just used or cyclically used by the processor 110. If the processor no needs to use the instruction or the data again, the processor no may directly invoke the instruction or the data from the memory. This avoids repeated access and reduces a waiting time of the processor 110, thereby improving system efficiency.

In some embodiments, the processor no may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The USB port 130 is an interface that conforms to a USB standard specification, and may be specifically a mini USB port, a micro USB port, a USB T e-C port, or the like. The USB port 130 may be configured to connect to a charger to charge the electronic device 100, or may be used for data transmission between the electronic device 100 and a peripheral device, or may be configured to connect to a headset, to play audio by using the headset. Alternatively, the port may be configured to connect to another electronic device, for example, an AR device.

It may be understood that an interface connection relationship between modules illustrated in this embodiment of this application is merely an example for description, and does not constitute a limitation on the structure of the electronic device 100. In some other embodiments of this application, the electronic device 100 may alternatively use an interface connection mode different from that in the foregoing embodiment, or use a combination of a plurality of interface connection modes.

The charging management module 140 is configured to receive a charging input from the charger. The charger may be a wireless charger or a wired charger. In some embodiments of wired charging, the charging management module 140 may receive a charging input from a wired charger through the USB port 130. In some embodiments of wireless charging, the charging management module 140 may receive a wireless charging input by using a wireless charging coil of the electronic device 100. The charging management module 140 supplies power to the electronic device by using the power management unit 141 while charging the battery 142.

The power management unit 141 is configured to connect to the battery 142, the charging management module 140, and the processor no. The power management unit 141 receives an input from the battery 142 and/or the charging management module 140, and supplies power to the processor no, the internal memory 121, an external memory, the display 194, the camera 193, the wireless communications module 160, and the like. The power management unit 141 may further be configured to monitor parameters such as a battery capacity, a battery cycle count, and a battery health status (electric leakage or impedance). In some other embodiments, the power management unit 141 may alternatively be disposed in the processor no. In some other embodiments, the power management unit 141 and the charging management module 140 may alternatively be disposed in a same device.

A wireless communication function of the electronic device 100 may be implemented by using the antenna 1, the antenna 2, the mobile communications module 150, the wireless communications module 160, the modem processor, the baseband processor, and the like.

The electronic device 100 may implement audio functions, for example, music playback and recording, by using the audio module 170, the speaker 170A, the receiver 170B, the microphone 170C, the headset jack 170D, the application processor, and the like.

The audio module 170 is configured to convert digital audio information into an analog audio signal output, and is further configured to convert an analog audio input into a digital audio signal. The audio module 170 may further be configured to code and decode an audio signal. In some embodiments, the audio module 170 may be disposed in the processor no, or some function modules of the audio module 170 are disposed in the processor no.

The speaker 170A, also referred to as a "horn", is configured to convert an audio electrical signal into a sound signal. The electronic device 100 may be configured to listen to music or answer a hands-free call by using the speaker 170A.

The receiver 170B, also referred to as an "earpiece", is configured to convert an audio electrical signal into a sound signal. When a call is answered or voice information is received by using the electronic device 100, the receiver 170B may be put close to a human ear to receive a voice.

The microphone 170C, also referred to as a "mike" or a "voice tube", is configured to convert a sound signal into an electrical signal. When making a call or sending voice information, a user may make a sound near the microphone 170C through the mouth of the user, to input a sound signal to the microphone 170C. One or more microphones 170C may be disposed in the electronic device 100. In some other embodiments, two microphones 170C may be disposed in the electronic device 100, to implement a noise reduction function, in addition to collecting a sound signal. In some other embodiments, three, four, or more microphones 170C may alternatively be disposed in the electronic device 100, to collect a sound signal and reduce noise. The microphones may further identify a sound source, to implement a directional recording function, and the like.

The headset jack 170D is configured to connect to a wired headset. The headset jack 170D may be the USB port 130 or a 3.5-mm open mobile terminal platform (open mobile terminal platform, OMTP) standard interface or a cellular telecommunications industry association of the USA (cellular telecommunications industry association of the USA, CTIA) standard interface.

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and render an image. The processor no may include one or more GPUs that execute program instructions to generate or change display information.

The display 194 is configured to display an image, a video, and the like. The display 194 includes a display panel. The display panel may use a liquid crystal display (liquid crystal display, LCD), an organic light-emitting diode (organic light-emitting diode, OLED), an active-matrix organic light-emitting diode or an active-matrix organic light-emitting diode (active-matrix organic light emitting diode, AMOLED), a flex light-emitting diode (flex light-emitting diode, FLED), a Miniled, a MicroLed, a Micro-oLed, a quantum dot light-emitting diode (quantum dot light emitting diodes, QLED), or the like. In some embodiments, the electronic device 100 may include one or N displays 194, where N is a positive integer greater than 1.

The electronic device 100 can implement a shooting function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a shooting scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or N cameras 193, where N is a positive integer greater than 1.

The digital signal processor is configured to process a digital signal, and may further process another digital signal in addition to a digital image signal. For example, when the electronic device 100 selects a frequency, the digital signal processor is configured to perform Fourier transform and the like on frequency energy.

The video codec is configured to compress or decompress a digital video. The electronic device 100 may support one or more types of video codecs. In this way, the electronic device 100 can play or record videos in a plurality of encoding formats, for example, moving picture experts group (moving picture experts group, MPEG)-1, MPEG-2, MPEG-3, MPEG-4, and the like.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 100, for example, image recognition, facial recognition, speech recognition, and text understanding, can be implemented by using the NPU.

The external memory interface 120 may be configured to connect to an external storage card, for example, a micro SD card, to extend a storage capability of the electronic device 100. The external storage card communicates with the processor no through the external memory interface 120, to implement a data storage function. For example, files such as music and a video are stored in the external storage card.

The internal memory 121 may be configured to store computer-executable program code. The executable program code includes instructions. The processor no runs the instructions stored in the internal memory 121 to perform various function applications of the electronic device 100 and process data. The internal memory 121 may include a program storage area and a data storage area. The program storage area may store an operating system, an application required by one or more functions (for example, a sound playing function and an image playing function), and the like. The data storage area may store data (such as audio data and a phone book) created when the electronic device 100 is used, and the like. In addition, the internal memory 121 may include a high-speed random access memory, and may further include a nonvolatile memory, for example, one or more magnetic disk storage devices, a flash memory device, or a universal flash storage (universal flash storage, UFS).

The button 190 includes a power button, a volume button, and the like. The button 190 may be a mechanical button, or may be a touch button. The electronic device 100 may receive a button input, and generate a button signal input related to user settings and function control of the electronic device 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted in the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into the same SIM card interface 195 at the same time. The plurality of cards may be of a same type or of different types. The SIM card interface 195 may also be compatible with different types of SIM cards. The SIM card interface 195 may also be compatible with an external storage card. The electronic device 100 interacts with a network through the SIM card, to implement functions such as calling and data communication. In some embodiments, the electronic device 100 uses an eSIM, namely, an embedded SIM card. The eSIM card may be embedded in the electronic device 100, and cannot be separated from the electronic device 100.

A software system of the electronic device 100 may use a layered architecture, an event-driven architecture, a microkernel architecture, a micro service architecture, or a cloud architecture. In an embodiment of this application, an Android system with a layered architecture is used as an example to describe a software structure of the electronic device 100.

Figure 2:
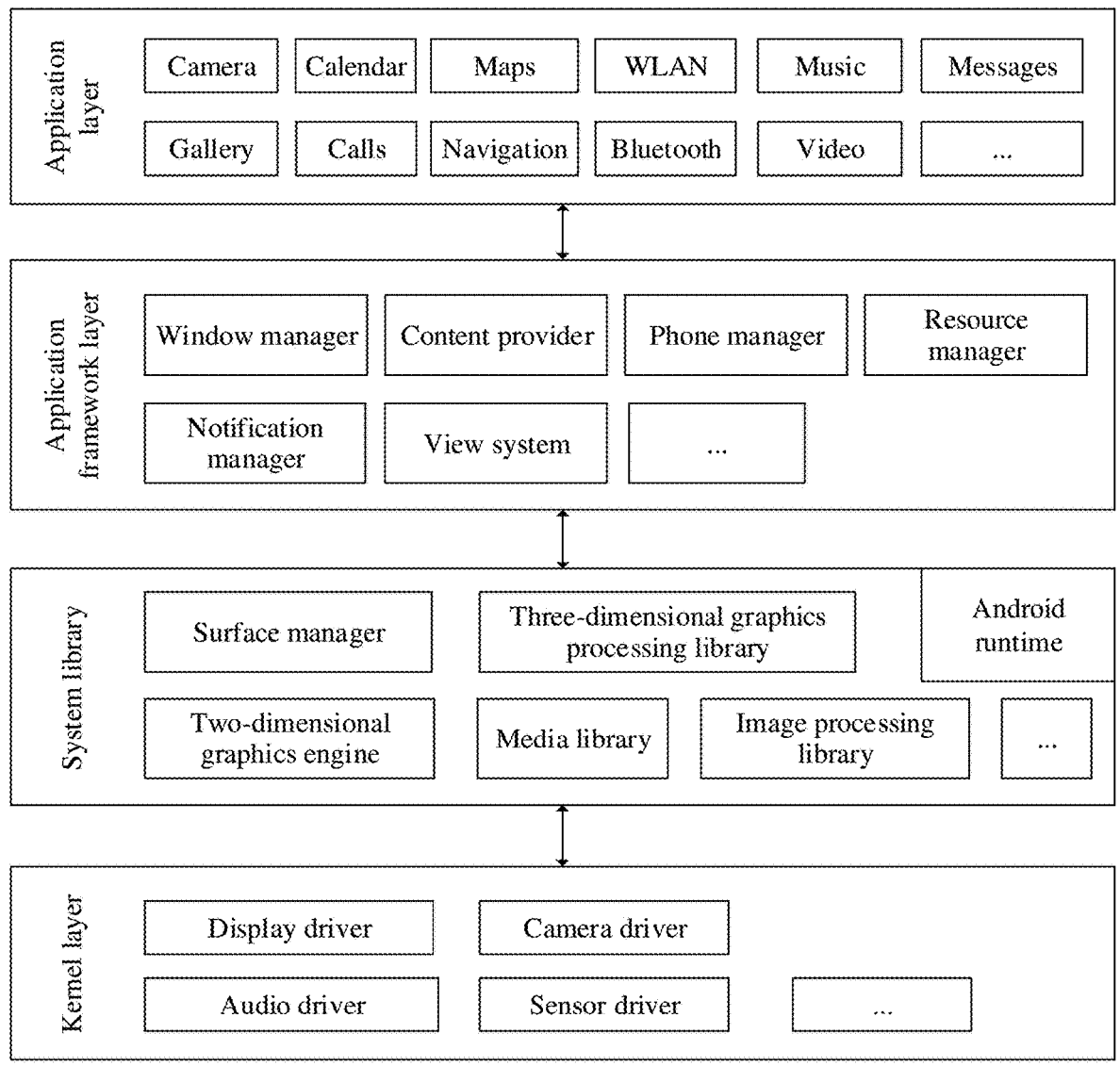
FIG. 2 is a block diagram of a software structure of an electronic device according to an embodiment of this application.

FIG. 2 is a block diagram of the software structure of the electronic device 100 according to this embodiment of this application. In the layered architecture, software is divided into several layers, and each layer has a clear role and task. The layers communicate with each other through a software interface. In some embodiments, the Android system is divided into four layers: an application layer, an application framework layer, an Android runtime (Android runtime), a system library, and a kernel layer from top to bottom. The application layer may include a series of application packages.

As shown in FIG. 2, the application packages may include applications such as "camera", "gallery", "calendar", "phone", "maps", "navigation", "WLAN", "Bluetooth", "music", "videos", and "messages".

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to store and obtain data, and enable the data to be accessed by an application. The data may include a video, an image, audio, calls that are made and received, a browsing history, a bookmark, an address book, and the like.

The view system includes visual controls such as a control for displaying a text and a control for displaying a picture. The view system may be configured to construct an application. A display interface may include one or more views. For example, a display interface including an SMS message notification icon may include a text display view and a picture display view.

The phone manager is configured to provide a communication function of the electronic device 100, for example, management of a call status (including answering, declining, or the like).

The resource manager provides various resources for an application, for example, a localized character string, an icon, a picture, a layout file, and a video file.

The notification manager enables an application to display notification information in a status bar, and may be configured to convey a notification message. The notification manager may automatically disappear after a short pause without user interaction. For example, the notification manager is configured to notify download completion, give a message prompt, and the like. The notification manager may alternatively be a notification that appears in a top status bar of the system in a form of a graph or a scroll bar text, for example, a notification of an application running on the background or a notification that appears on the screen in a form of a dialog window. For example, text information is prompted in the status bar, a prompt tone is produced, the electronic device vibrates, or an indicator light blinks.

The Android runtime includes a kernel library and a virtual machine. The Android runtime is responsible for scheduling and management of the Android system.

The kernel library includes two parts: One is a function that needs to be called by a Java language, and the other is a kernel library of Android.

The application layer and the application framework layer run in the virtual machine. The virtual machine executes Java files of the application layer and the application framework layer as binary files. The virtual machine is configured to perform functions such as object lifecycle management, stack management, thread management, security and exception management, and garbage collection.

The system library may include a plurality of function modules, for example, a surface manager (surface manager), a media library (media libraries), a three-dimensional graphics processing library (for example, OpenGL ES), and a 2D graphics engine (for example, SGL).

The surface manager is configured to manage a display subsystem and provide fusion of 2D and 3D image layers for a plurality of applications.

The media library supports playback and recording of a plurality of commonly used audio and video formats, static image files, and the like. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

In this embodiment of this application, referring to FIG. 2, the system library may further include an image processing library. After a camera application is started, the camera application may obtain an image captured by the electronic device.

Before the technical solutions in the embodiments of this application are described, an MTP and a PTP in the embodiments of this application are first described.

The MTP/PTP is a media/picture transfer protocol defined by Microsoft. Currently, on an Android device or another device, a responder of the MTP protocol is this device. Currently, an MTP/PTP implementation mechanism of an Android (Android) system is based on feeding back a directory and a file structure that are recorded in a media database to a personal computer (personal computer, PC), and the PC (referred to as an initiator in a protocol) queries a sub-element in each directory, to achieve directory management experience similar to that on the PC. The PTP restricts, only on protocol, that a camera and a screenshot directory can be viewed on the PC. An implementation principle and a mechanism are the same as those of the MTP.

Figure 3:
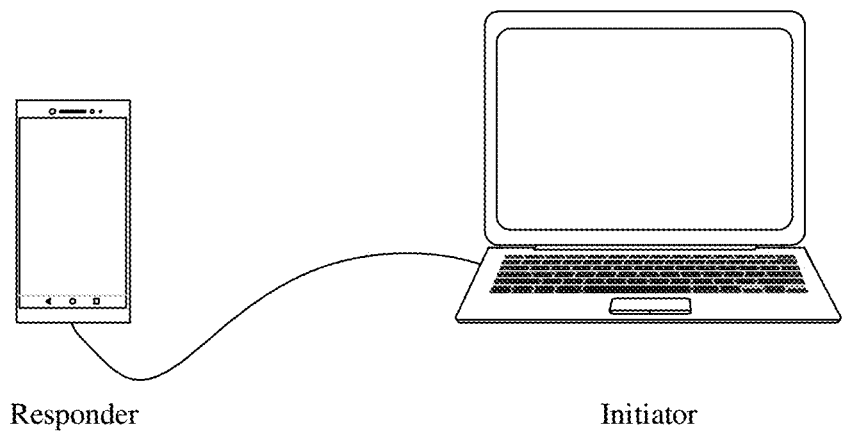
FIG. 3 is a schematic diagram of an initiator and a responder according to an embodiment of this application.

In application, the PTP/MTP is used as two roles: an initiator (initiator) and a responder (responder). FIG. 3 is a schematic diagram of the initiator and the responder.

Optionally, the initiator may be a USB host, for example, a PC or a notebook computer. According to the protocol, all PTP/MTP operations can be initiated only by the initiator.

Optionally, the responder may be a device, such as a digital camera or a smartphone, that stores a media file. In the MTP, the responder processes a request initiated by the initiator. In addition, the responder sends, based on a status change of the responder, an event (event) to notify the initiator.

Figure 4:
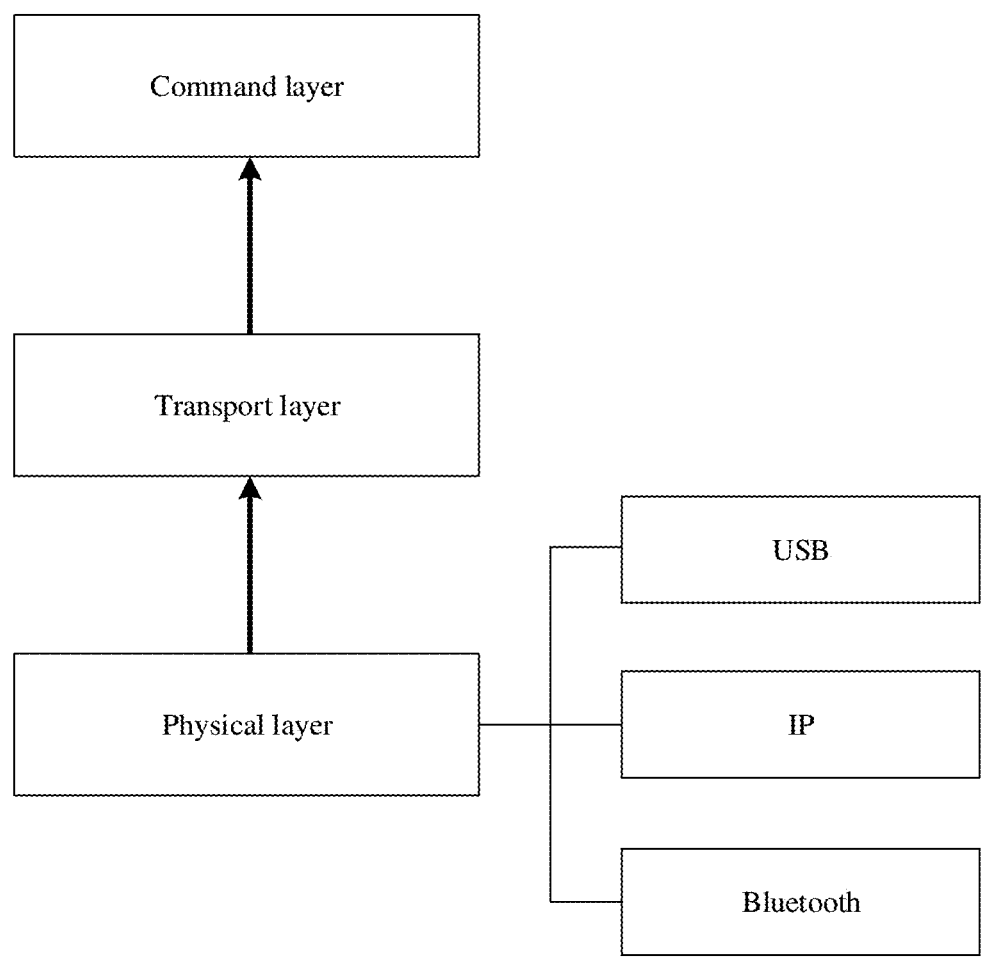
FIG. 4 is a schematic diagram of a protocol stack of an MTP.

FIG. 4 is a schematic diagram of a protocol stack of the MTP. The protocol stack of the MTP includes a physical layer (physical layer), a transport layer (transport layer), and a command layer (command layer) from bottom to top.

Physical layer: The physical layer is used to transmit data in the MTP protocol. Currently, there are three types of physical layers that can be used by the MTP. The three types of physical layers are respectively a universal serial bus (universal serial bus, USB), an Internet protocol (internet protocol, IP), and Bluetooth (Bluetooth).

USB: The USB has a main feature of transferring files, synchronizes a media file quickly, and can be charged while working, which is a most widely used method at present.

IP: An IP-based MTP (MTP/IP for short) uses universal plug and play (universal plug and play, UPnP) to match and discover a device. The IP is a perfect transmission mode in a home network.

Bluetooth: MTP/BT is a most power-saving and slowest transmission mode, which is seldom used.

Transport layer: In the MTP, a data transmission format complies with the PTP protocol.

Command layer: The command layer implements various commands in the MTP protocol.

For ease of understanding, in the following embodiments of this application, the intelligent classification method provided in the embodiments of this application is described in detail with reference to the accompanying drawings by using an example in which a mobile phone having the structures shown in FIG. 1 and FIG. 2 is used as a responder and a notebook computer is used as an initiator.

Figures 1, 5A:
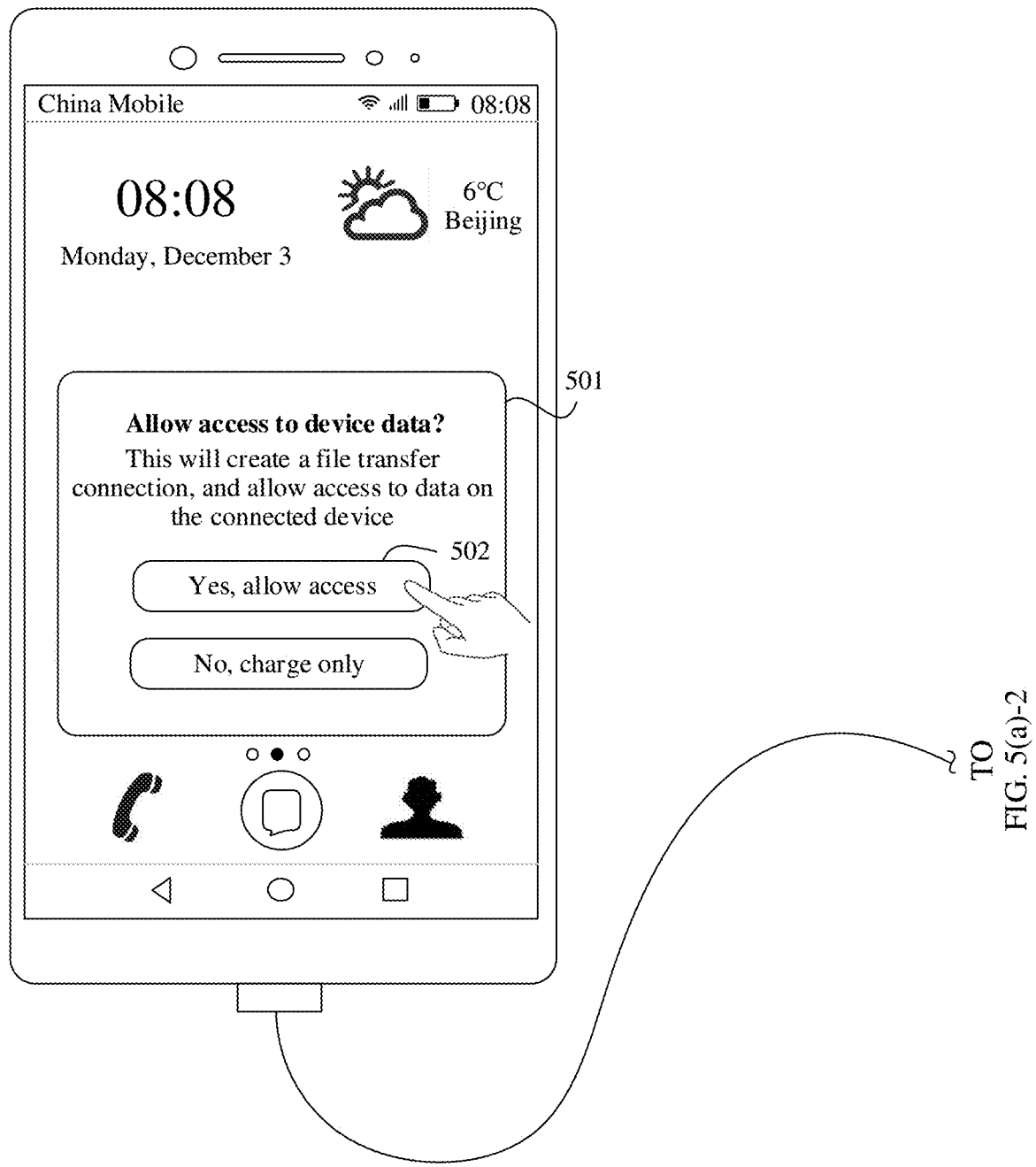
Figures 2, 5A:
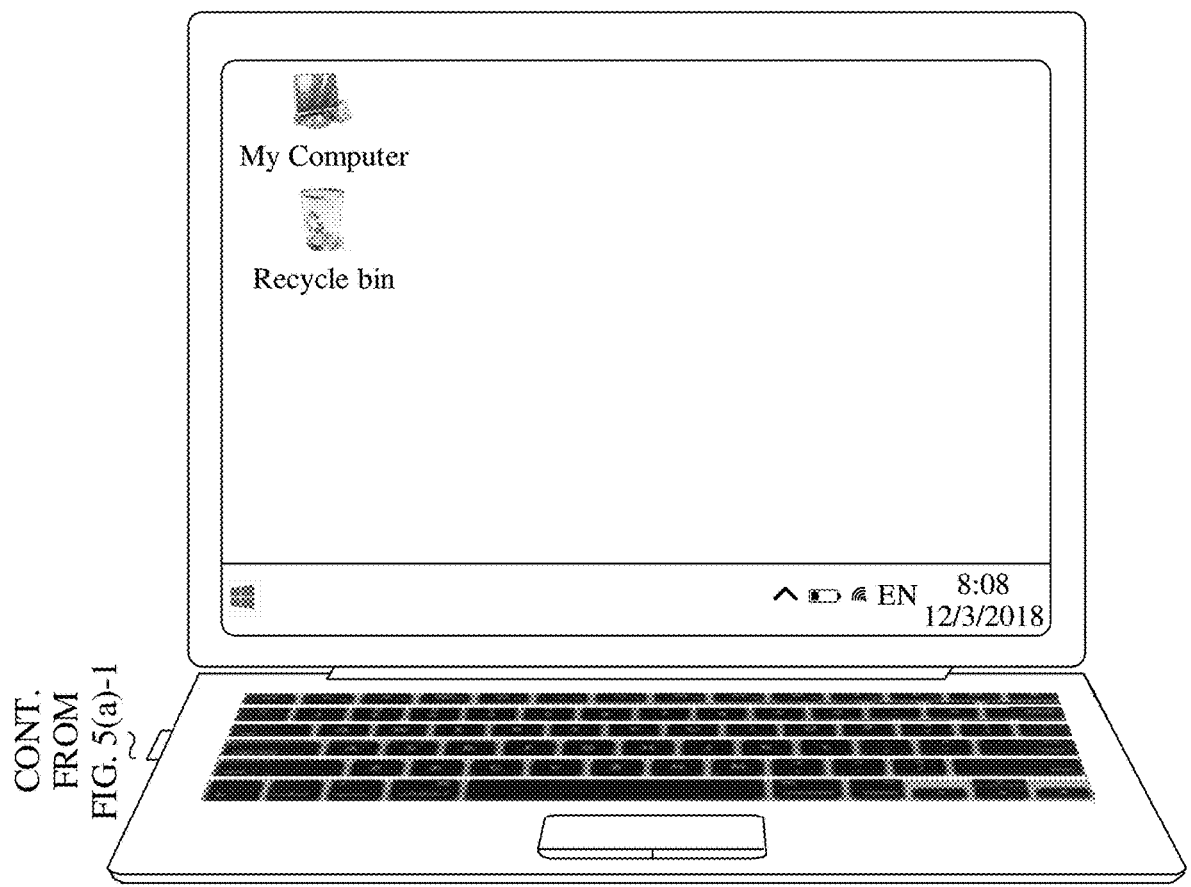
Figures 1, 5B:
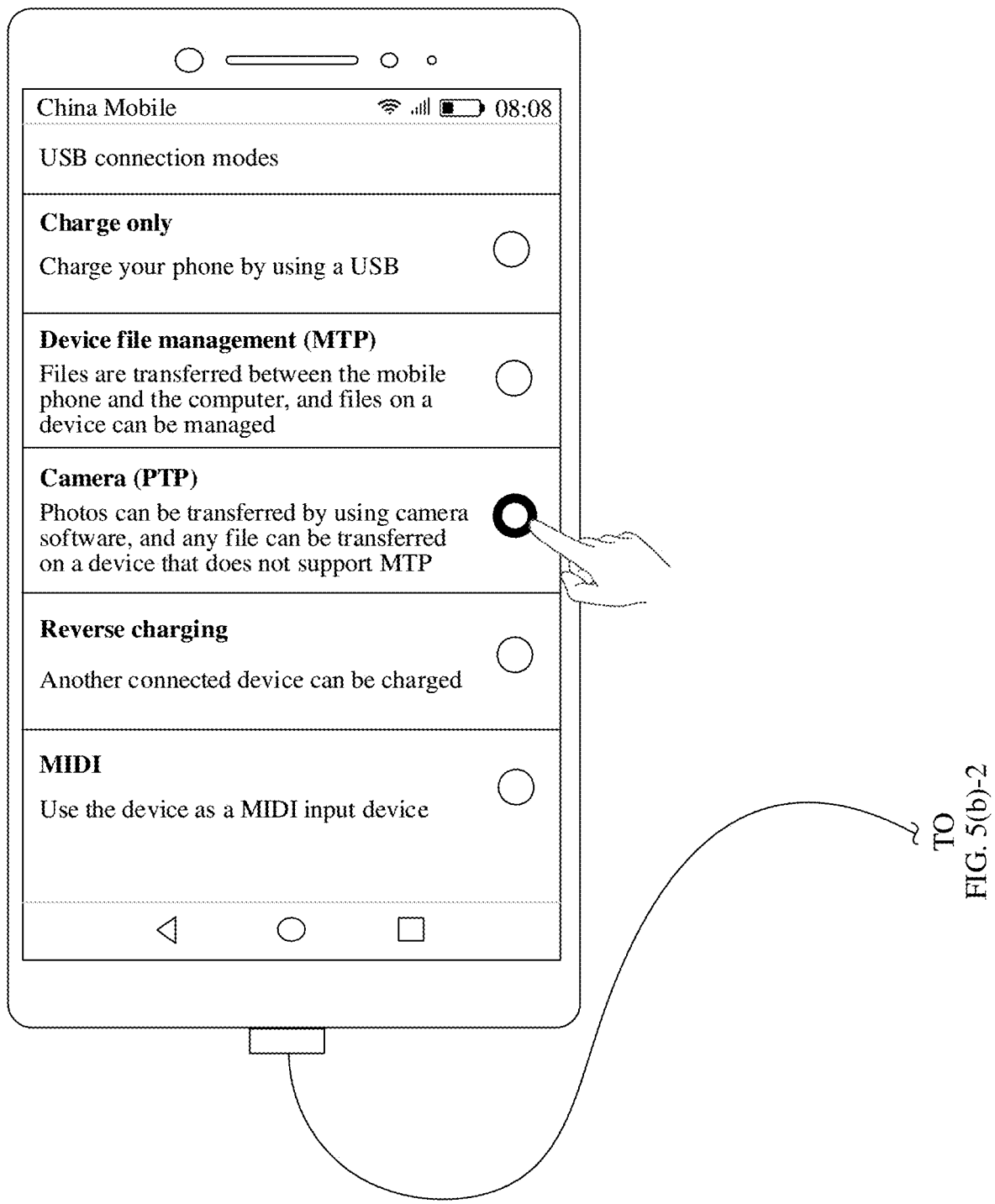
Figures 2, 5B:
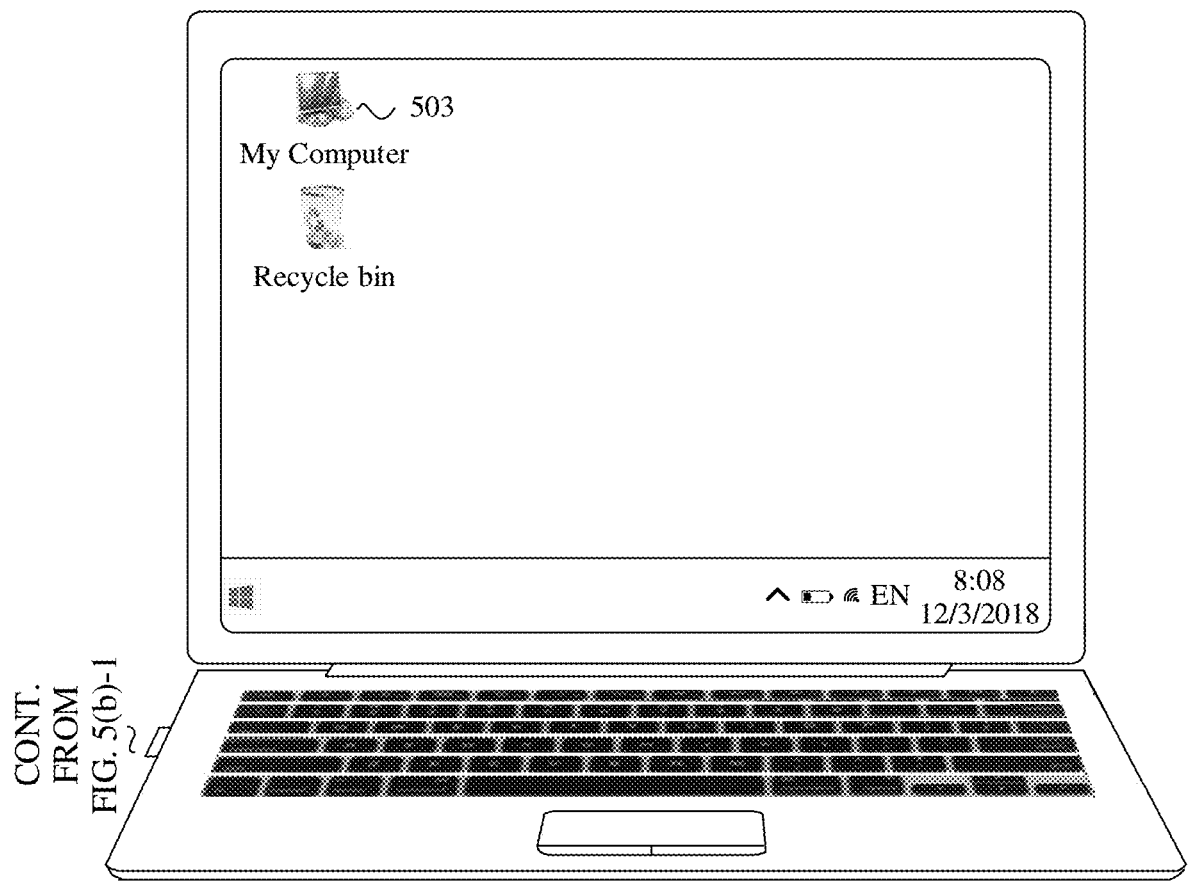
Figure 5C:
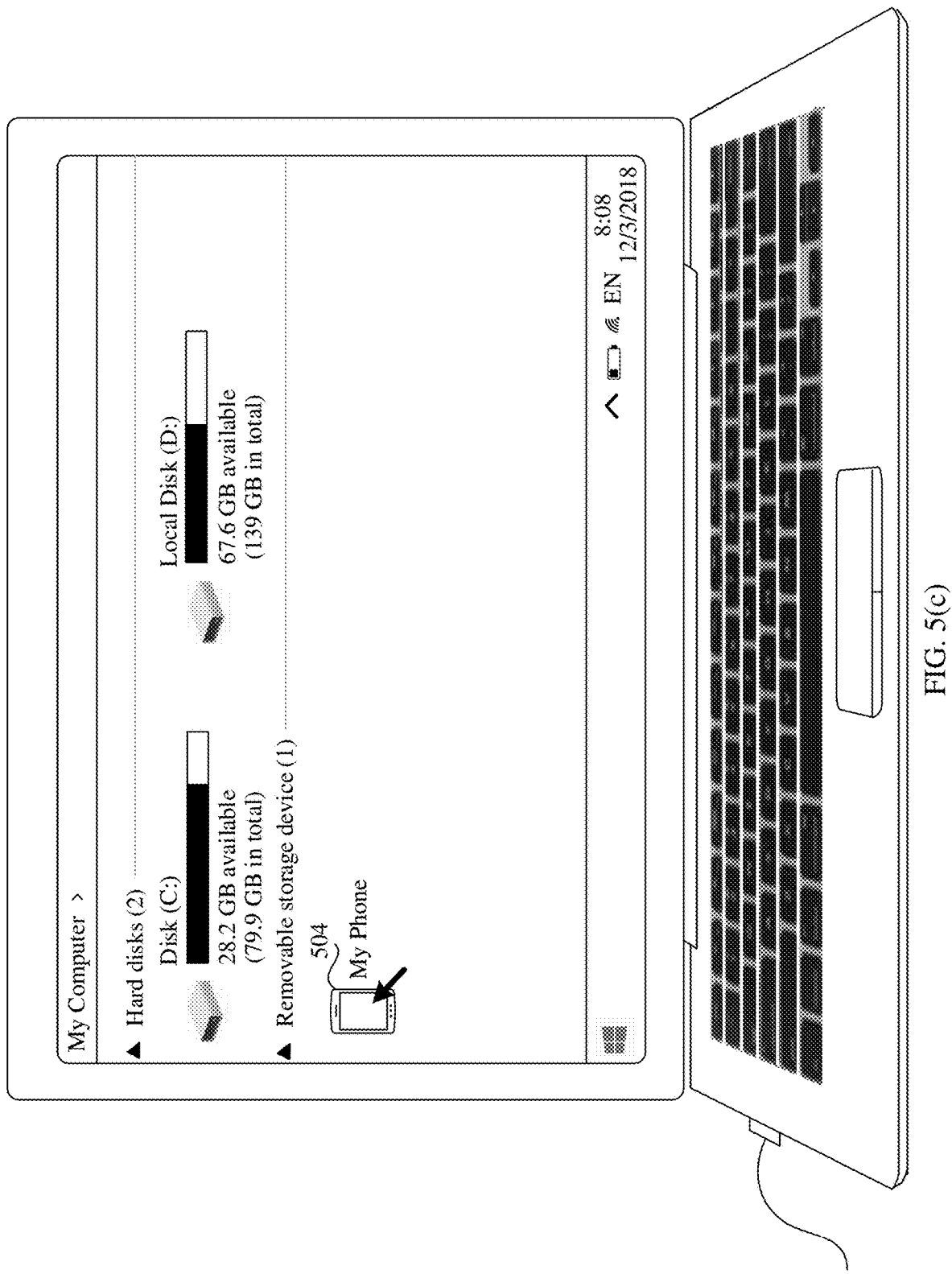
Figure 5D:
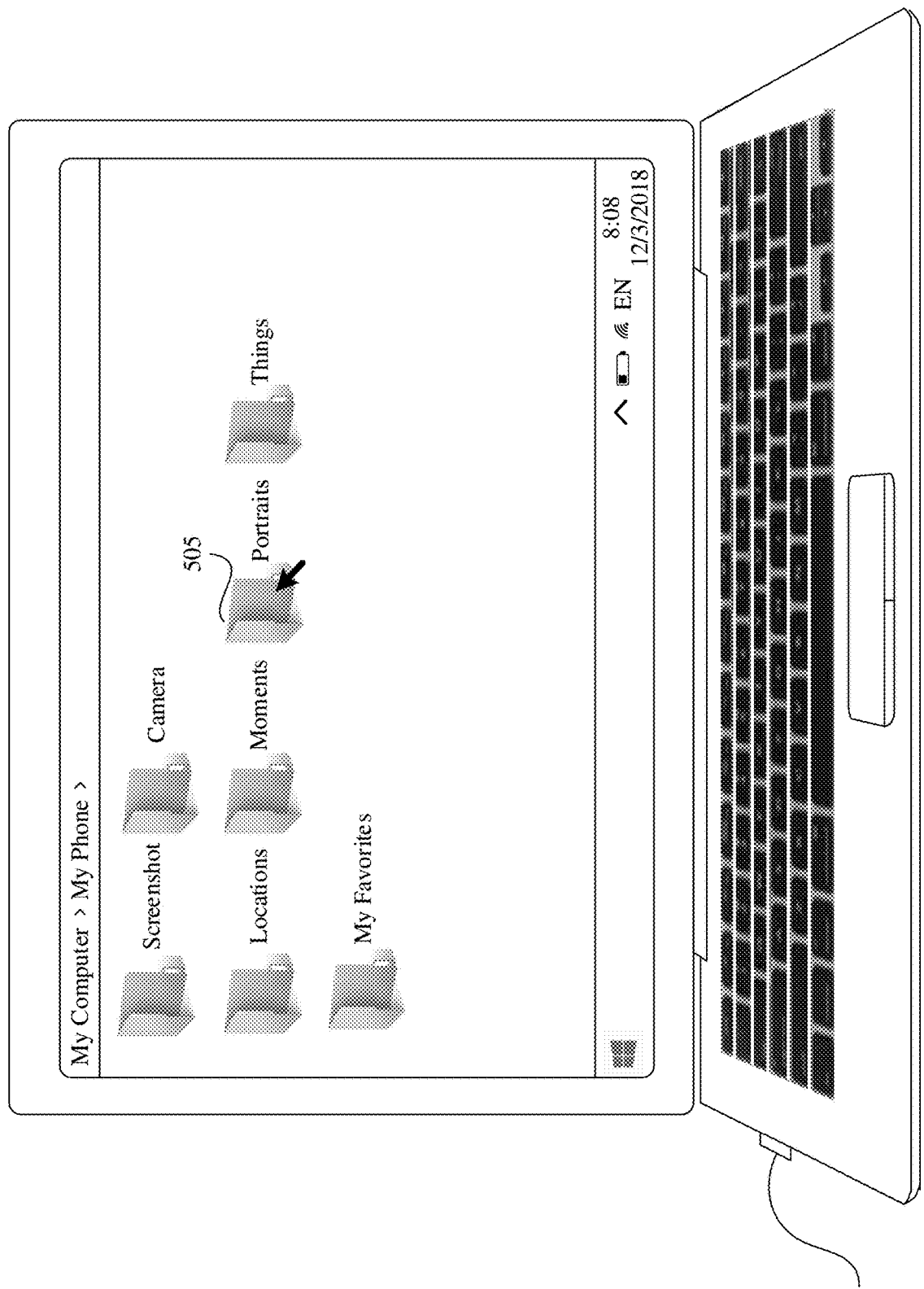
Figure 5E:
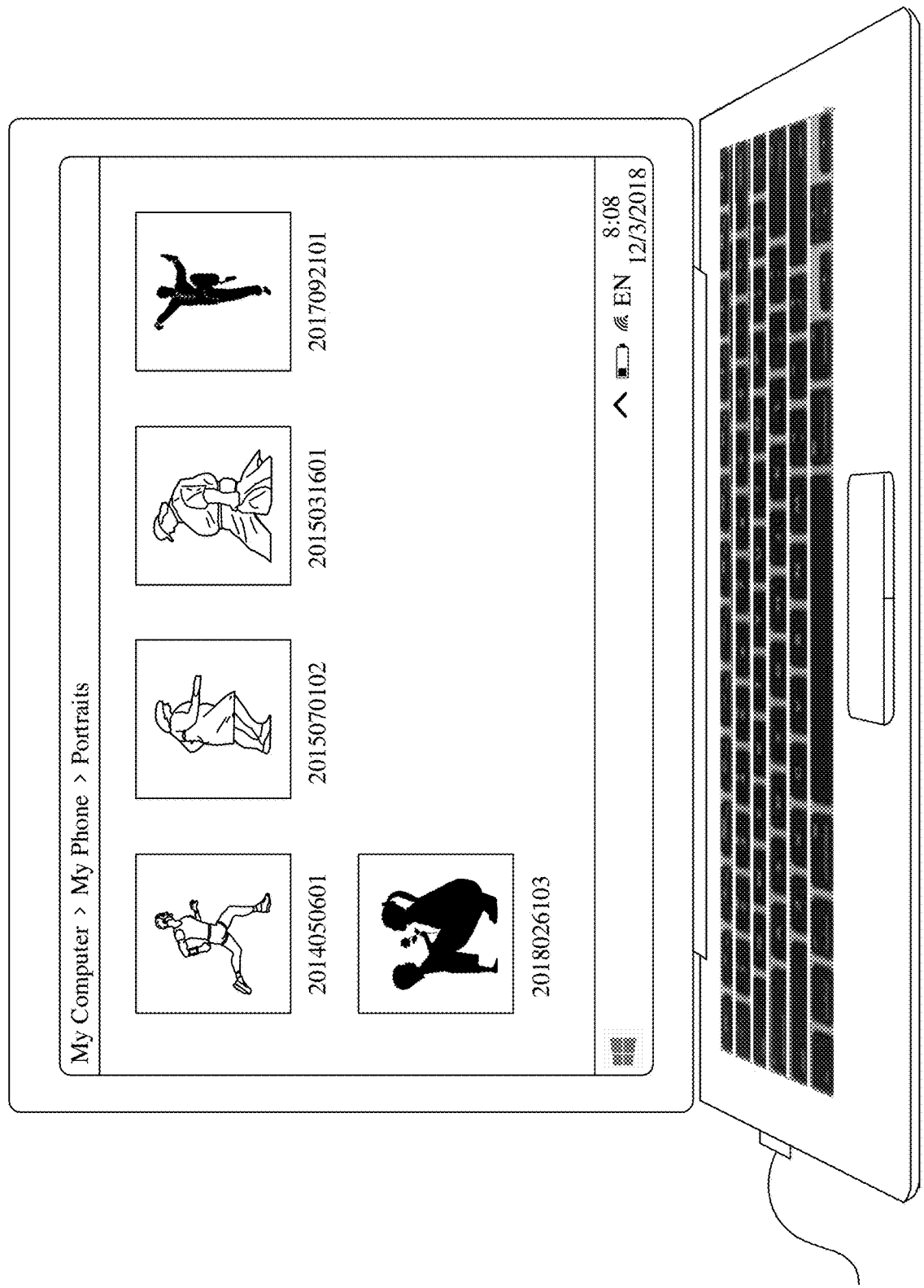
Figure 5F:
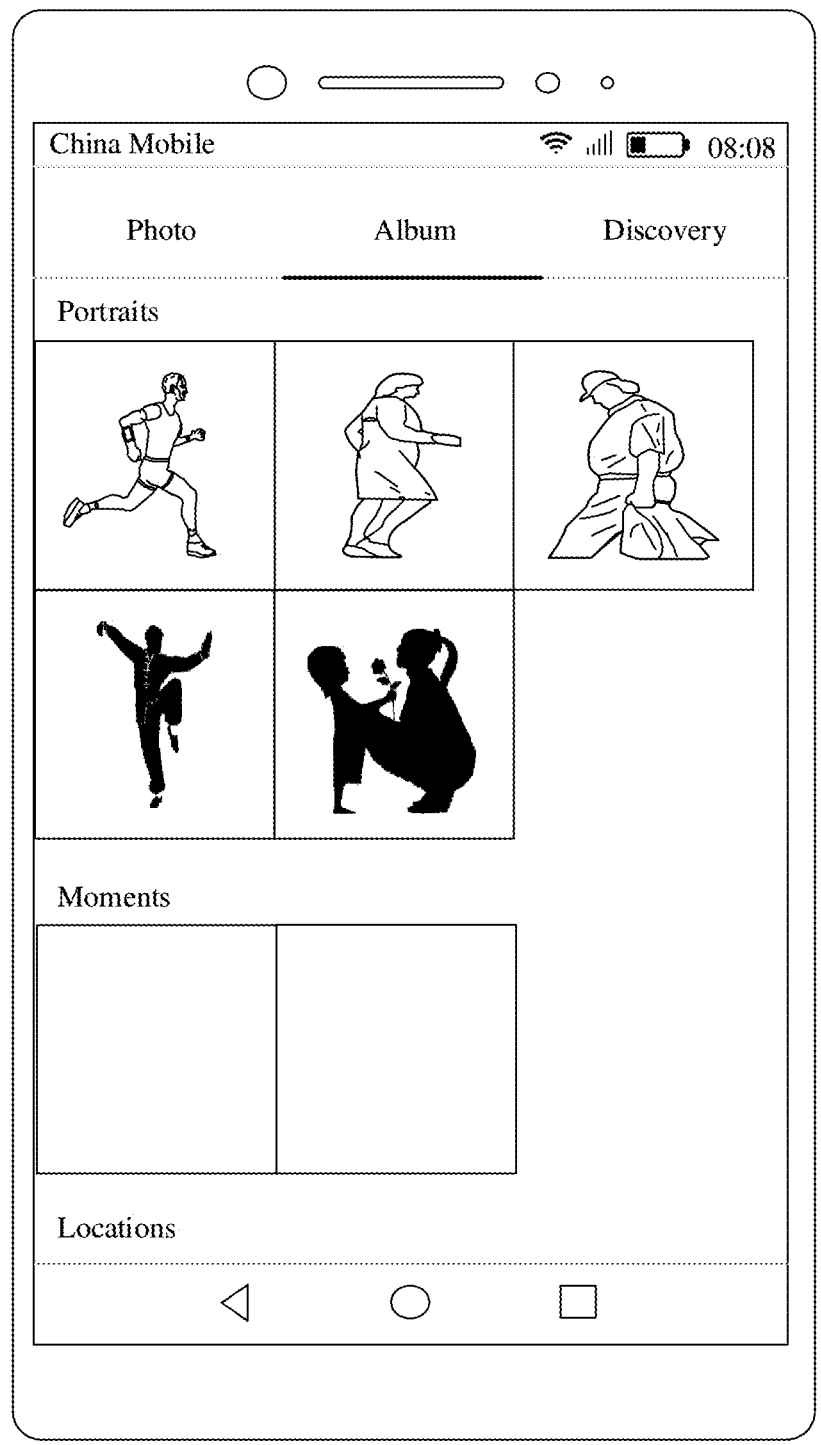

FIG. 5(a)-1 to FIG. 5(f) show a group of graphical user interfaces (graphical user interface, GUI). FIG. 5(a)-1 to FIG. 5(e) show a process from connecting a mobile phone to a computer to displaying intelligent classification on the computer.

Referring to FIG. 5(a)-1, after the mobile phone is connected to the computer, the mobile phone may display a window 501 on a touchscreen to prompt a user "Allow access to device data?". The window 501 further includes a text prompt "This will create a file transfer connection, and allow access to data on the connected device". After detecting that the user taps a control 502, the mobile phone determines that the computer needs to access the data on the mobile phone, and displays a GUI of the mobile phone in FIG. 3(b)-1.

In the GUI shown in FIG. 5(b)-1, the mobile phone prompts, by using the touchscreen, the user to select a "USB connection mode". Table 1 shows several USB connection modes and related functions on the mobile phone.

TABLE 1

USB connection modes and functions thereof

| USB connection modes | Functions |
|---|---|
| Charge only | The mobile phone is charged after the mobile phone is connected to the computer by using a USB |
| Device file management (MTP) | Files are transferred between the mobile phone and the computer, and files on a device can be managed |
| Camera (PTP) | Photos can be transferred by using camera software, and any file can be transferred on a device that does not support the MTP |
| Reverse charging | Another connected device can be charged |
| MIDI | The device is used as an input device with a musical instrument digital interface (musical instrument digital interface, MIDI) |

After the mobile phone detects that the user taps the camera (PTP) mode, PTP protocol transmission is performed between the mobile phone and the computer. After the computer detects that the user double-clicks an icon 503, the mobile phone opens My Computer, and a GUI shown in FIG. 5(c) is displayed.

Referring to FIG. 5(c), a directory of "My Computer" includes two hard disks (a disk (C:) and a local disk (D:))

and one removable hard disk (My Phone). When the computer detects that the user double-clicks a "My Phone" icon 504, a GUI shown in FIG. 5(d) is displayed.

Referring to FIG. 5(d), a directory of "My Phone" includes six folders: a "Screenshot (screenshot)" folder, a "Camera (camera)" folder, a "Locations" folder, a "Moments" folder, a "Portraits" folder 505, a "Things" folder, and a "My Favorites" folder. After the computer detects that the user double-clicks the "Portraits" folder 505, a GUI shown in FIG. 5(e) is displayed. It should be understood that this embodiment of this application is described merely by using the foregoing five classification modes as an example. Actually, the mobile phone may have another classification mode. Correspondingly, classification modes displayed on the computer are not limited to the foregoing five classification modes.

It should be understood that the "Camera" folder stores all photos and videos taken by using a camera of the mobile phone, and the "Screenshot" folder stores all photos obtained through screenshot in the mobile phone.

Referring to FIG. 5(e), the "Portrait" folder includes five photos, and all the five photos are portrait photos.

For an intelligent classification interface in the mobile phone, refer to FIG. 5(f). After detecting an operation of opening an album by the user, the mobile phone may display an image set about "portrait". The image set about "portrait" includes five photos.

According to the intelligent classification method in this embodiment of this application, after the mobile phone is connected to the computer, a result of intelligent classification performed on photos may be displayed on the computer. This provides convenience for the user and user experience is relatively good.

In an embodiment, the mobile phone may further classify stored images related to portraits. After the computer detects that the user clicks the portrait folder, a finer classification result may be displayed on the PC.

Figure 6A:
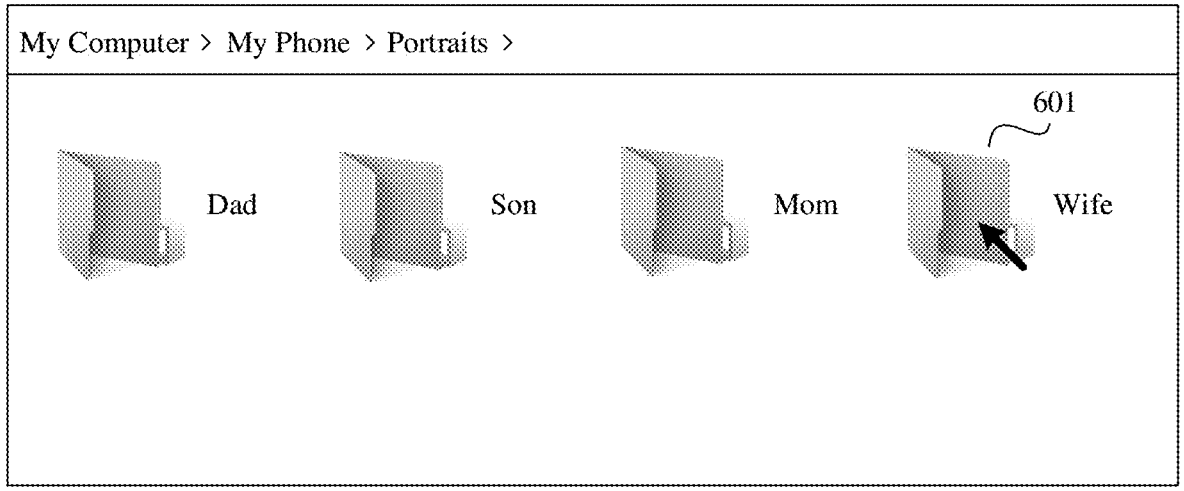
FIG. 6(a) to FIG. 6(d) are a schematic diagram of another group of graphical user interfaces according to an embodiment of this application.

Referring to a GUI shown in FIG. 6(a), when the computer detects that the user double-clicks the portrait folder in "My Phone", the GUI shown in FIG. 6(a) is displayed. The portrait folder includes four folders, and the folders are respectively named "Dad", "Son", "Mom", and "Wife". When the computer detects that the user clicks the folder named "Wife", a GUI shown in FIG. 6(b) is displayed.

Figure 6B:
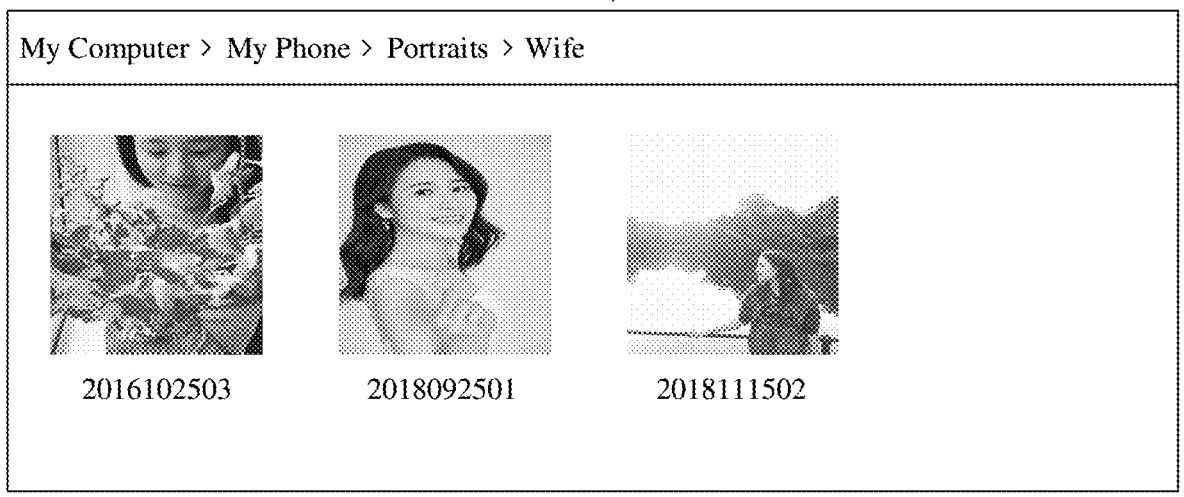

Referring to the GUI shown in FIG. 6(b), the folder 601 named "Wife" includes three photos of a wife, and the three photos are respectively named "2016102503", "2018092501", and "2018111502".

Figure 6C:
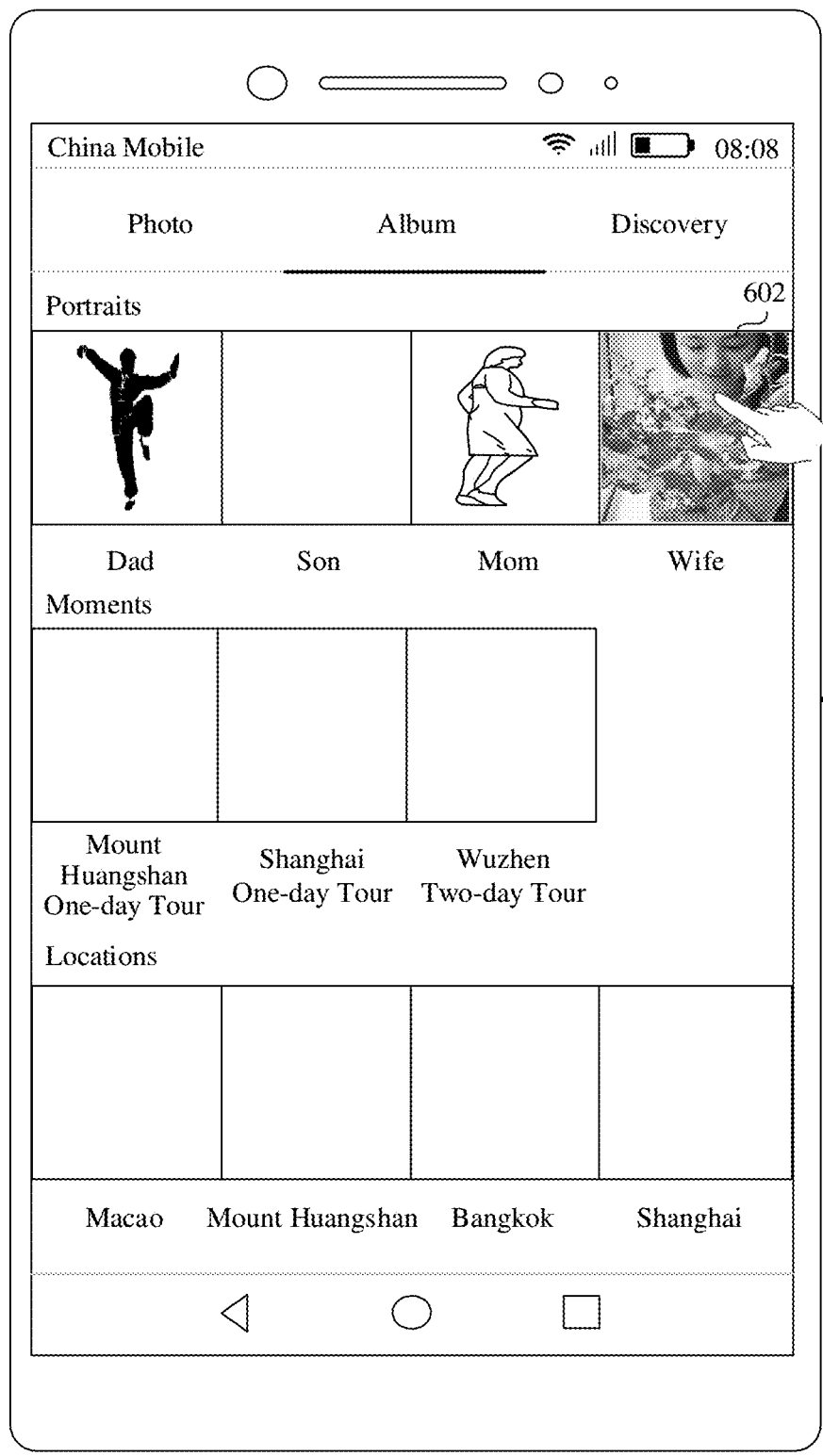

For an intelligent classification interface in the mobile phone, refer to FIG. 6(c). After detecting an operation of opening an album by the user, the mobile phone may display image sets about "Portraits", "Moments", "Locations", "Things", and the like. The image set about "Portrait" is further subdivided into image sets about "Dad", "Son", "Mom", "Wife", and the like.

Figure 6D:
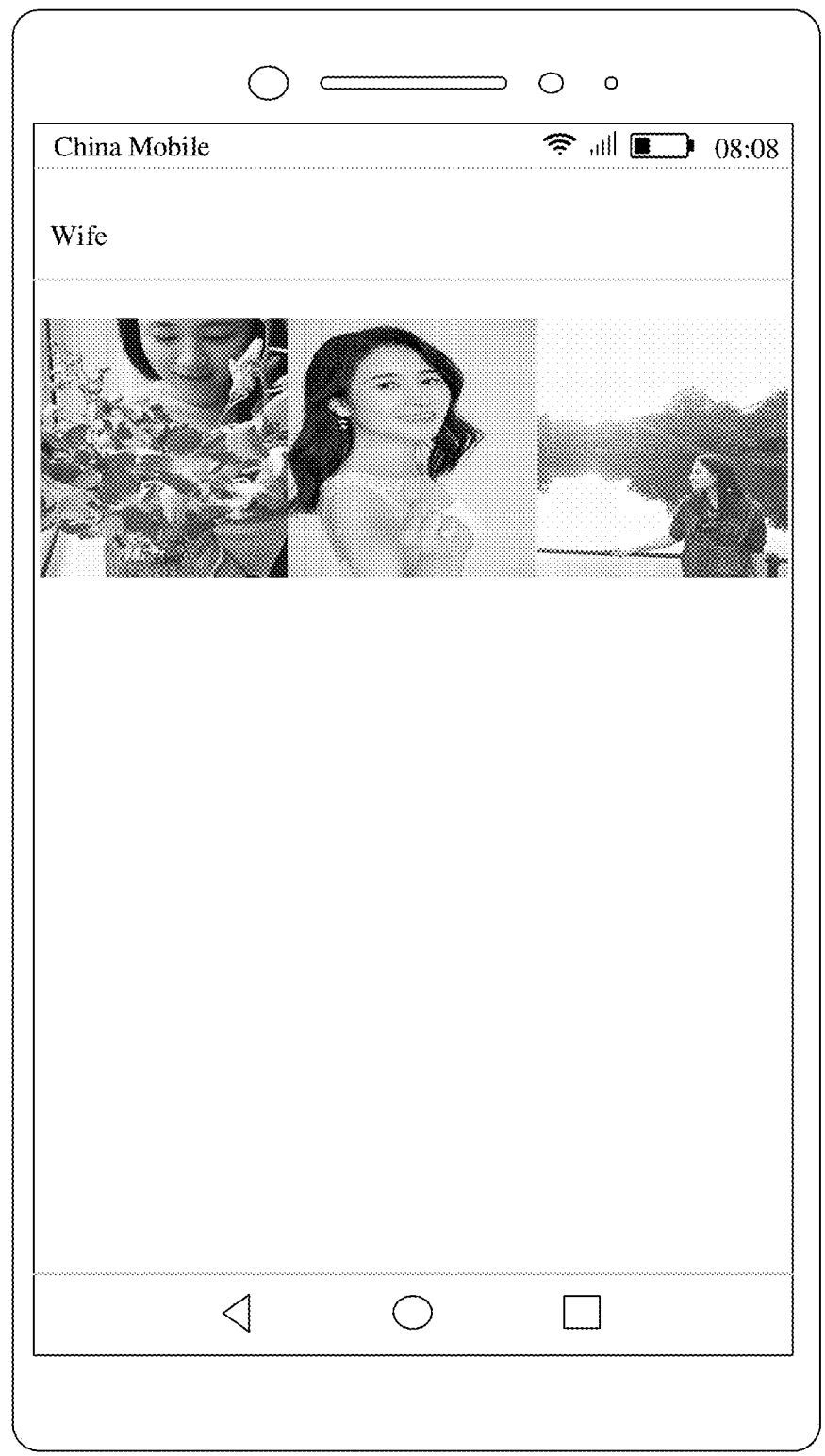

When the mobile phone detects an operation of tapping a cover photo 602 of the "Wife" image set by the user, a GUI shown in FIG. 6(d) is displayed. The "Wife" image set includes three photos.

It should be understood that the three photos in the "Wife" folder may be taken by the user by using the mobile phone and stored in the album, or may be sent by another person to the user by using a social application (for example, QQ or WeChat) and then stored by the user locally.

It should be understood that, in this embodiment of this application, the classification of the photos related to portraits is merely an example, and there may be another classification mode. For example, the photos related to portraits may alternatively be classified based on genders. After the portrait folder is opened, folders named "Male" and "Female" are displayed. The folder named "Male" may be subdivided into folders named "Dad", "Son", and the like, and the folder named "Female" may be subdivided into folders named "Mom", "Wife", "Daughter", and the like. For another example, the photos related to portraits may alternatively be classified based on a quantity of persons. After the portrait folder is opened, folders named "Single person" and "Group photo" are displayed. This is not limited in this embodiment of this application.

It should be further understood that names of the four folders shown in FIG. 6(a) may be sorted based on initial letters of first Chinese characters of the names (for example, a sequence of the initial letters in the 26 English letters). For example, the initial letter of the Pinyin of a Chinese character "Ba" in "Baba" (Dad) is B, the initial letter of the Pinyin of a Chinese character "Er" in "Erzi" (Son) is E, the initial letter of the Pinyin of a Chinese character "Ma" in "Mama" (Mom) is M, and the initial letter of the Pinyin of a Chinese character "Qi" in "Qizi" (Wife) is Q. In this way, the folders sequentially displayed from left to right on the GUI are "Dad", "Son", "Mom", and "Wife".

It should be further understood that, on a premise that initial letters are the same, sorting may be performed based on second letters, and when the first Chinese characters are the same, sorting may be performed based on initial letters of second Chinese characters, and so on.

In an embodiment, after the computer displays a classification result of a type of images and detects an operation of the user, photos of this type in the mobile phone are copied to the local computer. Referring to a GUI shown in FIG. 7(a), when the computer detects that the user selects the three photos in the folder named "Wife", and after the computer detects that the user right-clicks a mouse (or after the computer detects that the user right-clicks a button 703 in a touch area of the notebook computer), a menu 701 is displayed. After the computer detects an operation of clicking a menu option 702 by the user, the computer copies the three photos.

Referring to a GUI shown in FIG. 7(b), when the computer detects that the user opens a folder named "Wife" in the local disk (D:), and after the computer detects that the user right-clicks the mouse (or after the computer detects that the user right-clicks the button 703 in the touch area of the notebook computer), a menu 704 is displayed. After the computer detects an operation of clicking a menu option 705 by the user, the computer copies the three photos to the folder named "Wife" in the local disk (D:), and displays a GUI shown in FIG. 7(c).

In an embodiment, the mobile phone may further classify images based on moments. The moments may include images shot by the user in a specific place on a specific day or several days. After the mobile phone is connected to the computer, the moments classified by the mobile phone may be displayed on the computer.

Figure 8A:
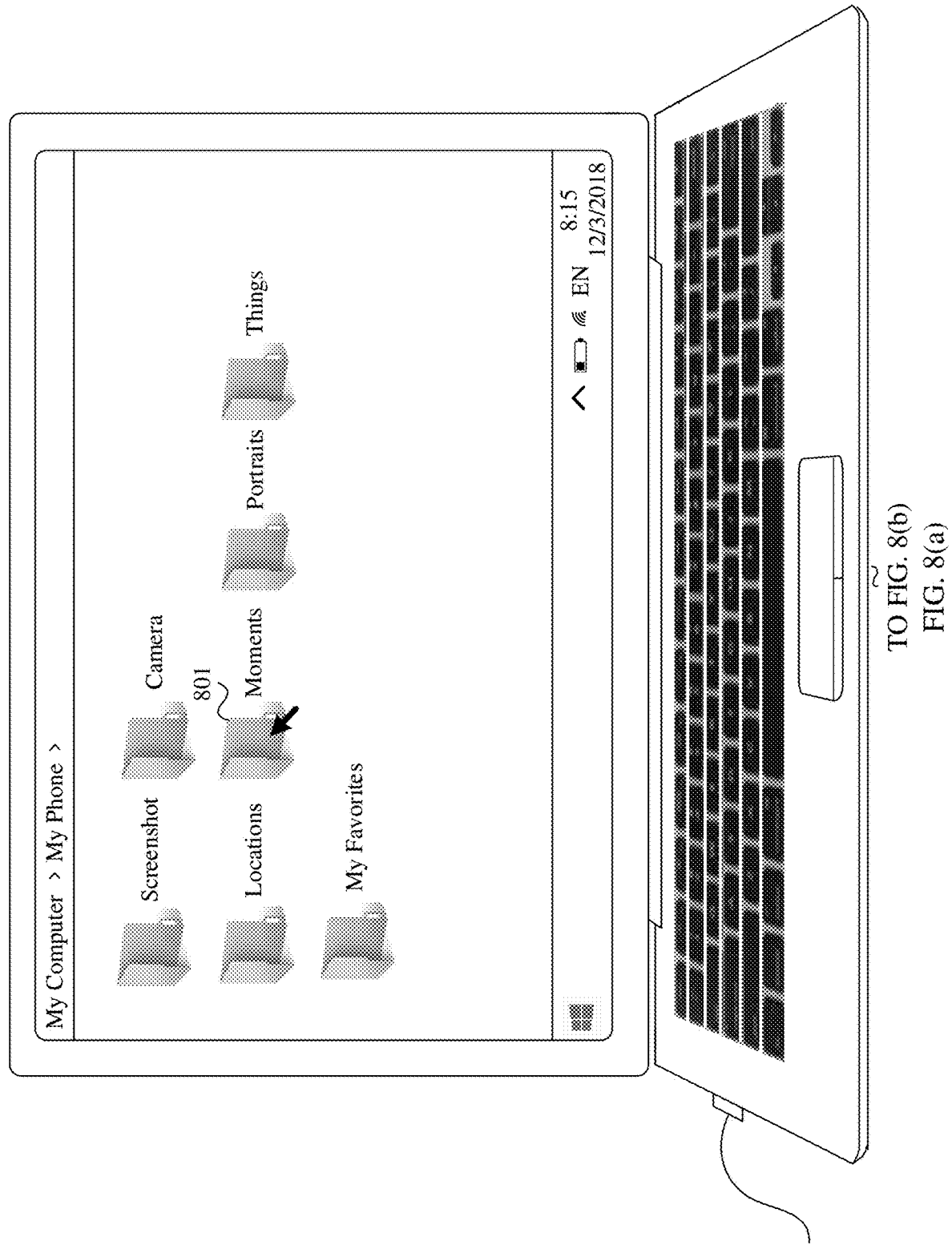

Referring to a GUI shown in FIG. 8(a), "My Phone" includes a folder 801 named "Moments". After the computer detects that the user double-clicks the folder 801 named "Moments", a GUI shown in FIG. 8(b) is displayed.

Referring to the GUI shown in FIG. 8(b), the folder named "Moments" includes three folders that are respectively named "Mount Huangshan One-day Tour", "Shanghai One-day Tour", and "Wuzhen Two-day Tour". After the computer detects that the user double-clicks the folder 802 named "Mount Huangshan One-day Tour", a GUI shown in FIG. 8(*c*) is displayed.

Referring to the GUI shown in FIG. 8(*c*), the folder named "Mount Huangshan One-day Tour" includes four photos, and all the four photos are related to Mount Huangshan.

In an embodiment, the mobile phone may alternatively classify images based on locations. After the mobile phone is connected to the computer, the computer may display types of the locations classified by the mobile phone.

Referring to a GUI shown in FIG. 9(*a*), "My Phone" includes a folder 901 named "Locations". After the computer detects that the user double-clicks the folder 901 named "Locations", a GUI shown in FIG. 9(*b*) is displayed.

Referring to the GUI shown in FIG. 9(*b*), the folder named "Locations" includes six folders that are respectively named "Macao", "Mount Huangshan", "Bangkok", "Shanghai", "Shenzhen", and "Wuzhen". After the computer detects that the user double-clicks the folder 902 named "Macao", a GUI shown in FIG. 9(*c*) is displayed.

Referring to the GUI shown in FIG. 9(*c*), the folder 902 named "Macao" includes four photos, and all the four photos are related to Macao.

It should be understood that, in this embodiment of this application, a place that appears in the folder 801 named "Moments" may also appear in the folder 901 named "Locations", and images in the folder 801 named "Moments" may be images taken by the user when the user went sightseeing in a specific place on a specific day or several days, and images in the folder 901 named "Locations" may be classified images of all locations where the user appears.

For example, the user lives in Shenzhen for a long time, and took some images when the user went to Mount Huangshan for a trip on a specific day. The mobile phone may classify the images shot on that day as "Mount Huangshan One-day Tour", and store the images in the folder named "Moments". The user can view, on the computer, the images taken when the user went sightseeing in Mount Huangshan.

In an embodiment, the mobile phone may alternatively classify images based on types of things. After the mobile phone is connected to the computer, the computer may display the types of the things classified by the mobile phone.

Referring to a GUI shown in FIG. 10(*a*), "My Phone" includes a folder 1001 named "Things". After the computer detects that the user double-clicks the folder 1001 named "Things", a GUI shown in FIG. 10(*b*) is displayed.

Referring to the GUI shown in FIG. 10(*b*), the folder 1001 named "Things" includes four folders that are respectively named "Pets", "Sea", "Food", and "Sky". After the computer detects that the user double-clicks the folder 1002 named "Sea", a GUI shown in FIG. 10(*c*) is displayed.

Referring to the GUI shown in FIG. 10(*c*), the folder 1002 named "Sea" includes four photos, and all the four photos are related to the sea.

The foregoing describes, with reference to FIG. 5(*a*)-1 to FIG. 10(*c*), processes of displaying intelligent classification on the computer by using the PTP protocol. The following describes, with reference to FIG. 11(*a*)-1 to FIG. 14, processes of displaying intelligent classification on the computer by using the MTP protocol.

Referring to a GUI shown in FIG. 11(*a*)-1, when a mobile phone detects that a user clicks a device file management (MTP) mode, MTP protocol transmission is performed between the mobile phone and the computer; and when the computer detects an operation of double-clicking an icon 303 by the user, the mobile phone opens My Computer. A directory of "My Computer" includes two hard disks (a disk (C:) and a local disk (D:)) and one removable hard disk (My Phone). When the computer detects that the user double-clicks "My Phone", a GUI shown in FIG. 5(*b*) is displayed.

Referring to the GUI shown in FIG. 11(*b*), the directory of "My Phone" includes two storage disks (which are an internal storage 1101 and a secure digital memory card (secure digital memory card, SD) respectively). When the computer detects that the user double-clicks "Internal Storage" 1101, a GUI shown in FIG. 11(*c*) is displayed.

It should be understood that, when the user selects the PTP protocol, after the computer double-clicks "My Phone", the GUI shown in FIG. 5(*d*) may be displayed, where each folder stores images. However, when the user selects the MTP protocol, after the computer double-clicks "My Phone", the GUI shown in FIG. 11(*c*) may be displayed.

Referring to FIG. 11(*c*), the "Internal Storage" includes six folders: an "Android (Android)" folder, an "Application (application)" folder, a "baidu (baidu)" folder, a "Data center infrastructure management (data center infrastructure management, DCIM)" folder, a "Tencent" folder, and a "Categories" folder 1102. After the computer detects that the user double-clicks the "Categories" folder 1102, a GUI shown in FIG. 11(*d*) is displayed.

Referring to the GUI shown in FIG. 11(*d*), the "Gallery" folder includes five folders that are respectively named "Locations", "Moments", "Portraits", "Things", and "My Favorites". After the computer detects that the user double-clicks the folder 1103 named "Portraits", a GUI shown in FIG. 11(*e*) is displayed.

Referring to FIG. 11(*e*), the "Portraits" folder 1103 includes four folders that are respectively named "Dad", "Son", "Mom", and "Wife". After the computer detects that the user double-clicks the folder 1104 named "Wife", a GUI shown in FIG. 11(*f*) is displayed.

Referring to the GUI shown in FIG. 11(*f*), the folder 1104 named "Wife" includes three photos of a wife.

It should be understood that, in this embodiment of this application, an entry for intelligent classification may be added to the mobile phone, namely, an entry obtained after intelligent classification is performed on images stored in the mobile phone. After the mobile phone is connected to the computer, a "Gallery" folder may be displayed on the computer, and the "Gallery" folder includes an intelligent classification result of the images stored in the mobile phone, so that the user can accurately find a photo that needs to be searched for, and user experience is relatively good.

It should be understood that, when FIG. 6(*a*) to FIG. 6(*d*) and FIG. 11(*a*)-1 to FIG. 11(*f*) are used as an example, after the user selects the MTP protocol, if the user wants to search for intelligent classification of images, the user needs to view the intelligent classification of the images in a path "My Computer>My Phone>Internal Storage>Categories". However, after the user selects the PTP protocol, if the user wants to search for the intelligent classification of the images, the user needs view the intelligent classification in a path "My Computer>My Phone".

In an embodiment, a result of intelligent classification performed on images by the mobile phone may be directly displayed in a directory of "Internal Storage".

Figures 1, 11A:
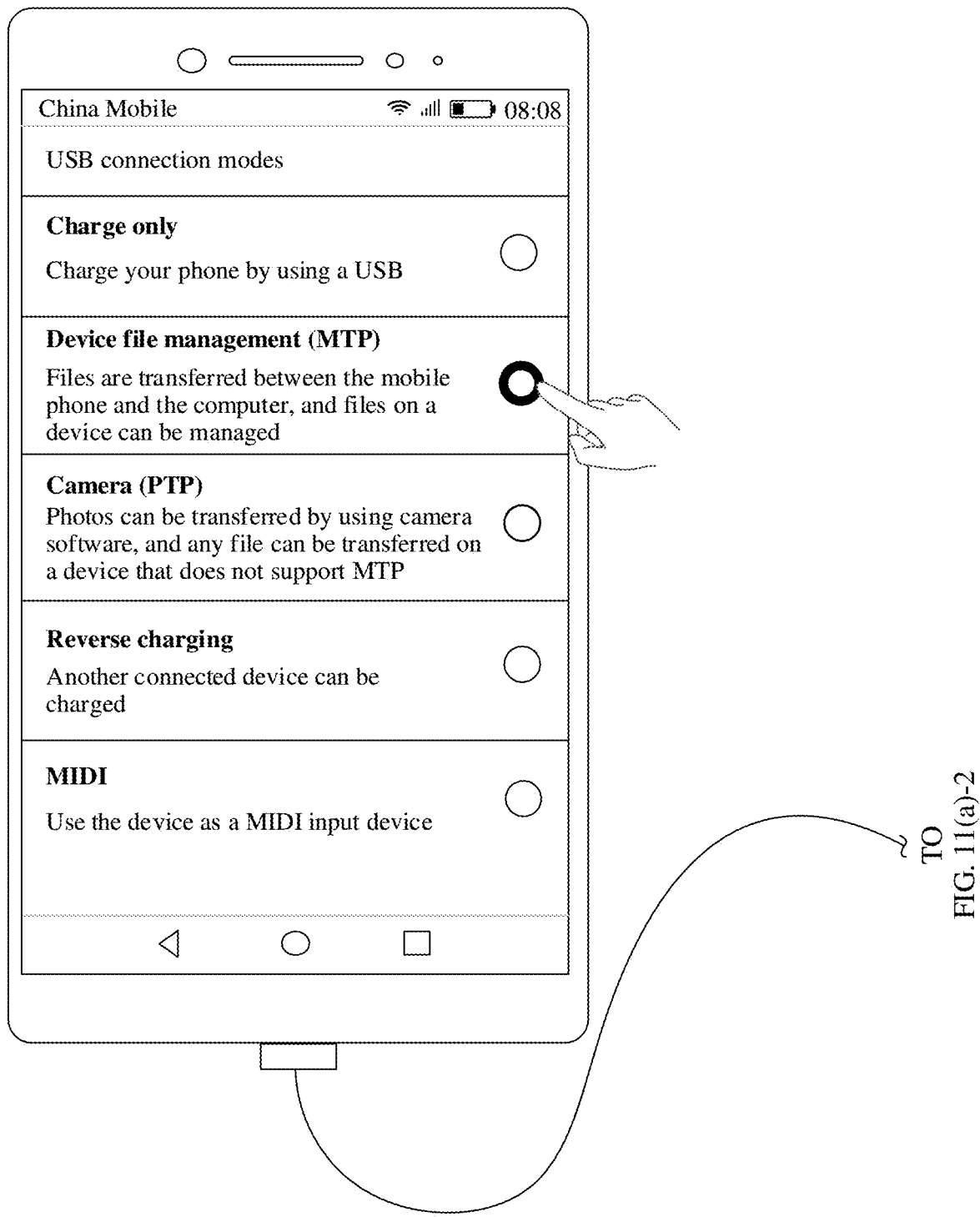
Figures 2, 11A:
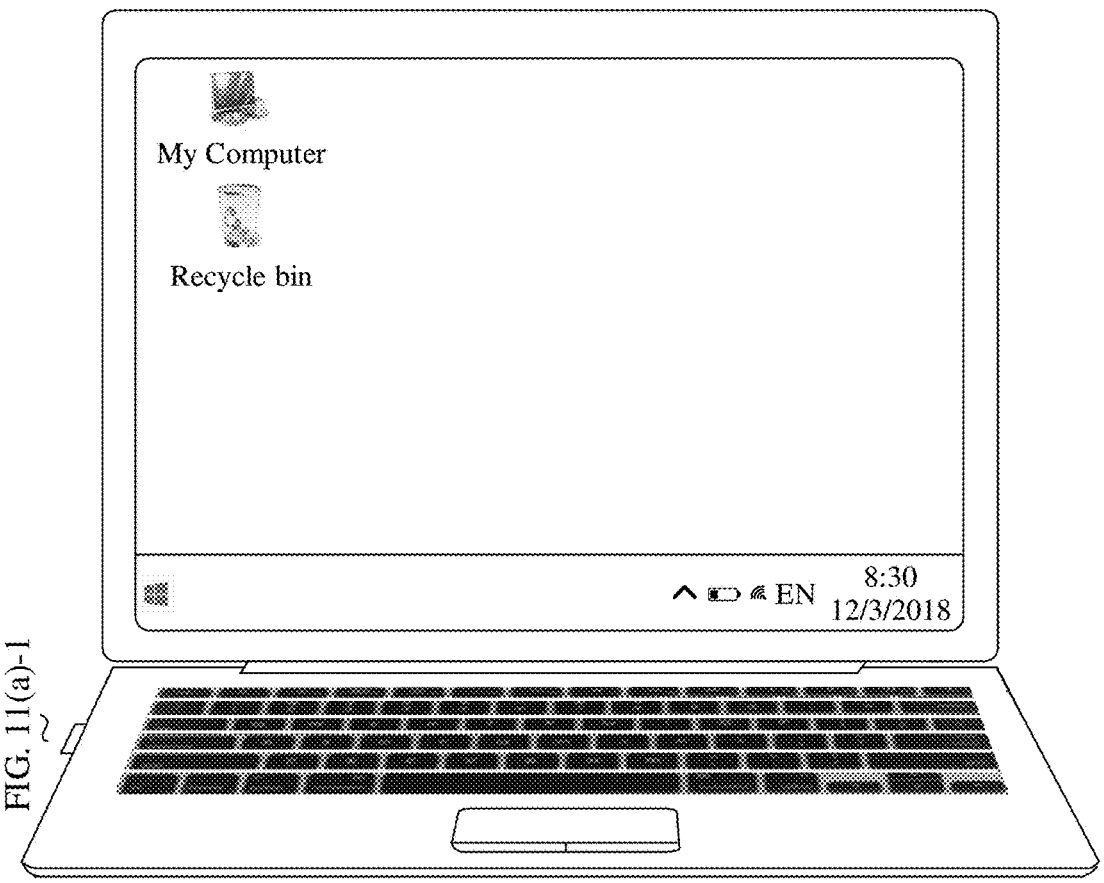
Figure 11B:
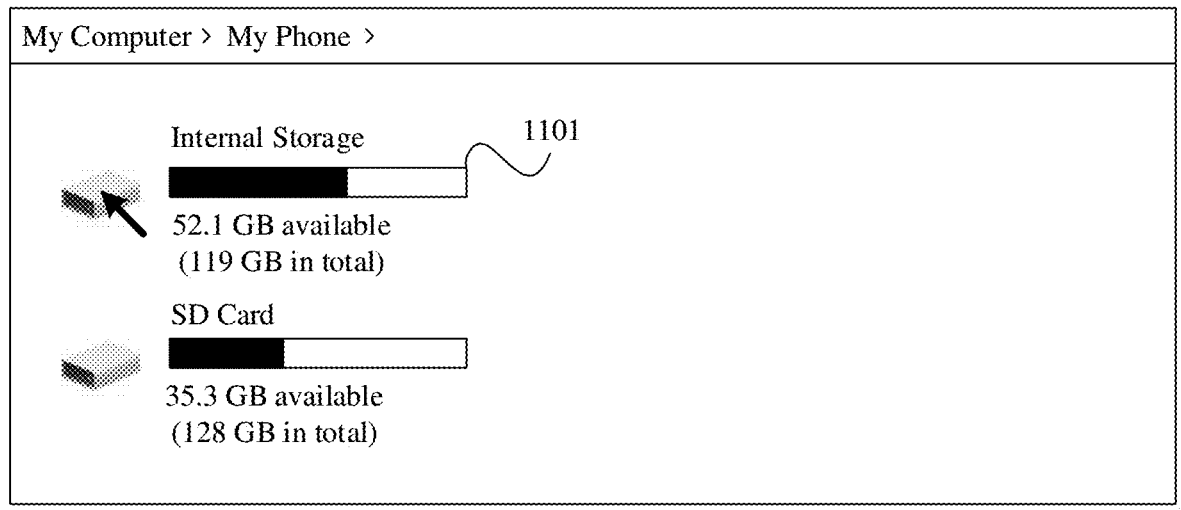
Figure 11C:
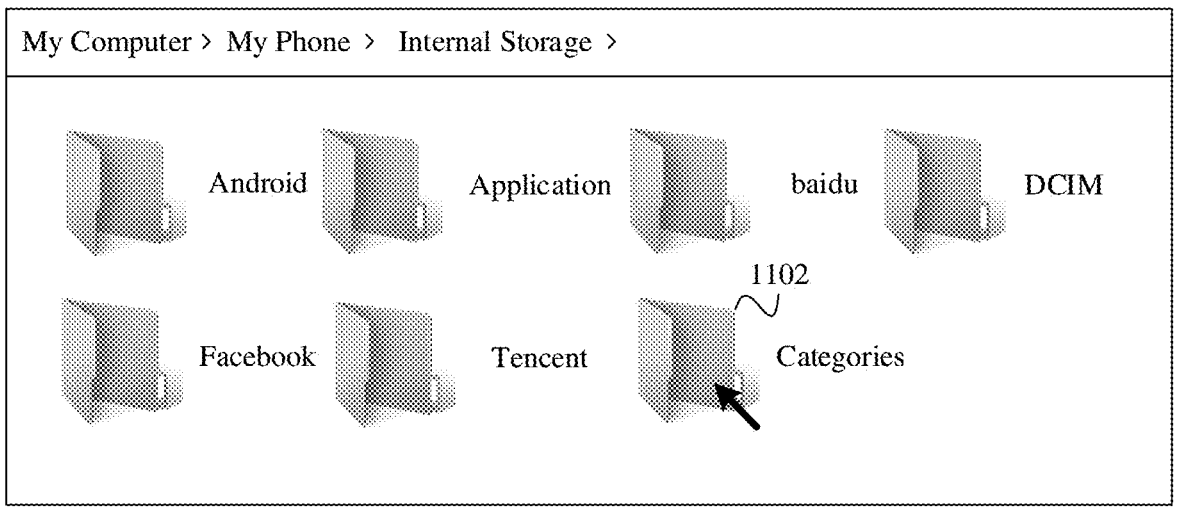
Figure 11E:
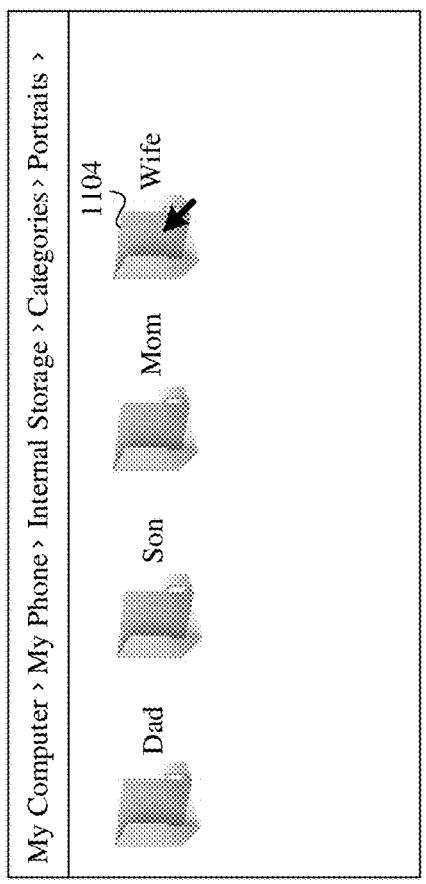
Figure 11F:
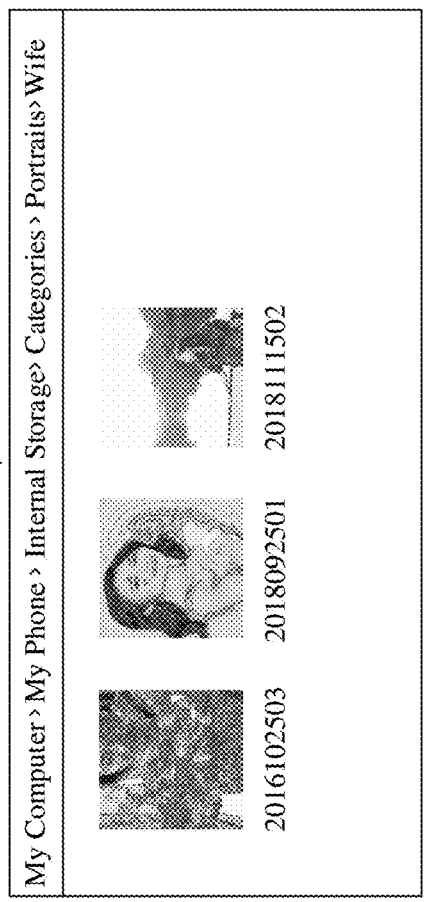
Figure 11D:
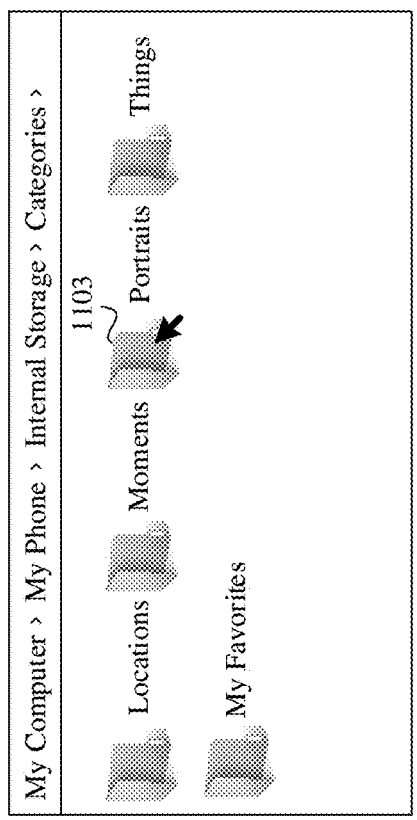
Figure 12:
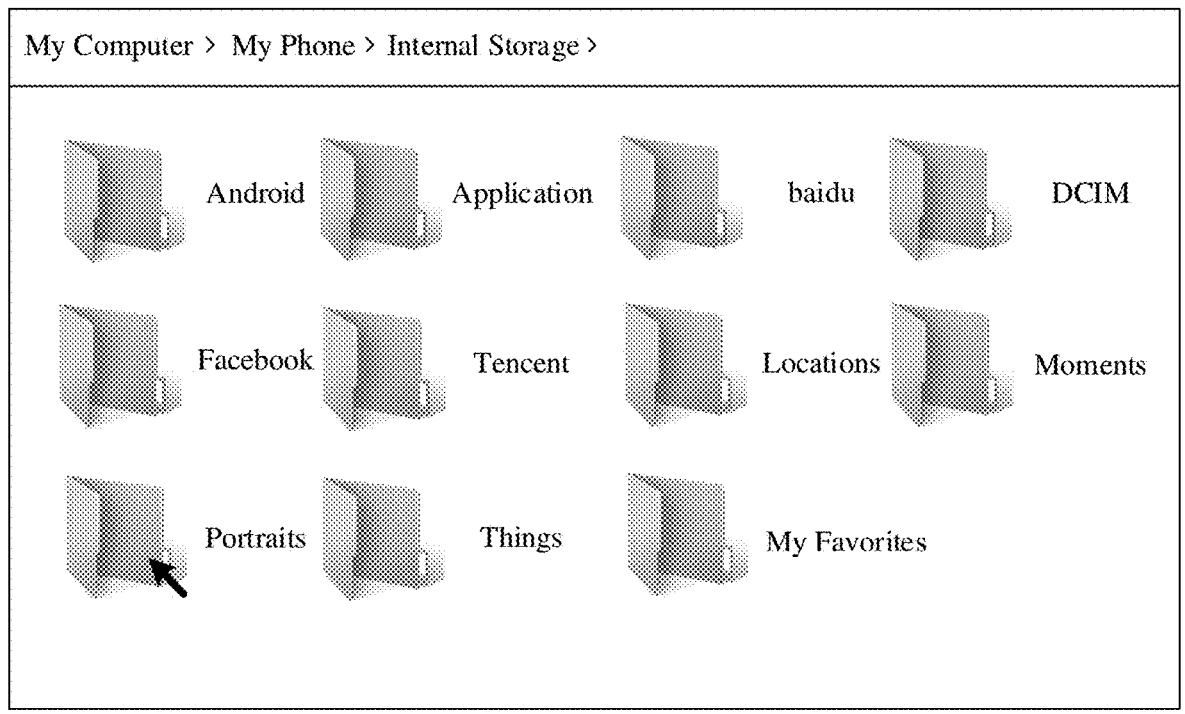
FIG. 12 is a schematic diagram of a graphical user interface according to an embodiment of this application.

Referring to a GUI shown in FIG. 12, when the computer detects that the user double-clicks "Internal Storage", the GUI shown in FIG. 12 is displayed. Different from FIG. 11(*c*), the intelligent classification result of the images is directly displayed in the directory of "Internal Storage", in other words, the user can view the intelligent classification of the images in a path "My Computer>My Phone>Internal Storage".

In an embodiment, a result of intelligent classification performed on images by the user is displayed in a first folder in "Internal Storage".

Figure 13:
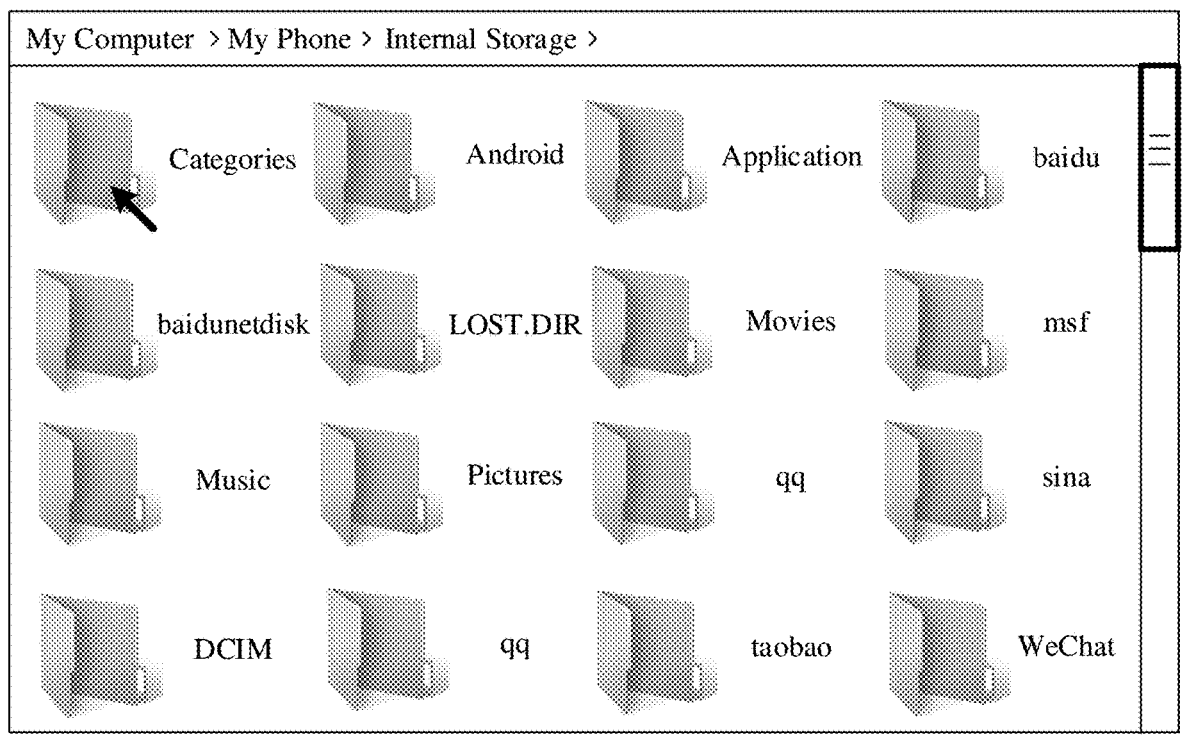
FIG. 13 is a schematic diagram of a graphical user interface according to an embodiment of this application.

Referring to a GUI shown in FIG. 13, after the computer detects that the user double-clicks "Internal Storage", the GUI shown in FIG. 13 is displayed. Different from FIG. 11(c), the intelligent classification result of the images is displayed in the first folder (namely, a "Categories" folder).

Figure 14:
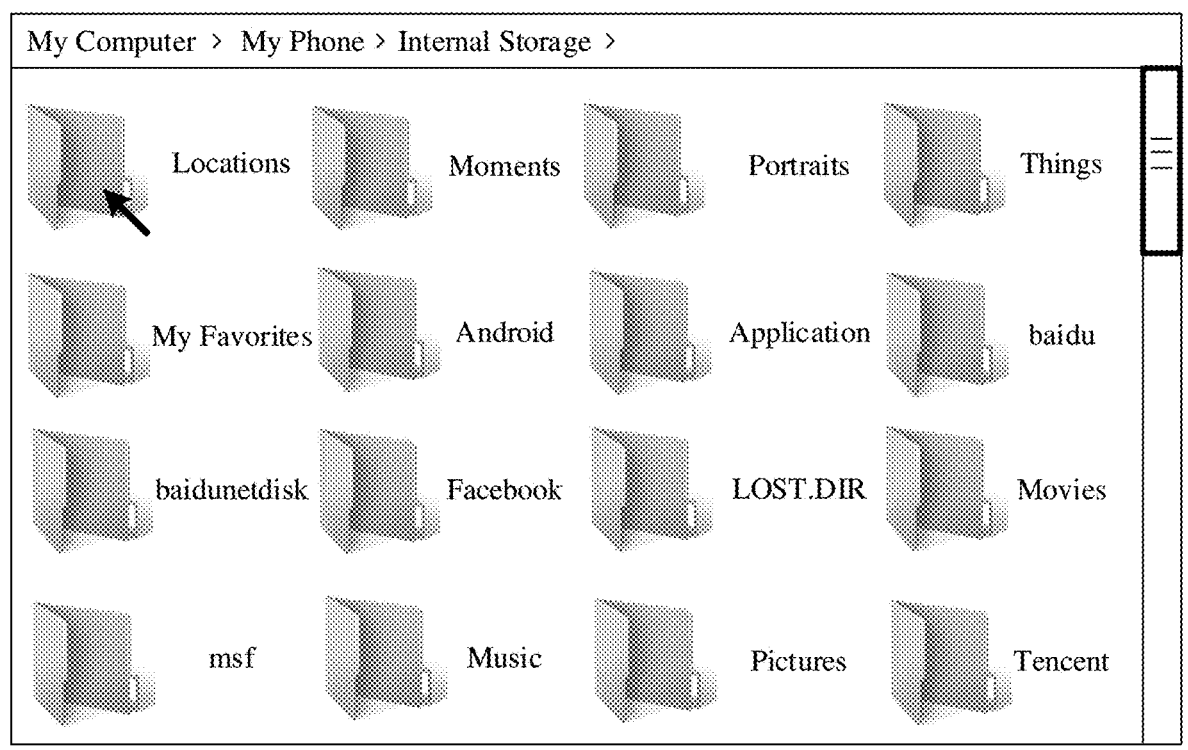
FIG. 14 is a schematic diagram of a graphical user interface according to an embodiment of this application.

Referring to a GUI shown in FIG. 14, after the computer detects that the user double-clicks "Internal Storage", the GUI shown in FIG. 14 is displayed. Different from FIG. 12, the intelligent classification result of the images is displayed in the first several folders (namely, "Locations", "Moments", "Portraits", "Things", and "My Favorites").

According to the intelligent classification method in this embodiment of this application, the intelligent classification result of the images is displayed in the first folder, and when excessive files are stored in the internal storage, the user can timely find, on the computer, the classification result of the images in the mobile phone, and user experience is relatively good.

The foregoing describes, with reference to FIG. 5(a)-1 to FIG. 14, several groups of GUIs provided in the embodiments of this application. The following describes, with reference to the accompanying drawings, internal implementation of the intelligent classification method provided in the embodiments of this application.

Figure 15:
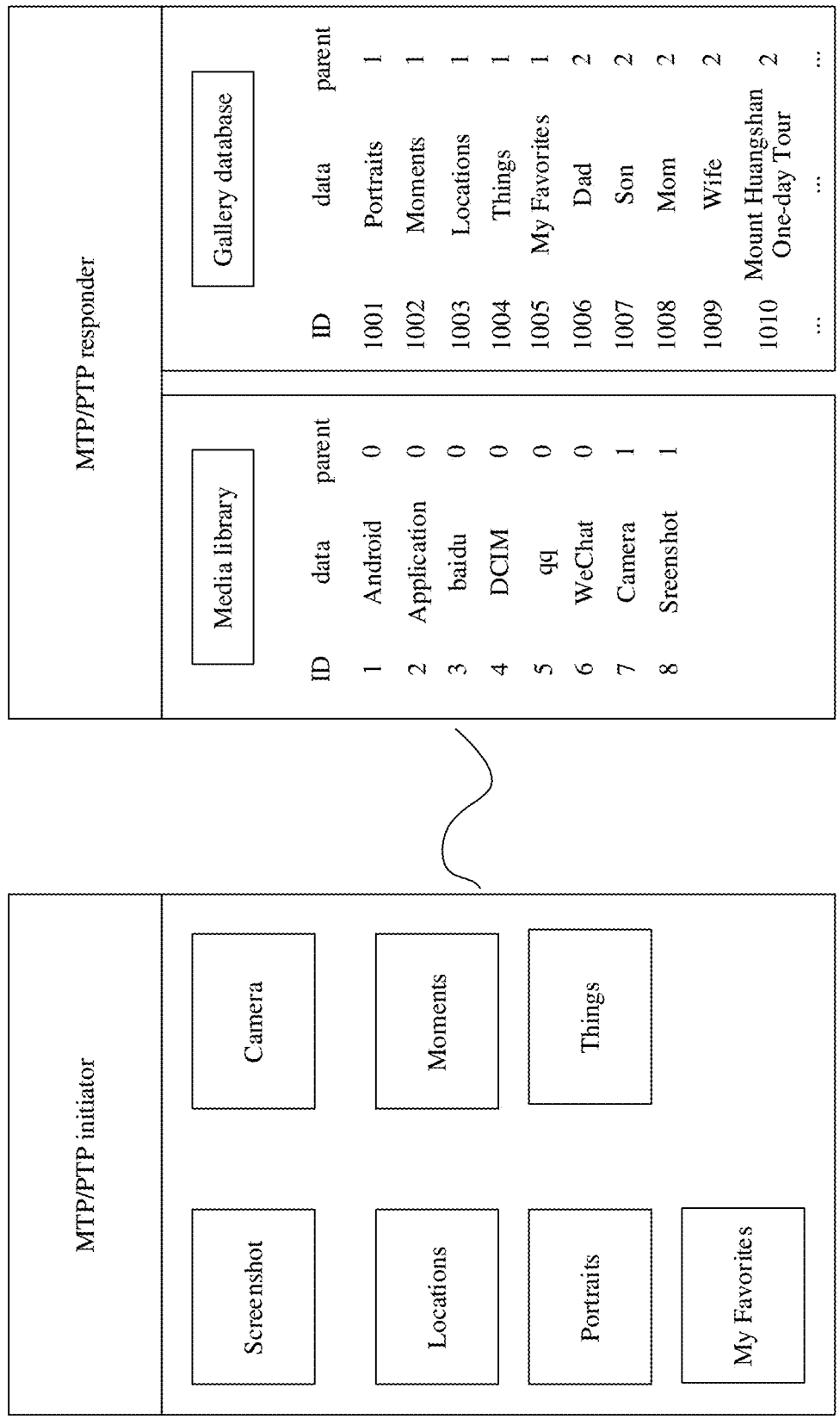
FIG. 15 is a schematic diagram of communication between an MTP/PTP initiator and an MTP/PTP responder according to an embodiment of this application.

FIG. 15 is a schematic diagram of communication between an MTP/PTP initiator and an MTP/PTP responder according to an embodiment of this application. As shown in FIG. 15, the responder includes a media database and a gallery database, and the gallery database includes a classification result of images stored in a mobile phone. Each ID in the media database and the gallery database corresponds to a label of a classification result in the mobile phone, data (data) corresponding to each ID is a name of the classification result, and a parent (parent) corresponding to each ID is a parent to which the classification result belongs.

With reference to the block diagram of the software structure shown in FIG. 2, the media database may be in the media library in the system library shown in FIG. 2, and the gallery database may be located in the gallery at the application layer shown in FIG. 2.

In this embodiment of this application, an ID number (or referred to as an int value) in the media database may be 0 to 2 billion, and an ID number (or referred to as an int value) in the gallery database may be a number greater than 2 billion.

Table 2 shows mapping relationships between parents in the gallery database, as shown in Table 2.

TABLE 2

Mapping relationships between the parents in the gallery database

| Parent: 1 | Parent: 2 |
| --- | --- |
| Portraits | Dad |
|  | Son |
|  | Mom |
|  | Wife |
| Moments | Mount Huangshan one-day tour |
|  | Shanghai one-day tour |
|  | Wuzhen two-day tour |

TABLE 2-continued

Mapping relationships between the parents in the gallery database

| Parent: 1 | Parent: 2 |
| --- | --- |
| Locations | Macao |
|  | Mount Huangshan |
|  | Bangkok |
|  | Shanghai |
|  | Shenzhen |
|  | Xi'an |
| Events | Pets |
|  | Sea |
|  | Food |
|  | Sky |
| My Favorites | . . . |

It should be understood that, in this embodiment of this application, a corresponding file and a corresponding directory may be searched for by using the mapping relationships between the parents in Table 2, or a corresponding file and a corresponding directory may be searched for by using IDs.

Table 3 shows mapping relationships between parents in another gallery database, as shown in Table 3.

TABLE 3

Mapping relationships between the parents in a gallery database

| ID carried in a request initiated by the initiator | Response ID of the responder |
| --- | --- |
| 1001 | 1006 |
|  | 1007 |
|  | 1008 |
|  | 1009 |
| 1002 | 1010 |
|  | 1011 |
|  | 1012 |
| 1003 | 1013 |
|  | 1014 |
|  | 1015 |
|  | 1016 |
|  | 1017 |
|  | 1018 |
| 1004 | 1019 |
|  | 1020 |
|  | 1021 |
|  | 1022 |
| 1005 | . . . |

For example, after a computer detects that a user clicks a "Portraits" folder, the computer may send request information to a mobile phone, and an ID carried in the request information is 1001. After receiving the request information, the mobile phone may search a file and a directory under the ID 1001. It can be learned from Table 3 that the ID 1001 includes IDs 1006, 1007, 1008, and 1009. After finding these IDs, the mobile phone may send response information to the computer, where the response information carries information about these IDs. After receiving the response information, the computer may display the information corresponding to the IDs carried in the response information to the user in a folder form. As shown in FIG. 6(a), the computer may display, in a folder form, information about an image set corresponding to each ID.

When the user selects a camera (PTP) to transfer image files, after detecting that the user double-clicks "My Phone", the computer may display all folders that include the image files and whose parent is 1. As shown in FIG. 5(d), the following folders are displayed on the GUI: "Screenshot (screenshot)", "Camera (camera)", "Locations", "Moments", "Portraits", "Things", and "My Favorites".

When the user double-clicks the "Portraits" folder, a folder corresponding to a parent 2 of "Portraits" may be displayed. As shown in FIG. 5(e), the "Dad", "Son", "Mom", and "Wife" folders are displayed.

When the user selects the camera (PTP) to transfer image files, after the user connects the mobile phone to the computer by using a USB cable, the user can open an internal storage at an entry constructed on a directory browser by an initiator (for example, a windows media player (windows media player, WMP)) of the computer and then can view a directory and a file on the mobile phone, and the content includes a directory and a file when the parent in the preceding table is 0. After the user opens a DCIM directory, the computer initiates a new communication. In this case, the user can view a directory and a file when the parent is 1.

For example, when the user selects the camera (PTP) to transfer image files, after detecting that the user double-clicks "Internal Storage", the computer may display all folders or files whose parents are 0. As shown in FIG. 11(c), and the parents of the folders "Android", "Application", "baidu", "DCIM", "Tencent", and "Gallery" in the directory of "Internal Storage" are all 0. After the computer detects that the user double-clicks the "Portraits" folder, the GUI shown in FIG. 11(d) is displayed.

It should be understood that the "Gallery" folder whose parent is 1 includes "Portraits", "Moments", "Locations", "Food", and "My Favorites" folders whose parent is 2.

Figure 16:
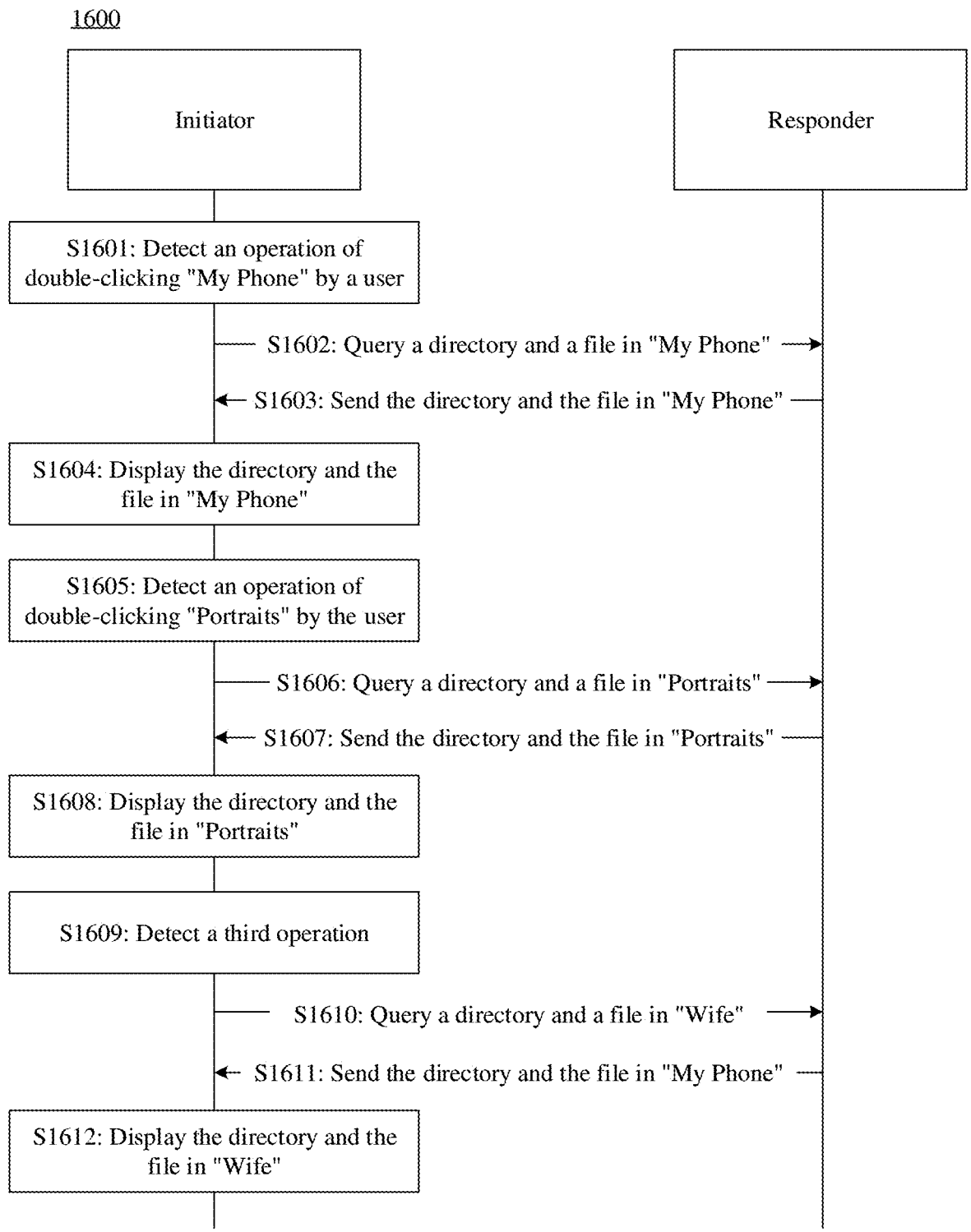
FIG. 16 is a schematic flowchart of communication between a PTP initiator and a PTP responder according to an embodiment of this application.

FIG. 16 is a schematic flowchart of communication between a PTP initiator and a PTP responder according to an embodiment of this application. GUIs in FIG. 6(a) to FIG. 6(d) are used as an example, and a process of communication between the initiator and the responder is as follows:

S1601: The initiator detects a first operation of double-clicking "My Phone" by a user.

S1602: In response to the first operation, the initiator sends a first command to the responder, where the first command is used to query a directory and a file in "My Phone".

S1603: The responder sends a first query result to the initiator, where the first query result includes the directory and the file in "My Phone".

S1604: The initiator displays the first query result by using a display.

For example, as shown in FIG. 5(d), the first query result includes the "Screenshot", "Camera", "Locations", "Moments", "Portraits", "Things", and "My Favorites" folders.

S1605: The initiator detects a second operation of double-clicking the "Portraits" folder by the user.

S1606: In response to the second operation, the initiator sends a second command to the responder, where the second command is used to query a directory and a file in the "Portraits" folder.

S1607: The responder sends a second query result to the initiator, where the second query result includes the directory and the file in the "Portraits" folder.

S1608: The initiator displays the second query result by using the display.

For example, as shown in FIG. 6(a), the second query result includes the "Dad", "Son", "Mom", and "Wife" folders.

S1609: The initiator detects a third operation of double-clicking the "Wife" folder by the user.

S1610: In response to the third operation, the initiator sends a third command to the responder, where the third command is used to query a directory and a file in the "Wife" folder.

S1611: The responder sends a third query result to the initiator, where the third query result includes the directory and the file in the "Wife" folder.

S1612: The initiator displays the third query result by using the display.

For example, as shown in FIG. 6(b), the third query result includes the three photos related to the wife.

In an embodiment, images stored in the "Portraits", "Moments", "Locations", "Things", and "My Favorites" folders under intelligent classification do not occupy a memory (or mobile phone space) of the mobile phone. The mobile phone establishes a mapping relationship between the images in the folders under intelligent classification and images that are in the "Camera" (or the "Screenshot") folder and that actually occupy a memory (or mobile phone space) of the mobile phone. When the computer detects that the user browses or performs another operation (for example, a copy operation) on an image in a folder under intelligent classification, an image in an actual physical path of the image is actually invoked.

For example, when the mobile phone needs to open the "Portraits" folder and open the photo named "2018092501" in the "Wife" folder, the mobile phone actually opens a corresponding photo in the "Camera" (or "Screenshot") folder.

For example, when the mobile phone opens the "Portraits" folder and copies the three photos in the "Wife" folder, three photos in the "Camera" (or "Screenshot") folder corresponding to the three photos are actually copied.

According to the intelligent classification method in this embodiment of this application, a data source for intelligent classification is added to the mobile phone. After the mobile phone is connected to the computer, an intelligent classification result may be displayed on the computer, and simple physical clustering is changed into logical clustering, so that a user can timely find an image that needs to be searched for, and user experience is relatively good.

FIG. 17 shows Android source code related to a PTP protocol. When a mobile phone is connected to a computer by using the PTP protocol, if it is detected on the computer that a user double-clicks "My Phone", the computer sends, to the mobile phone, a request for searching for a file and a directory in "My Phone". A mobile phone with an Android system may execute the source code shown in FIG. 17 to find response files and response directories, for example, "Screenshot", "Camera", "Locations", "Moments", "Portraits", "Things", and "My Favorites". The mobile phone sends the file and directory information to the computer, and the computer displays the information in a folder form to the user by using the display.

A source tree in which the Android source code shown in FIG. 17 is located is: xerf:/packages/providers/MediaProvider/src/com/android/providers/media/MtpService.java.

In an Android native design, only a camera album and a screenshot album are retained in a PTP mode. In this embodiment of this application, an image intelligent classification entry is added to an entry defined by the PTP (or MTP), and is fed back to the computer by using a specific ID (or parent). Then, after the user clicks, for example, the "Portraits" folder, the computer can provide, based on the ID (or parent), a more detailed portrait album for the user to browse, copy, or the like.

In the technical solutions in the embodiments of this application, the MTP/PTP protocol may not be changed, but service information presented externally based on the MTP/PTP protocol is changed to some extent. In the conventional technology, services presented externally based on the PTP protocol by the mobile phone are a "camera" and a "screenshot". However, in the embodiments of this application, the services presented externally based on the PTP protocol may be increased. For example, the increased services may be "locations", "moments", "portraits", "things", "my favorites", and the like.

Figure 18:
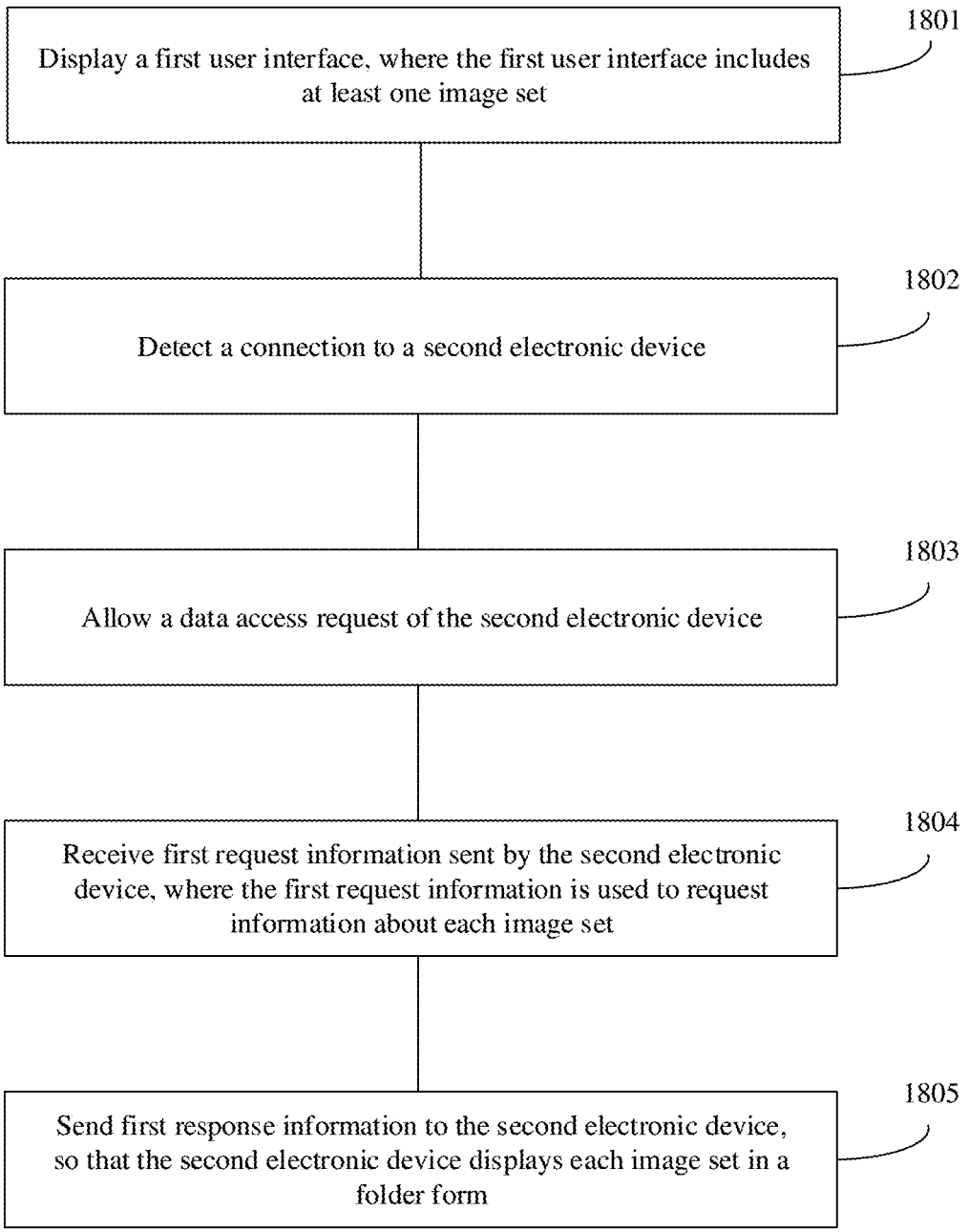
FIG. 18 is a schematic flowchart of an image classification method according to an embodiment of this application.

With reference to the foregoing embodiments and related accompanying drawings, an embodiment of this application provides an image classification method. The method may be implemented in an electronic device (for example, a mobile phone or a tablet computer), as shown in FIG. 1 and FIG. 2, that has a camera. As shown in FIG. 18, the method 1800 may include the following steps.

S1801: A first electronic device displays a first user interface, where the first user interface includes one or more image sets, and each of the one or more image sets is obtained by classifying images shot by a camera.

For example, the first user interface may be an album interface of a mobile phone, and the first user interface may display each image set obtained after the images shot by the camera are classified in the mobile phone.

S1802: The first electronic device detects a connection to a second electronic device.

For example, as shown in FIG. 5(a)-1, when detecting that the mobile phone is connected to a notebook computer, the mobile phone may prompt, through the window 501, a user "Allow access to device data?".

S1803: The first electronic device allows a data access request of the second electronic device.

For example, as shown in FIG. 5(a)-1, after the mobile phone detects an operation of tapping the control 502 by the user, the mobile phone allows a data access request of a notebook computer.

S1804: The first electronic device receives first request information sent by the second electronic device, where the first request information is used to request information about each image set.

For example, as shown in FIG. 5(c), after the notebook computer detects an operation of double-clicking "My Phone" by the user, the notebook computer may send the first request information to the mobile phone, where the first request information is used to request directory and file information in "My Phone". The directory and file information in "My Phone" includes information about one or more image sets obtained after the mobile phone classifies the images in the mobile phone.

For example, as shown in FIG. 5(d), after the notebook computer detects an operation of double-clicking the "Portraits" folder by the user, the notebook computer may send the first request information to the mobile phone, where the first request information is used to request directory and file information in the "Portrait" folder.

For example, as shown in FIG. 8(a), after the notebook computer detects an operation of double-clicking the "Moments" folder by the user, the notebook computer may send the first request information to the mobile phone, where the first request information is used to request directory and file information in the "Moments" folder.

Figure 9A:
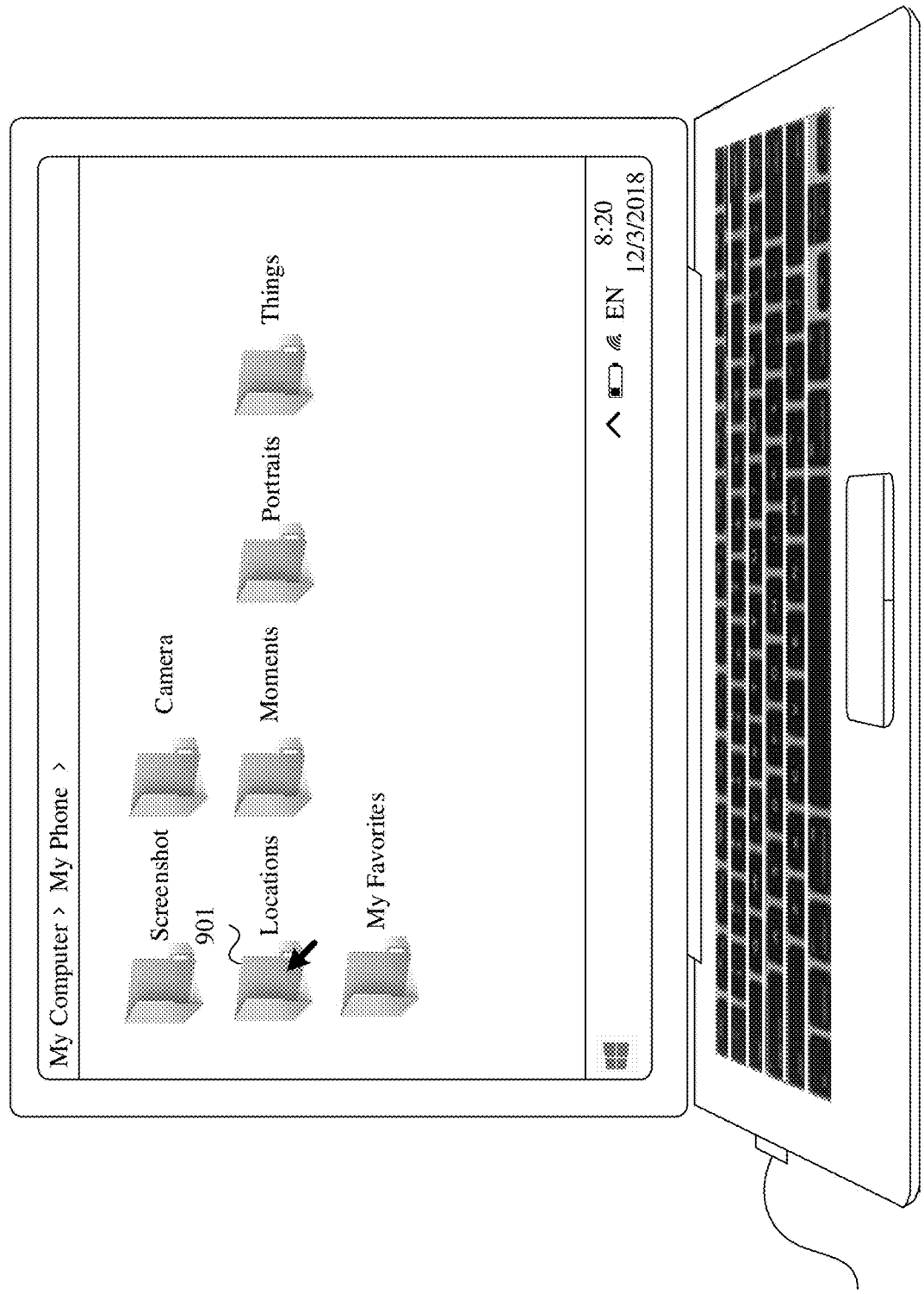

For example, as shown in FIG. 9(a), after the notebook computer detects an operation of double-clicking the "Locations" folder by the user, the notebook computer may send the first request information to the mobile phone, where the first request information is used to request directory and file information in the "Locations" folder.

For example, as shown in FIG. 10(a), after the notebook computer detects an operation of double-clicking the "Things" folder by the user, the notebook computer may send the first request information to the mobile phone, where the first request information is used to request directory and file information in the "Things" folder.

S1805: The first electronic device sends first response information to the second electronic device, so that the second electronic device displays each image set in a folder form.

For example, as shown in FIG. 5(d), the mobile phone sends the first response information to the notebook computer, where the first response information may carry the directory and file information in "My Phone". The directory and file information in "My Phone" may include folders such as "Screenshot", "Camera", "Locations", "Moments", "Portraits", "Food", and "My Favorites".

For example, as shown in FIG. 6(a), the mobile phone sends the first response information may to the notebook computer, where the first response information may carry directory and file information in the "Portraits" folder. The directory and file information in the "Portraits" folder may include folders such as "Dad", "Son", "Mom", and "Wife".

For example, as shown in FIG. 8(b), the mobile phone sends the first response information may to the notebook computer, where the first response information may carry directory and file information in the "Moments" folder. The directory and file information in the "Moments" folder may include folders such as "Mount Huangshan One-day Tour", "Shanghai One-day Tour", and "Wuzhen Two-day Tour".

For example, as shown in FIG. 9(b), the mobile phone sends the first response information may to the notebook computer, where the first response information may carry directory and file information in the "Locations" folder. The directory and file information in the "Locations" folder may include folders such as "Macao", "Mount Huangshan", "Bangkok", "Shanghai", "Shenzhen", and "Wuzhen".

For example, as shown in FIG. 10(b), the mobile phone sends the first response information may to the notebook computer, where the first response information may carry directory and file information in the "Things" folder. The directory and file information in the "Things" folder may include folders such as "Food", "Sea", "Sky", and "Pets".

It may be understood that, in this embodiment of this application, the mobile phone may intelligently classify the images shot by the camera of the mobile phone, to form one or more image sets, and information about each of the one or more image sets may be displayed in a folder form on the notebook computer, where a name of each folder may be classification information or label information of each image set.

Optionally, before the sending first response information to the second electronic device, the method further includes:

The first electronic device searches a database of the first electronic device, where the database includes a correspondence between each image set and a parent of each image set.

For example, before the mobile phone sends the first response information to the notebook computer, the mobile phone may search a database structure in the mobile phone shown in Table 2, to send a response file and a response directory to the notebook computer. The notebook computer displays the response file and the response directory to the user by using the display.

Optionally, after the sending first response information to the second electronic device, the method further includes:

The first electronic device receives second request information sent by the second electronic device, where the second request information is used to request information about an image in a first image set, and the one or more image sets include the first image set.

For example, as shown in FIG. 5(*d*), after the notebook computer detects an operation of double-clicking the "Portraits" folder by the user, the notebook computer sends the second request information to the mobile phone, where the second request information is used to request information about an image in the "Portraits" folder.

For example, as shown in FIG. 6(*a*), after the notebook computer detects an operation of double-clicking the "Wife" folder by the user, the notebook computer sends the second request information to the mobile phone, where the second request information is used to request information about an image in the "Wife" folder.

For example, as shown in FIG. 8(*b*), after the notebook computer detects an operation of double-clicking the "Mount Huangshan One-day Tour" folder by the user, the notebook computer sends the second request information to the mobile phone, where the second request information is used to request information about an image in the "Mount Huangshan One-day Tour" folder.

For example, as shown in FIG. 9(*b*), after the notebook computer detects an operation of double-clicking the "Macao" folder by the user, the notebook computer sends the second request information to the mobile phone, where the second request information is used to request information about an image in the "Macao" folder.

For example, as shown in FIG. 10(*b*), after the notebook computer detects an operation of double-clicking the "Sea" folder by the user, the notebook computer sends the second request information to the mobile phone, where the second request information is used to request information about an image in the "Sea" folder.

In response to the second request information, the first electronic device searches for the image in the first image set by using a mapping relationship.

For example, when receiving the second request information, the mobile phone may search for an image in a corresponding image set by using the mapping relationship. The mobile phone may search for all images in a gallery by using the mapping relationship, and select an image in a corresponding image set.

In this embodiment of this application, when the mobile phone receives information for searching for an image set under intelligent classification, the mobile phone actually finds information about a corresponding image in "Camera" in a media database, as shown in FIG. 15. A gallery database may not occupy a space (or, memory) of the mobile phone. For example, when the mobile phone receives a request for searching for an image set about "the sea", the mobile phone may search the "Camera" for information about an image at an actual physical address based on a classification label "the sea", and send the information to the computer by using the second response information.

The first electronic device sends the second response information to the second electronic device, so that the second electronic device displays each image in the first image set in a thumbnail form.

For example, as shown in FIG. 5(*e*), the mobile phone may send the second request information to the notebook computer, where the second request information carries information about five images that are in an image set related to "portrait" and that are stored in the mobile phone. The notebook computer may display thumbnails of the five images to the user by using the display.

For example, as shown in FIG. 6(*b*), the mobile phone may send the second request information to the notebook computer, where the second request information carries information about three images that are in an image set related to "wife" and that are stored in the mobile phone. The notebook computer may display thumbnails of the three images to the user by using the display.

For example, as shown in FIG. 8(*c*), the mobile phone may send the second request information to the notebook computer, where the second request information carries information about four images that are in an image set related to "Mount Huangshan One-day Tour" and that are stored in the mobile phone. The notebook computer may display thumbnails of the four images to the user by using the display.

For example, as shown in FIG. 9(*c*), the mobile phone may send the second request information to the notebook computer, where the second request information carries information about four images that are in an image set related to "Macao" and that are stored in the mobile phone. The notebook computer may display thumbnails of the four images to the user by using the display.

For example, as shown in FIG. 10(*c*), the mobile phone may send the second request information to the notebook computer, where the second request information carries information about four images that are in an image set related to "Sea" and that are stored in the mobile phone. The notebook computer may display thumbnails of the four images to the user by using the display.

Optionally, the mapping relationship is a classification label of the first image set.

For example, the second request information is used to request the information about the image in the first image set from the mobile phone. The mobile phone may use the classification label of the first image set, for example, the classification label of the first image set may be "Persons", "Wife", "Mount Huangshan", "Macao", "Sea", or the like. The mobile phone may search the gallery for a corresponding image by using the classification label of the first image set, carry information about the corresponding image in the second response information, and send the second response information to the notebook computer.

Optionally, the first electronic device is connected to the second electronic device by using a picture transfer protocol PTP protocol; or the first electronic device is connected to the second electronic device by using a media transfer protocol MTP protocol.

Optionally, the method further includes:

The first electronic device receives third request information sent by the second electronic device, where the third request information is used to request information about a first image in the first image set.

For example, as shown in FIG. 6(*b*), when the notebook computer detects that the user double-clicks the image named "2018092501", the notebook computer may send the third request information to the mobile phone, where the third request information is used to request information about the image.

For example, as shown in FIG. 8(*c*), when the notebook computer detects that the user double-clicks the image named "2017010101", the notebook computer may send the third request information to the mobile phone, where the third request information is used to request information about the image.

For example, as shown in FIG. 9(*c*), when the notebook computer detects that the user double-clicks the image named "2018112503", the notebook computer may send the third request information to the mobile phone, where the third request information is used to request information about the image.

For example, as shown in FIG. 10(c), when the notebook computer detects that the user double-clicks the image named "2018053015", the notebook computer may send the third request information to the mobile phone, where the third request information is used to request information about the image.

The first electronic device sends third response information to the second electronic device, so that the second electronic device displays the first image by using the display.

For example, after receiving the third request information, the mobile phone may send the third response information to the notebook computer, where the third response information carries information (or data) about a corresponding image. The notebook computer may display the corresponding image to the user by using the display.

Optionally, the method further includes:

Receive fourth request information sent by the second electronic device, where the fourth request information is used to request one or more images in the second image set.

Figure 7A:
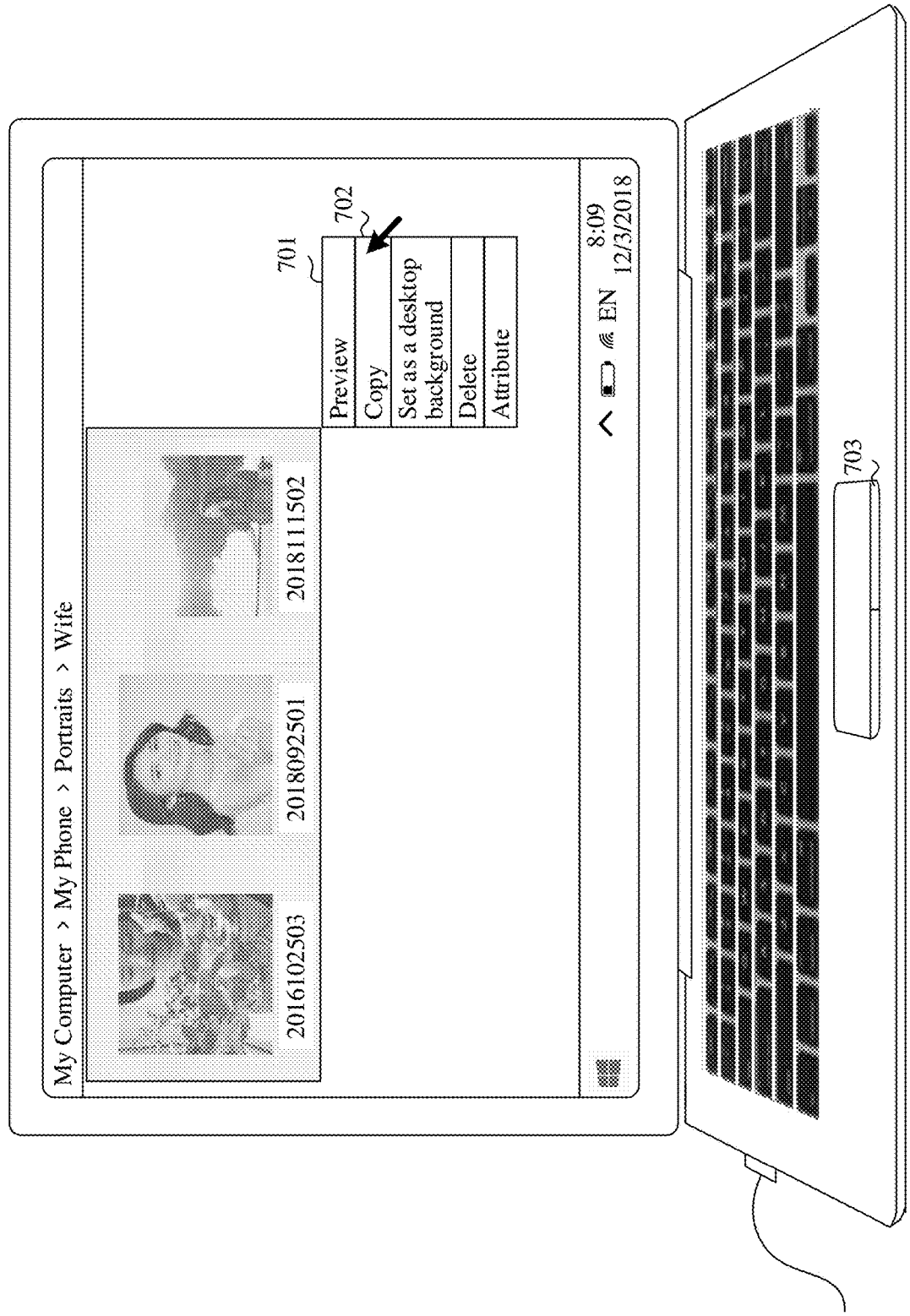

For example, as shown in FIG. 7(a), when the notebook computer detects an operation performed by the user to indicate to copy an image, the notebook computer may send the fourth request information to the mobile phone, where the fourth request information is used to request information (or data) about the three images.

Send fourth response information to the second electronic device, so that the second electronic device copies the one or more images to a storage disk of the second electronic device.

For example, after finding the three images in the gallery by using the mapping relationship, the mobile phone may send information (or data) about the three images to the notebook computer. After detecting, in a folder in a local disk, an operation performed by the user to indicate to perform pasting, the notebook computer copies the three images to the local disk of the notebook computer.

Figure 19:
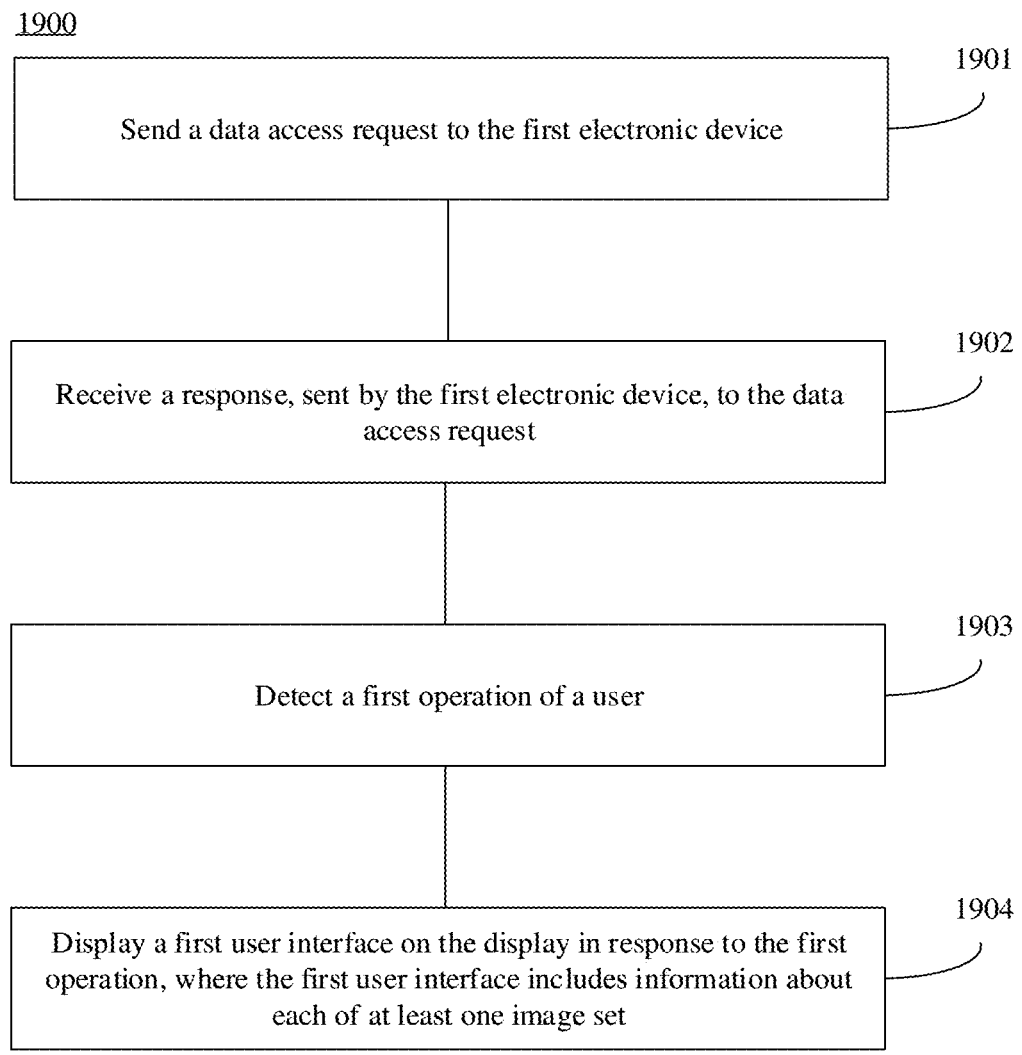
FIG. 19 is another schematic flowchart of an image classification method according to an embodiment of this application.

With reference to the foregoing embodiments and related accompanying drawings, an embodiment of this application further provides an image classification method. The method may be implemented in the second electronic device (for example, a notebook computer). As shown in FIG. 19, the method may include the following steps.

S1901: The second electronic device sends a data access request to the first electronic device.

For example, as shown in FIG. 5(a)-1, when detecting that the notebook computer is connected to the mobile phone, the notebook computer may send the data access request to the mobile phone.

S1902: The second electronic device receives a response that is to the data access request and that is sent by the first electronic device.

For example, as shown in FIG. 5(a)-1, after the mobile phone detects an operation of tapping the control 502 by the user, the mobile phone may send the response to the data access request to the notebook computer, where the response is used to indicate that the data access request of the notebook computer is allowed.

S1903: Detect a first operation of the user.

For example, as shown in FIG. 5(c), the first operation may be an operation of double-clicking "My Phone" by the user.

For example, as shown in FIG. 5(c), the first operation may be an operation of double-clicking the "Portraits" folder by the user.

For example, as shown in FIG. 8(a), the first operation may be an operation of double-clicking the "Moments" folder by the user.

For example, as shown in FIG. 9(a), the first operation may be an operation of double-clicking the "Locations" folder by the user.

For example, as shown in FIG. 10(a), the first operation may be an operation of double-clicking the "Things" folder by the user.

S1904: The second electronic device displays a first user interface on the display in response to the first operation, where the first user interface includes information about each of one or more image sets, and each of the one or more image sets is obtained by classifying images shot by a camera of the first electronic device.

For example, the first user interface may be the image user interface shown in FIG. 5(d).

For example, the first user interface may be the graphic user interface shown in FIG. 6(a).

For example, the first user interface may be the graphic user interface shown in FIG. 8(b).

For example, the first user interface may be the graphic user interface shown in FIG. 9(b).

For example, the first user interface may be the graphic user interface shown in FIG. 10(b).

Optionally, the method further includes:

detecting a second operation of the user; and displaying a second user interface on the display in response to the second operation, where the second user interface includes information about an image in a first image set, and the one or more image sets include the first image set.

For example, the second user interface is the graphic user interface shown in FIG. 5(e).

For example, the second user interface is the graphic user interface shown in FIG. 6(b).

For example, the second user interface is the graphic user interface shown in FIG. 8(c).

For example, the second user interface is the graphic user interface shown in FIG. 9(c).

For example, the second user interface is the graphic user interface shown in FIG. 10(c).

Optionally, the information about the image in the first image set is a thumbnail of the image in the first image set.

Optionally, the method further includes:

before the displaying a first user interface on the display, detecting a third operation of the user; and displaying a third user interface on the display of the second electronic device in response to the third operation, where the third user interface includes a storage disk of the first electronic device and a storage disk of the second electronic device, and the first operation is an operation performed by the user to indicate to open the storage disk of the first electronic device.

For example, the third user interface is the graphic user interface shown in FIG. 5(c).

Optionally, the method further includes:

detecting a fourth operation of the user; and copying one or more images in the second image set to the storage disk of the second electronic device in response to the fourth operation.

Optionally, the first electronic device is connected to the second electronic device by using a picture transfer protocol PTP protocol; or the first electronic device is connected to the second electronic device by using a media transfer protocol MTP protocol.

With reference to the foregoing embodiments and related accompanying drawings, an embodiment of this application further provides an image classification method 2000. The method may be implemented in a system, and the system includes a first electronic device (for example, a mobile phone or a tablet computer) and a second electronic device (for example, a notebook computer). As shown in FIG. 20, the method may include the following steps.

S20901: The first electronic device detects a connection to the second electronic device.

S2002: The first electronic device allows a data access request of the second electronic device.

S2003: The second electronic device sends first request information to the first electronic device, where the first request information is used to request information about an image in the one or more image sets, and each of the one or more image sets is obtained by classifying images shot by the camera.

S2004: The first electronic device sends first response information to the second electronic device.

S2005: The second electronic device displays information about each image set on the display.

Optionally, the method further includes:

The second electronic device sends second request information to the first electronic device, where the second request information is used to request information about an image in a first image set, and the one or more image sets include the first image set;

the first electronic device sends second response information to the second electronic device; and the second electronic device displays the information about the image in the first image set on the display.

Optionally, the information about the image in the first image set is a thumbnail of the image in the first image set.

Optionally, the method further includes:

The second electronic device sends third request information to the first electronic device, where the second request information is used to request information about a first image in the first image set, and the first image set includes the first image;

the first electronic device sends the second response information to the second electronic device, where the second response information includes the information about the first image; and the second electronic device displays the first image on the display.

It may be understood that, to implement the foregoing functions, the electronic device includes corresponding hardware and/or software modules for performing the functions. With reference to algorithm steps of each example described in the embodiments disclosed in this specification, this application may be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of the embodiments of this application.

In the embodiments, the electronic device may be divided into function modules based on the examples in the foregoing method. For example, each function module corresponding to each function may be obtained through division, or two or more functions may be integrated into one processing module. The integrated module may be implemented in a form of hardware. It should be noted that, the module division in the embodiments is an example and is only logical function division. There may be another division manner in actual implementation.

Figure 21:
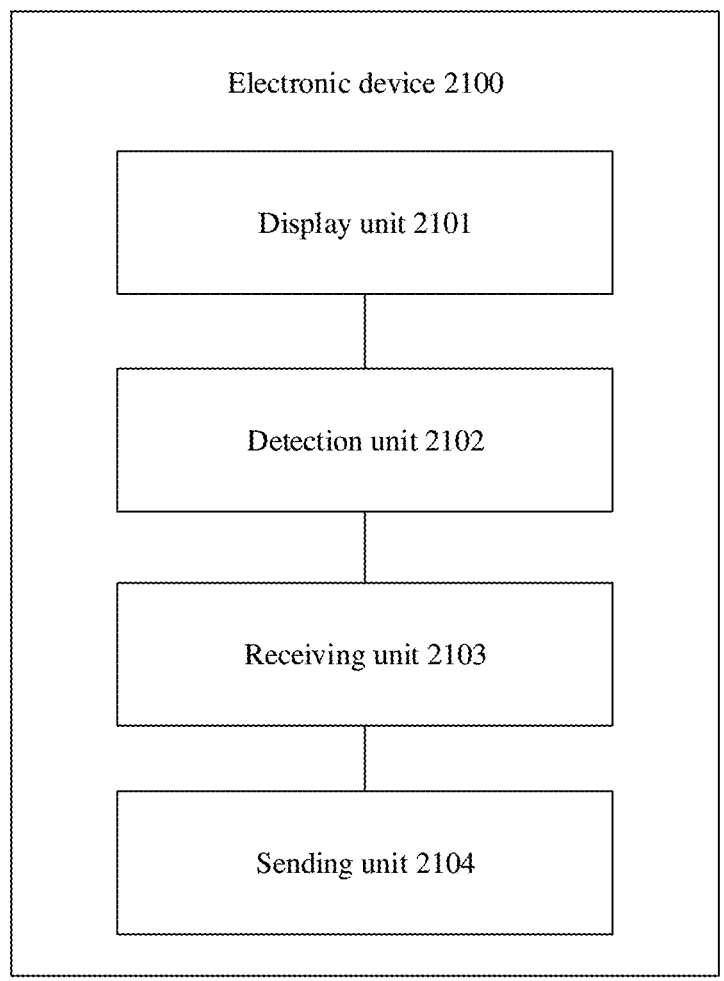
FIG. 21 is a schematic block diagram of an electronic device according to an embodiment of this application.

When each function module is obtained through division based on each corresponding function, FIG. 21 is a schematic diagram of possible composition of an electronic device 2100 according to the foregoing embodiments. As shown in FIG. 21, the electronic device 2100 may include a display unit 2101, a detection unit 2102, a receiving unit 2103, and a sending unit 2104.

The display unit 2101 may be configured to support the electronic device 2100 to perform the step 1801 and/or another process of the technology described in this specification.

The detection unit 2102 may be configured to support the electronic device 2100 to perform the step 1802 and/or another process of the technology described in this specification.

The receiving unit 2103 may be configured to support the electronic device 2100 to perform the step 1804 and/or another process of the technology described in this specification.

The sending unit 2104 may be configured to support the electronic device 2100 to perform the step 1803, the step 1805, and/or another process of the technology described in this specification.

It should be noted that all related content of the steps in the foregoing method embodiments may be cited in function descriptions of corresponding function modules. Details are not described herein again.

When an integrated unit is used, the electronic device may include a processing module, a storage module, and a communications module. The processing block may be configured to control and manage actions of the electronic device, for example, may be configured to support the electronic device to perform the steps performed by the display unit 2101, the detection unit 2102, the receiving unit 2103, and the sending unit 2104. The storage module may be configured to support the electronic device to store program code, data, and the like. The communications module may be configured to support communication between the electronic device and another device.

The processing module may be a processor or a controller. The processing module may implement or execute various example logical blocks, modules, and circuits described with reference to content disclosed in this application. Alternatively, the processor may be a combination of processors implementing a computing function, for example, a combination of one or more microprocessors, or a combination of digital signal processing (digital signal processing, DSP) and a microprocessor. The storage module may be a memory. The communications module may be specifically a device, for example, a radio frequency circuit, a Bluetooth chip, or a Wi-Fi chip, that interacts with another electronic device.

In an embodiment, when the processing module is a processor and the storage module is a memory, the electronic device in this embodiment may be a device having the structure shown in FIG. 1.

Figure 22:
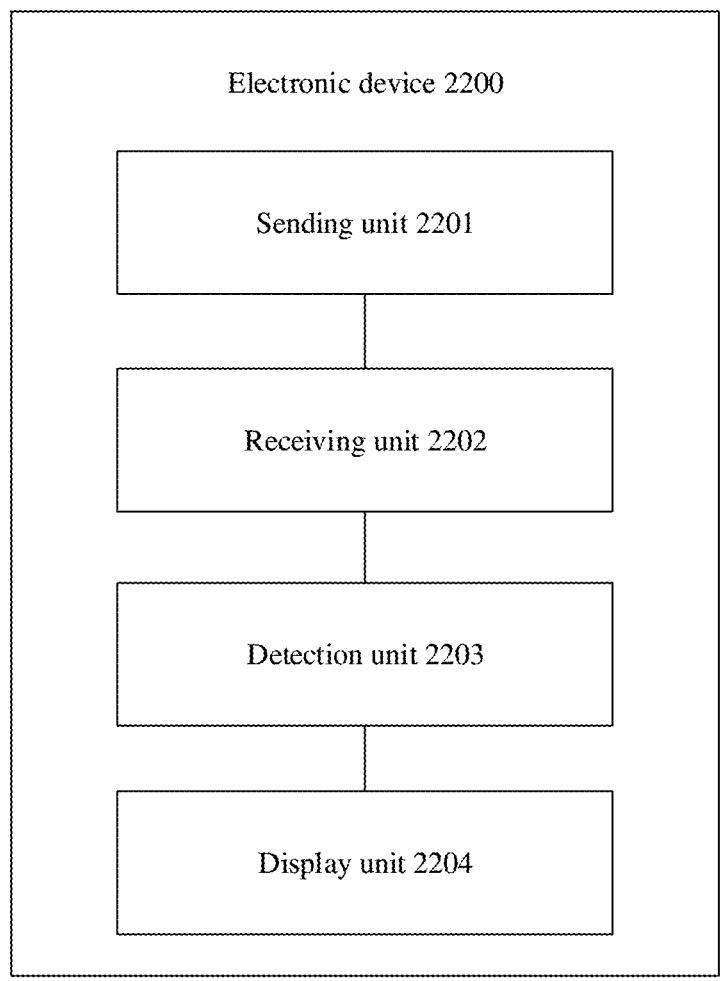
FIG. 22 is another schematic block diagram of an electronic device according to an embodiment of this application.

When each function module is obtained through division based on each corresponding function, FIG. 22 is a schematic diagram of possible composition of an electronic device 2200 according to the foregoing embodiments. As shown in FIG. 22, the electronic device 2200 may include a sending unit 2201, a receiving unit 2202, a detection unit 2203, and a display unit 2204.

The sending unit 2201 may be configured to support the electronic device 2200 to perform the step 1901 and/or another process of the technology described in this specification.

The receiving unit 2202 may be configured to support the electronic device 2200 to perform the step 1902 and/or another process of the technology described in this specification.

The detection unit 2203 may be configured to support the electronic device 2200 to perform the step 1903 and/or another process of the technology described in this specification.

The display unit 2204 may be configured to support the electronic device 2200 to perform the step 1904 and/or another process of the technology described in this specification.

It should be noted that all related content of the steps in the foregoing method embodiments may be cited in function descriptions of corresponding function modules. Details are not described herein again.

The electronic device provided in this embodiment is configured to perform the image classification method. Therefore, an effect same as that of the foregoing implementation methods can be achieved.

Figure 23:
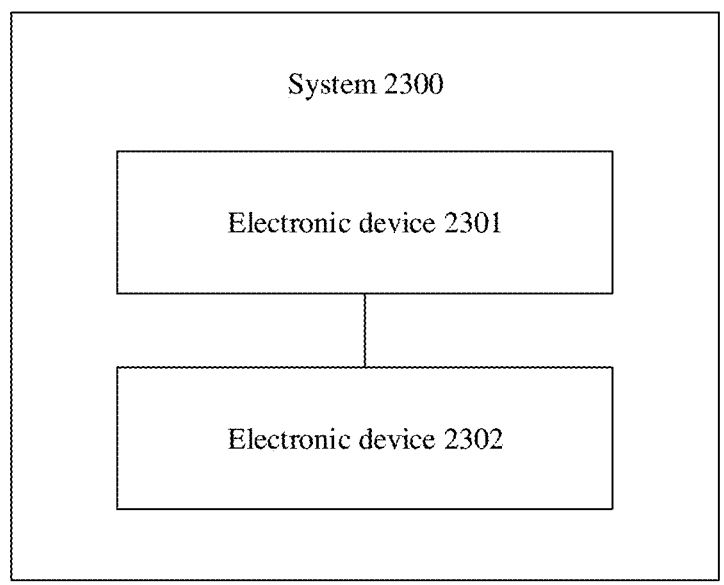
FIG. 23 is a schematic block diagram of a system according to an embodiment of this application.

FIG. 23 is a schematic diagram of a system 2300 according to an embodiment of this application. As shown in FIG. 23, the system 2300 may include the electronic device 2301 and the electronic device 2302. The electronic device may be the first electronic device in the foregoing method embodiments, the electronic device 2302 may be the second electronic device in the foregoing method embodiments.

An embodiment further provides a computer storage medium. The computer storage medium stores computer instructions. When the computer instructions are run on an electronic device, the electronic device is enabled to perform the related method steps, to implement the image classification method in the foregoing embodiments.

An embodiment further provides a computer program product. When the computer program product runs on a computer, the computer is enabled to perform the foregoing related steps, to implement the image classification method in the foregoing embodiments.

In addition, an embodiment of this application further provides an apparatus. The apparatus may be specifically a chip, a component, or a module. The apparatus may include a processor and a memory that are connected to each other. The memory is configured to store computer executable instructions. When the apparatus runs, the processor may execute the computer executable instructions stored in the memory, to enable the chip to perform the image classification method in the foregoing method embodiments.

The electronic device, the computer storage medium, the computer program product, or the chip provided in the embodiments is configured to perform the corresponding method provided above. Therefore, for beneficial effects that can be achieved, refer to the beneficial effects in the corresponding method provided above. Details are not described herein again.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a read-only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A system, comprising:
   a first electronic device, comprising a camera, a first memory, one or more first processors, and one or more first programs, wherein the one or more first programs are stored in the first memory; and
   a second electronic device, comprising a display, a second memory, one or more second processors, and one or more second programs, wherein the one or more second programs are stored in the second memory;

wherein when the one or more first processors execute the one or more first programs, the first electronic device is caused to:

display a first user interface, wherein the first user interface comprises one or more image sets, and each of the one or more image sets is obtained by classifying images shot by the camera, wherein images shot by the camera are stored in a folder, and images shot by the camera and stored in the folder are identified as belonging to image sets of the one or more image sets according to labels of the images that are determined according to classification results of the images;

detect a connection to the second electronic device; and allow a data access request of the second electronic device;

wherein when the one or more second processors execute the one or more second programs, the second electronic device is caused to:

send first request information to the first electronic device, wherein the first request information is used to request information about each image set of the one or more image sets;

wherein when the one or more first processors execute the one or more first programs, the first electronic device is further caused to:

send first response information to the second electronic device; and wherein when the one or more second processors execute the one or more second programs, the second electronic device is further caused to:

display information about each image set in a folder form on the display.

2. The system according to claim 1, wherein:

when the one or more second processors execute the one or more second programs, the second electronic device is further caused to:

send second request information to the first electronic device, wherein the second request information is used to request information about a first image in a first image set, and the one or more image sets comprise the first image set;

when the one or more first processors execute the one or more first programs, the first electronic device is further caused to:

send second response information to the second electronic device; and when the one or more second processors execute the one or more second programs, the second electronic device is further caused to:

display the information about the first image in the first image set on the display.

3. The system according to claim 2, wherein the information about the first image in the first image set comprises a thumbnail of the first image in the first image set.

4. The system according to claim 1, wherein:

when the one or more second processors execute the one or more second programs, the second electronic device is further caused to:

send third request information to the first electronic device, wherein the third request information is used to request information about a first image in a first image set, and the first image set comprises the first image;

when the one or more first processors execute the one or more first programs, the first electronic device is further caused to:

send second response information to the second electronic device, wherein the second response information comprises the information about the first image; and when the one or more second processors execute the one or more second programs, the second electronic device is further caused to:

display the first image on the display.

5. A first electronic device, comprising:

a camera;

a memory;

one or more processors; and one or more programs, wherein the one or more programs are stored in the memory; and when the one or more processors execute the one or more programs, the first electronic device is caused to:

display a first user interface, wherein the first user interface comprises images of one or more image sets, and each of the one or more image sets is obtained by classifying images shot by the camera, wherein images shot by the camera are stored in a folder, images shot by the camera and stored in the folder are identified as belonging to image sets of the one or more image sets according to labels of the images that are determined according to classification results of the images;

detect a connection to a second electronic device;

allow a data access request of the second electronic device;

receive first request information sent by the second electronic device, wherein the first request information is used to request information about each image set; and send first response information to the second electronic device, causing the second electronic device to display information of each image set in a folder form.

6. The first electronic device according to claim 5, wherein when the one or more processors execute the one or more programs, the first electronic device is caused to:

before sending the first response information to the second electronic device, search a database of the first electronic device, wherein the database comprises a correspondence between each image set and a parent of each image set.

7. The first electronic device according to claim 5, wherein when the one or more processors execute the one or more programs, the first electronic device is caused to:

after sending the first response information to the second electronic device, receive second request information sent by the second electronic device, wherein the second request information is used to request information about a first image in a first image set, and the one or more image sets comprise the first image set;

in response to the second request information, search for the first image in the first image set using a mapping relationship; and send second response information to the second electronic device, causing the second electronic device to display each image in the first image set in a thumbnail form.

8. The first electronic device according to claim 7, wherein the mapping relationship is a classification label of the first image set.

9. The first electronic device according to claim 5, wherein:
the first electronic device is connected to the second electronic device using a picture transfer protocol (PTP) protocol; or
the first electronic device is connected to the second electronic device using a media transfer protocol (MTP) protocol.

10. The first electronic device according to claim 5, wherein when the one or more processors execute the one or more programs, the first electronic device is caused to:
receive third request information sent by the second electronic device, wherein the third request information is used to request information about a first image in the first image set; and
send third response information to the second electronic device, causing the second electronic device to display the first image using a display.

11. The first electronic device according to claim 5, wherein when the one or more processors execute the one or more programs, the first electronic device is caused to:
receive fourth request information sent by the second electronic device, wherein the fourth request information is used to request one or more images in a second image set; and
send fourth response information to the second electronic device, causing the second electronic device to copy the one or more images in the second image set to a storage disk of the second electronic device.

12. A second electronic device, comprising:
a display;
a memory;
one or more processors; and
one or more programs, wherein the one or more programs are stored in the memory; and when the one or more processors execute the one or more programs, the second electronic device is caused to:
detect that a first electronic device is connected to the second electronic device;
send a data access request to the first electronic device;
receive a response, sent by the first electronic device, to the data access request;
detect a first operation of a user; and
display a first user interface on the display in response to the first operation, wherein the first user interface comprises information about each of one or more image sets, and each of the one or more image sets is obtained by classifying images shot by a camera of the first electronic device, wherein images shot by the camera are stored in a folder in the first electronic device, and images shot by the camera and stored in the folder are identified as belonging to image sets of the one or more image sets according to labels of the images that are determined according to classification results of the images.

13. The second electronic device according to claim 12, wherein when the one or more processors execute the one or more programs, the second electronic device is caused to:
detect a second operation of the user; and
display a second user interface on the display in response to the second operation, wherein the second user interface comprises information about a first image in a first image set, and the one or more image sets comprise the first image set.

14. The second electronic device according to claim 13, wherein the information about the first image in the first image set comprises a thumbnail of the first image in the first image set.

15. The second electronic device according to claim 12, wherein when the one or more processors execute the one or more programs, the second electronic device is caused to:
before displaying the first user interface on the display, detect a third operation of the user; and
display a third user interface on the display of the second electronic device in response to the third operation, wherein the third user interface comprises an indication of a storage disk of the first electronic device and an indication of a storage disk of the second electronic device; and
wherein the first operation is an operation performed by the user to indicate to open the indication of the storage disk of the first electronic device.

16. The second electronic device according to claim 12, wherein when the one or more processors execute the one or more programs, the second electronic device is caused to:
detect a fourth operation of the user; and
copying one or more images in a second image set to a storage disk of the second electronic device in response to the fourth operation.

17. The second electronic device according to claim 12, wherein:
the first electronic device is connected to the second electronic device using a picture transfer protocol (PTP) protocol; or
the first electronic device is connected to the second electronic device by using a media transfer protocol (MTP) protocol.

* * * * *